(12) United States Patent
Mikhailov et al.

(10) Patent No.: US 11,372,992 B2
(45) Date of Patent: Jun. 28, 2022

(54) SYSTEM, METHODS, AND DEVICES FOR DATA STORAGE AND PROCESSING WITH IDENTITY MANAGEMENT

(71) Applicant: BANK OF MONTREAL, Toronto (CA)

(72) Inventors: Iouri Mikhailov, Aurora (CA); Ching Leong Wan, Toronto (CA)

(73) Assignee: BANK OF MONTREAL, Toronto (CA)

( * ) Notice: Subject to any disclaimer, the term of this patent is extended or adjusted under 35 U.S.C. 154(b) by 399 days.

(21) Appl. No.: 16/517,327

(22) Filed: Jul. 19, 2019

(65) Prior Publication Data

US 2020/0026871 A1    Jan. 23, 2020

Related U.S. Application Data

(60) Provisional application No. 62/700,388, filed on Jul. 19, 2018.

(51) Int. Cl.
  *G06F 21/62* (2013.01)
  *G06F 16/25* (2019.01)
  *G06N 20/00* (2019.01)

(52) U.S. Cl.
  CPC ........ *G06F 21/6218* (2013.01); *G06F 16/258* (2019.01); *G06F 21/629* (2013.01); *G06N 20/00* (2019.01)

(58) Field of Classification Search
  CPC .. G06F 21/6218; G06F 21/629; G06F 16/258; G06N 20/00
  See application file for complete search history.

(56) References Cited

U.S. PATENT DOCUMENTS

| | | | |
|---|---|---|---|
| 7,747,480 B1 * | 6/2010 | Agresta | G06Q 10/06 705/28 |
| 8,224,873 B1 * | 7/2012 | Korablev | G06F 21/604 707/809 |
| 8,433,717 B2 * | 4/2013 | Korablev | G06F 21/6218 707/758 |
| 8,458,230 B2 * | 6/2013 | Korablev | G06F 21/604 707/809 |
| 2008/0060058 A1 * | 3/2008 | Shea | G06F 21/604 726/4 |
| 2020/0026710 A1 | 1/2020 | Przada et al. | |

* cited by examiner

*Primary Examiner* — Hee K Song
(74) *Attorney, Agent, or Firm* — Foley & Lardner LLP

(57) ABSTRACT

Embodiments relate to data storage systems and data processing systems using a data hub, connector grid, and channel services. The systems can extract raw data from a plurality of source systems, and load and store the raw data at a data hub implemented by a non-transient data store. The systems can receive request to generate data for consumption and, in response, transmit generates data sets to channel services. The system can implement event detection and logging. The system can implement policy enforcement and identity management with access controls.

20 Claims, 50 Drawing Sheets

| Decision | CIAM Component Impacted |
|---|---|
| ECIF is a Book-of-Record for customer's Digital Identity. Target state: single Digital Identity per civic identity / individual. | Identity Service |
| ECIF is a Book-of-Record for static roles and entitlements assigned to customers. (Example: John is an "owner" of checking account 111222333). | Role and Entitlement Service |
| Static access profile (i.e. identity attributes, roles, and entitlements) will be consumed by Authorization services / Policy Decision Points via Virtual Identity Image (VII) service, not directly from ECIF. | Static Policy-based Authorization Service |
| Dynamic and/or aggregated entitlements will not be persisted in ECIF and reside in VII's distributed cache only. Example: outstanding daily cash withdrawal limit across multiple accounts | Role and Entitlement Service |
| Credential Store is a Book-of-Record for relationship User ID ↔ ECIF ID.<br>○ ECIF party merge use case can result in multiple User IDs related to the same ECIF party. Business will establish a process of selecting by the customer which User ID will survive.<br>○ History of relationship changes will not be operationally available. It will be fed into IdP for analytical and incident investigation purposes | Credential Service, Authentication Service |
| If Credentials are not migrated to CIAM Credential Store then orchestration between legacy authentication services is done by the Channel tier | Credential Store, Authentication Service |
| Channel API orchestrates separate calls to validate a primary credential (via Authentication Service) and obtain financial snapshot (via Party Arrangement Report service) | Web Access Gateway, Authentication Service |

FIG. 16A

| Risk Factors (existing customers) | Engine | Functional gaps |
|---|---|---|
| Device Fingerprint Authentication: attribute match between incoming and registered device fingerprints<br>• Randomly generated Tag ID and persisted in a cookie (mismatch is a high-risk event)<br>• IP address translated to geo location<br>  • Country (high-risk)<br>  • Region/state (medium-risk)<br>  • City (low-risk)<br>• User agent browser version, OS (medium risk)<br>• User language (medium risk)<br>• Installed plugins (low risk)<br>• Installed fonts (low risk) | ISAM | Risk calculation based on the deviation from customer specific patterns of business transactions. No visibility for malicious device fingerprints known to other FIs. |
| Date/time of session initiation | | |
| Geolocation: proximity to known previous geo coordinates (requires customer's consent) | | |
| IP Reputation, Internet attack patterns (e.g. SQL injections) | ISAM & X-Force DB | |
| Risk factors on the device detected by Trusteer SDK (malware, jail broken) | Trusteer Cloud | |
| Business transaction attack patterns | Trusteer PPCD | Customer specific patterns of authenticated transactions |
| Business transaction categories/patterns unusual for a specific customer when customer is allowed to by-pass strong authentication (see notes). | RSA AA/TM | Visibility of industry-wide attack patterns |
| Risk Factors (prospects) | Engine | |
| Device Fingerprint Authentication: fingerprint match to the ones appeared during attacks to other FIs | Threat Metrix & Transunion | Limitation of authN methods (out-of-wallet Q&As) |

FIG. 18

| | Data | Decision Types |
|---|---|---|
| Web Access Gateway (ISAM) | Primary & Secondary Credentials, Status, Device, Environment ECIF ID, Party-Role-Contract | Sufficiently authenticate a user: initial authN, Level of Assurance elevation if required by transaction type or associated risks, re-authN |
| Channel API | From ISAM: ECIF ID, Party-Role-Contract, Level of Assurance Translation of a Role to a list of Entitlements / Transaction types / Business functions | User is allowed to execute a business function: Permit or Deny to execute a business function dependent on role-to-account association |
| Service Gateway | From ISAM: ECIF ID, Party-Role-Contract | User is allowed to execute business function on related accounts with allowed limits. |
| Product System | | Transaction is allowed by product configuration and does not exceed limits |

FIG. 24

| Use Case | ISAM | Channel API | SmartCore | Product System |
|---|---|---|---|---|
| View Account Balances | Transaction risk is low. Trust primary credential. Input: - URL & HTTP method, e.g. POST /api/can-banking/customer/interac/* - primary credential attributes (ECIF-ID, active/locked) | User "Joe" is "owner" of acct1, acct2 and is allowed to view those balances. Input: ECIF-ID from ISAM, party-role-contract from Channel distributed cache | User "Joe" is an "owner" of acct1 and acct2 and can execute any operation on them. Input: ECIF-ID from Channel API, party-role-contract from VH | N/A |
| Submit Interac Transfer from acct1 | Transaction risk is medium. Trust primary credential if device & environment risks are low. Otherwise require stronger credential. Input: same as above plus: device fingerprint, environment, party profile (which stronger credential is registered). (Optional) payload inspection | User "Joe" is "owner" of acct1 and is allowed to perform Interac Transfer from it. Input: same as above plus: cached translation list from ECIF entitlement list from ECIF | User "Joe" is an "owner" of acct1 and can execute Interac Transfer from it for the amount less than $1000 daily. Input: same as above | Daily transfer limit on acct1 is not exceeded. acct1 is allowed to perform the transaction. Input: financial transaction info |
| Submit Wire Transfer from acct1 to 3rd party bank (one-time transaction) | Transaction risk is high ( not "normal"). Require stronger credential. Input: same as above, RSA TM risk score based on payload | User "Joe" is "owner" of acct1 and is allowed to perform Wire Transfer from it. Input: same as above. | User "Joe" is "owner" of acct1 and is allowed to perform Wire Transfer from it for the amount less than {same limit}. Input: same as above. | Similar to the above |
| Submit Wire Transfer from acct1 to 3rd party bank (every month) | Transaction risk is medium. Trust primary credential or previous step-up if device & environment risks are low. Otherwise require stronger credential. Input: same as above | Same as above | Same as above | Same as above |
| Change primary credential or parameters of stronger credential | Transaction risk is high. Require stronger credential Input: same as above, except no payload inspection, and no calls to RSA TM | Permit if ISAM sends info about successful step-up – authentication-level is high (injected by API Connect). | Permit if step-up was successful (injected by API Connect) | N/A |

FIG. 25

Enrollment

Secret Key is randomly generated and unique for each customer. Stored in CIAM Credential Store QR Code is generated from secret key on BMO Self-service Channel Customer scans QR code by BMO Mobile App BMO Mobile App starts generating OTP every minute

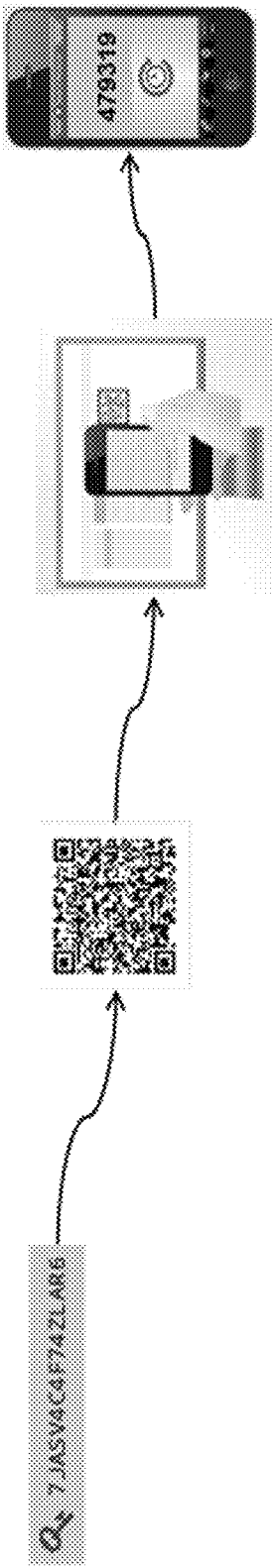

Use (no cellular or Wi-Fi connection is required for smart phone)

Customer is requested to step-up and is displayed pre-registered choices of the 2nd factor method:

- Software Token
- Mobile Push
- Biometric

Customer chooses "Software Token" method and types in the OTP generated by BMO Mobile App

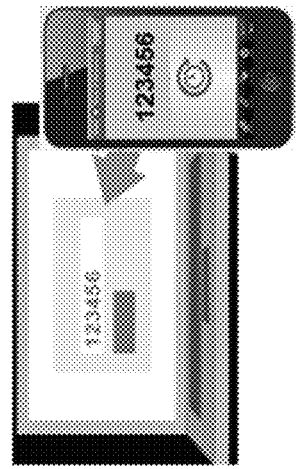

FIG. 27

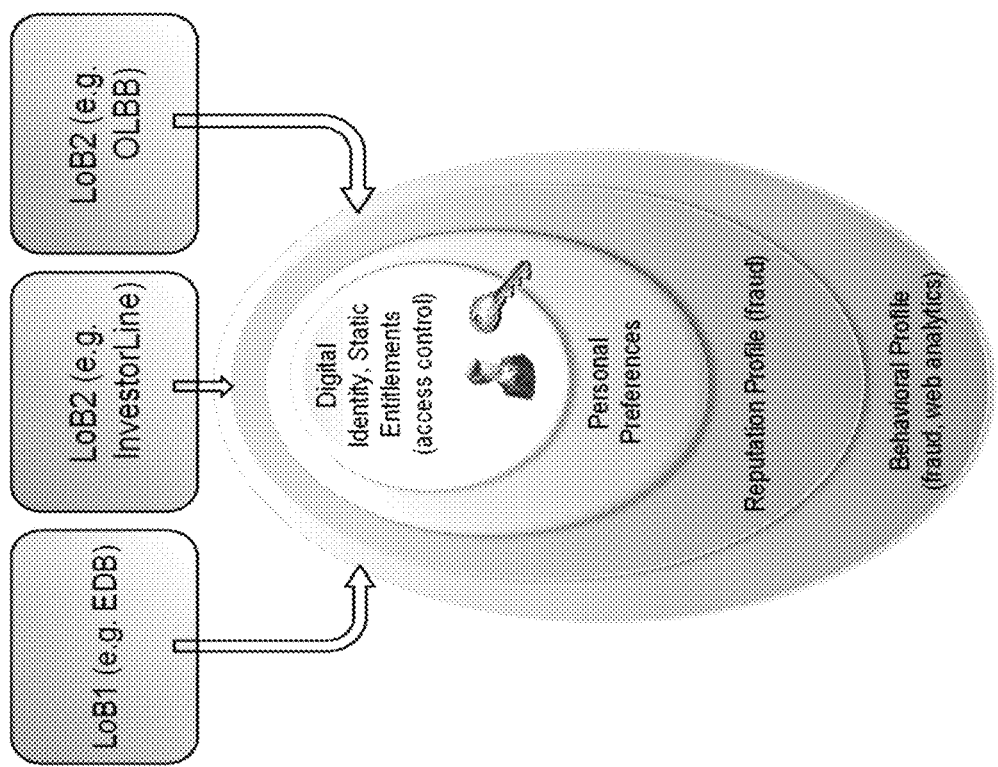
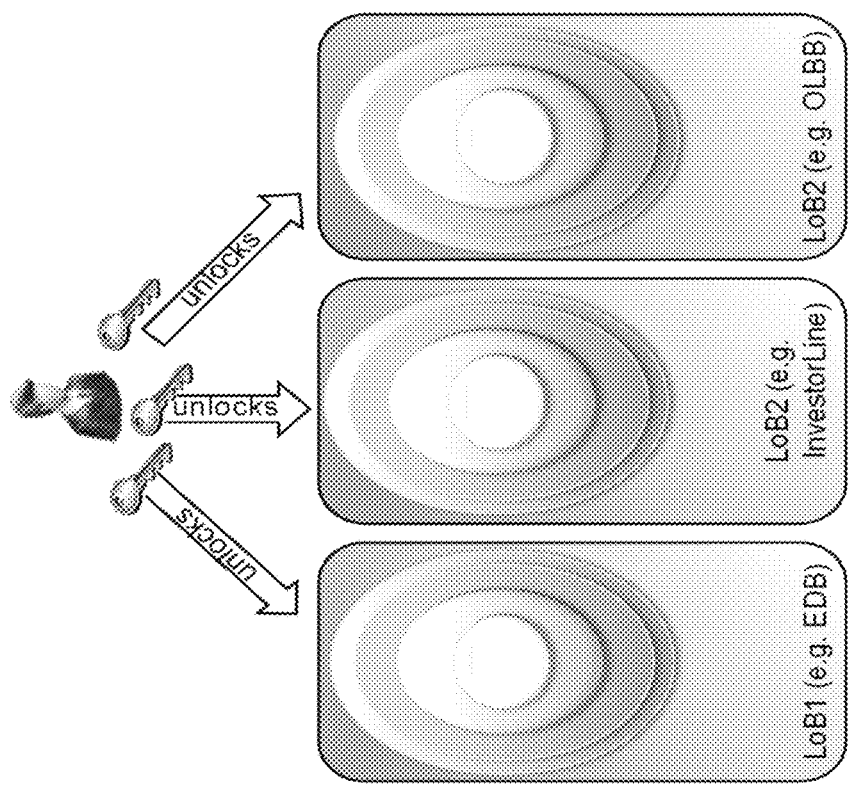
FIG. 37

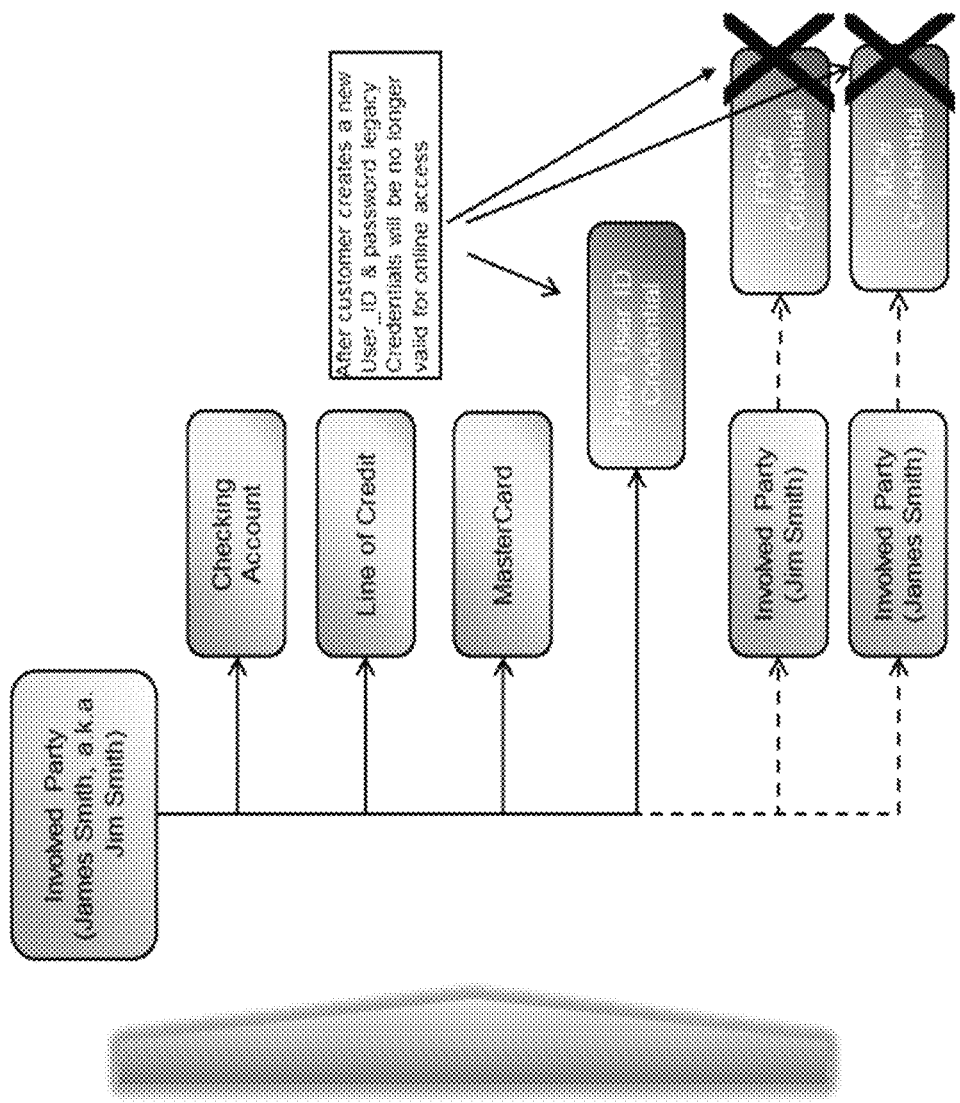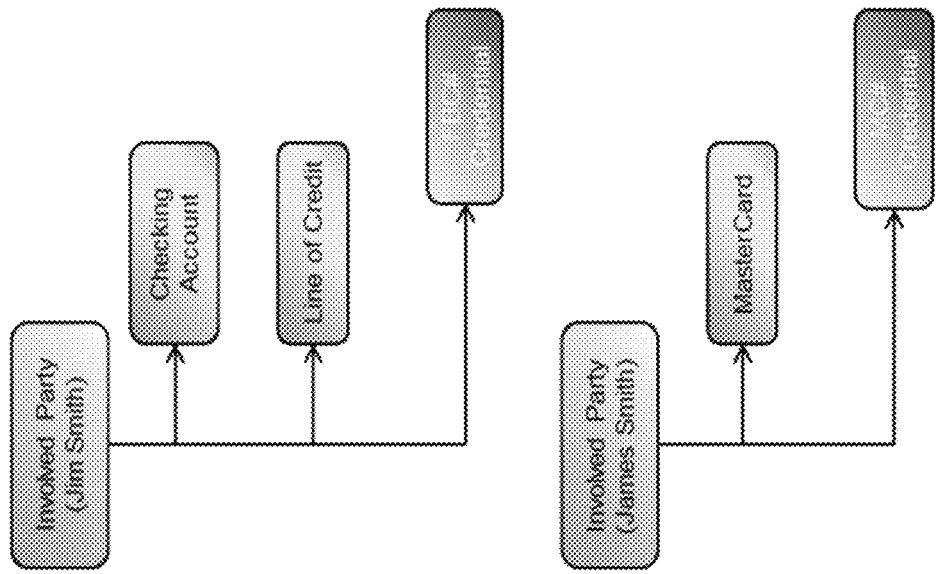
FIG. 38

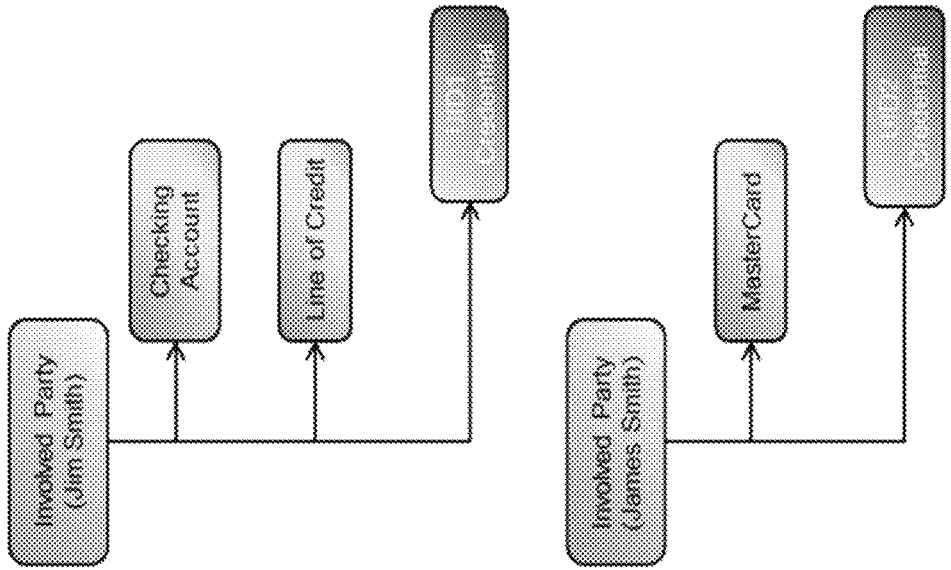
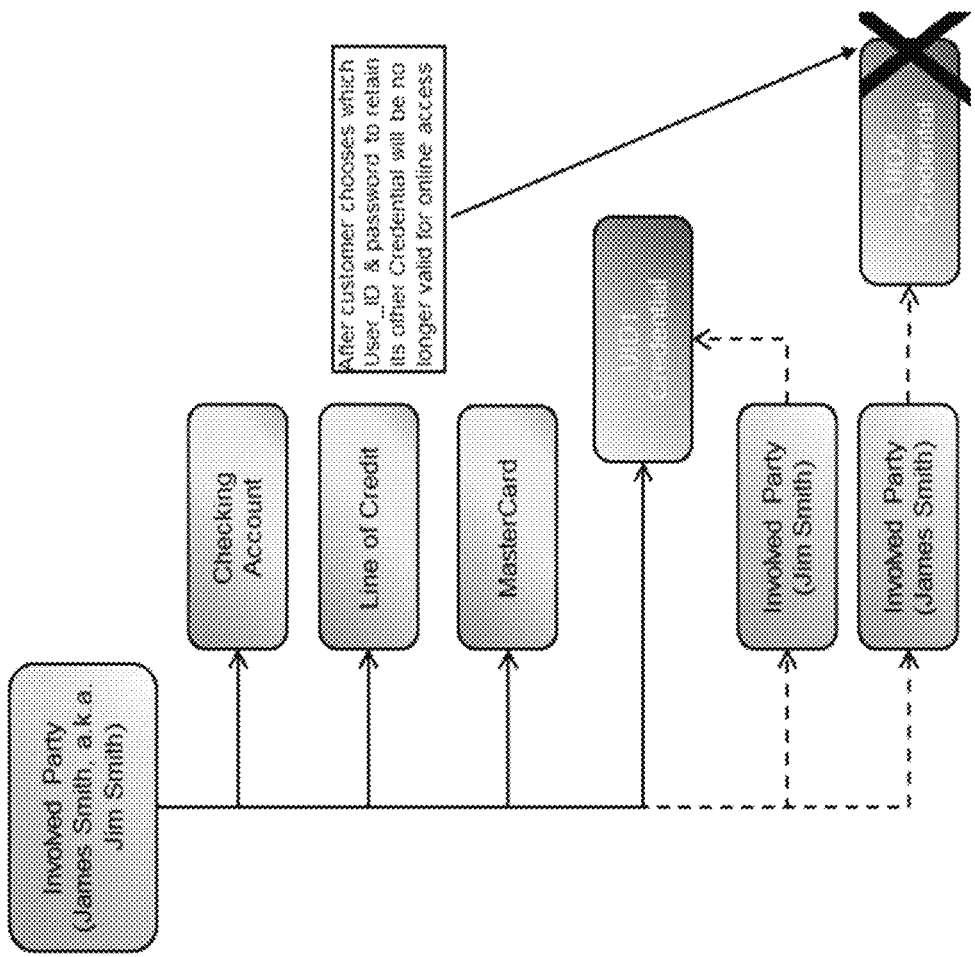
FIG. 39

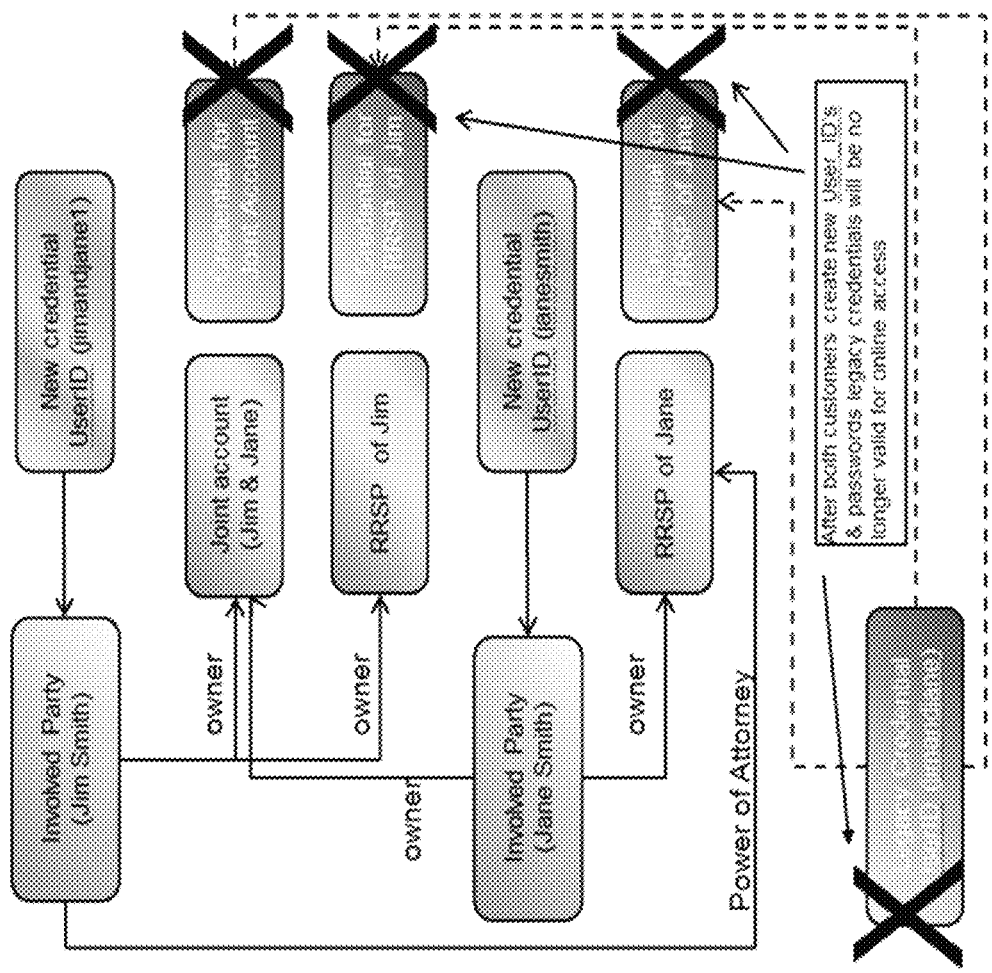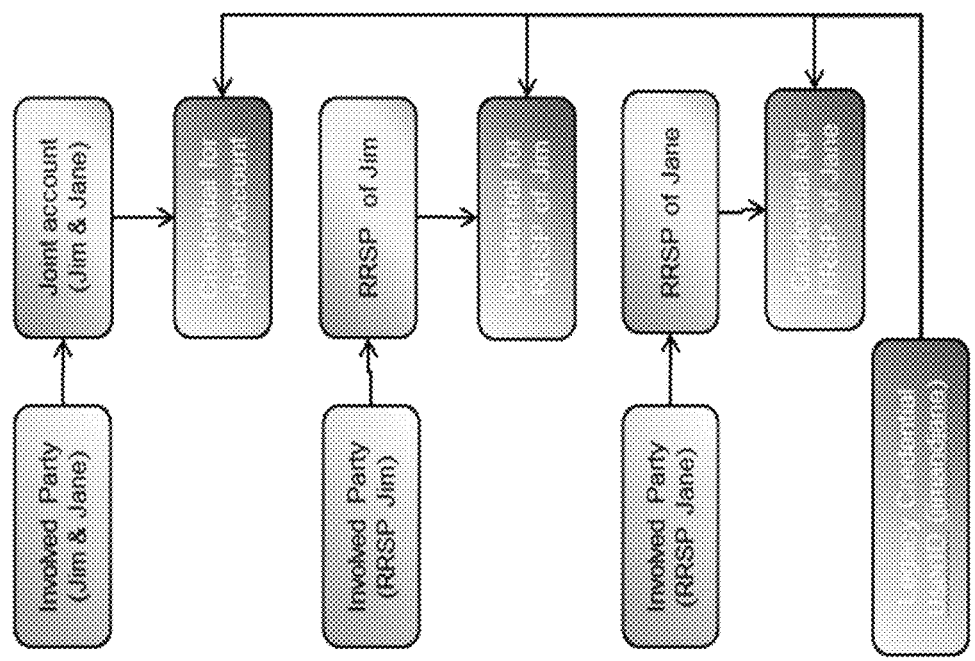
FIG. 40

SYSTEM, METHODS, AND DEVICES FOR DATA STORAGE AND PROCESSING WITH IDENTITY MANAGEMENT

CROSS REFERENCE TO RELATED APPLICATION

This application claims priority to U.S. Provisional Application No. 62/700,388 entitled SYSTEM, METHODS, AND DEVICES FOR DATA STORAGE AND PROCESSING WITH IDENTITY MANAGEMENT, the contents of which is hereby incorporated by reference. This application relates to U.S. application Ser. No. 16/517,253 entitled SYSTEMS AND METHODS FOR DATA STORAGE AND PROCESSING, the contents of which is hereby incorporated by reference.

FIELD

The present disclosure generally relates to the field of data storage systems and processing.

INTRODUCTION

A full-service financial service institution depends heavily on the use of technology to serve customers with a wide range of products and services. In addition, technology is used to meet stringent risk management and regulatory compliance.

An organization with a long history typically has adopted a myriad range of technologies from legacy platforms like mainframe to modern capabilities like mobile and analytic applications. An organization might have a large set of applications (many hundreds) through acquisition and integration.

To continue to deliver differentiating customer experience and transformation to keep pace or leap-frog competitors, both traditional and disruptive ones, an institution needs to be able to effectively and efficiently integrate the complex and diverse set of applications. An integrated enterprise not only forms the foundational capability to deliver any product and service across different channels, it also enables the ability to identify events and generates actionable insights to become an intelligent institution.

SUMMARY

In accordance with an aspect, there is provided systems and methods for identity and access management. Systems and methods can provide for authentication and authorization along with access control for business function and data. In some embodiments, Customer Identity and Access Management (CIAM) system provides an enterprise credential store per customer. The credential(s) can be used to identify the customer through cross-referencing with the Enterprise Customer Information Facility (ECIF). This in turn can map to the application functions and data entitlement and CIAM can perform the access enforcement at multiple layers of the architecture accordingly. In addition to being integrated with ECIF and the various architecture layer, CIAM also support integration to other credential functions, such as biometric credential, and other authentication flow, such as step-up multi-factor authentication.

In accordance with an aspect, there is provided systems and methods for identity and access management that involves receiving enterprise credentials (e.g. an organization identifier). An organization can use one credential for the different channels or can use multiple credentials. The system can map credentials back to an identity (e.g. password can be a credential that can link to a customer identity). There can be multiple credentials that can link back to same identity. In some embodiments there can be different credentials for same identity. The system can involve enforcement of credentials or access controls. For example, a customer can be allowed to use the application and access controls can control which functions within the application that the customer is authorized for. The controls can indicate whether the customer needs to provide more information to use protected functions within an application. For example, in a bank a wire payment over $1M may trigger the need to provide higher level authentication data or additional credential data (e.g. one time code). It can indicate the type of required credential data which can vary depending on application function. The access controls also indicate data entitlement. The system can integrate with different channels and different types of authentication systems such as biometric and device fingerprint. The system can capture event data related to use of credentials or activity otherwise like to the enterprise identity to generate insights relevant to identity management (e.g. how many log ins for an enterprise credential). The control mechanism that can define control of the protected function can be policy and/or risk based. Policy based means control is determined by business rules. (e.g., wire payment over $1M). Risk based can refer to contextual usage based on data accessed by the system (e.g., if the user is logging in from suspicious geographic location (system can detect based on IP address range or if the user device is reported to be stolen (there are global providers of this information that an organization has subscribed to).

In accordance with an aspect there is provided a system for identity and access management. The system has a processor and a non-transient data memory storage. The processor configured to load and store raw data from a plurality of source systems at a data hub implemented by a non-transient data store. The processor can receive a request for an application and data at the data hub, the request indicating an enterprise credential, the application having application functions. The processor can map the enterprise credential to an enterprise identity managed by an Enterprise Customer Information Facility. The processor can, in response to the request, select a set of data from the raw data based on the enterprise identity. The processor can verify the request and the set of data against one or more access controls linked to the enterprise identity, the access controls indicating data entitlement and application functions. The processor can transform the selected set of data into an enterprise data set. The access controls can control, at an interface, interactions with the application functions. The processor can transmit, to the interface, the enterprise data set based on data entitlement.

In some embodiments, the processor receives and stores event data linked to the enterprise credentials or enterprise identity.

In some embodiments, the enterprise credentials has a device fingerprint.

In some embodiments, the enterprise credentials comprise biometric data.

In some embodiments, the application functions comprise a protected function, wherein control of the protected function comprises prompting for additional enterprise credentials prior to permitting access to the protected function.

In accordance with an aspect, there is provided systems and methods for processing data, involving at least a processor and a non-transient data memory storage, the data memory storage containing machine-readable instructions for execution by the processor, the machine-readable instructions configured to, when executed by the processor, provide an information delivery platform. The information delivery platform can be configured to extract raw data from a plurality of source systems; load and store the raw data at a data hub implemented by a non-transient data store; receive a request to generate data at the data hub, the request indicating an enterprise identity; in response to the request, select a set of data from the raw data based on a data map, the enterprise identity, and one or more access controls linked to the enterprise identity; transform the selected set of data into an enterprise data set based on the data map and the enterprise identity; and transmit the enterprise data set.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

In the figures, which depict example embodiments:

FIG. 16A lists example architecture components for CIAM.

FIG. 18 shows example Risk Factors & Device Fingerprint Authentication.

FIG. 24 shows example policy decision and entitlement placement.

FIG. 25 lists example uses cases, decision points and entitlements of CIAM.

FIG. 27 shows example authentication process of software token in accordance with one embodiment.

FIG. 37 shows example consistent and secure customer experience using authentications.

FIG. 38 shows example conceptual data model for online credentials.

FIG. 39 shows another example conceptual data model for online credentials.

FIG. 40 shows yet another example conceptual data model for online credentials.

DETAILED DESCRIPTION

Figure 1A:
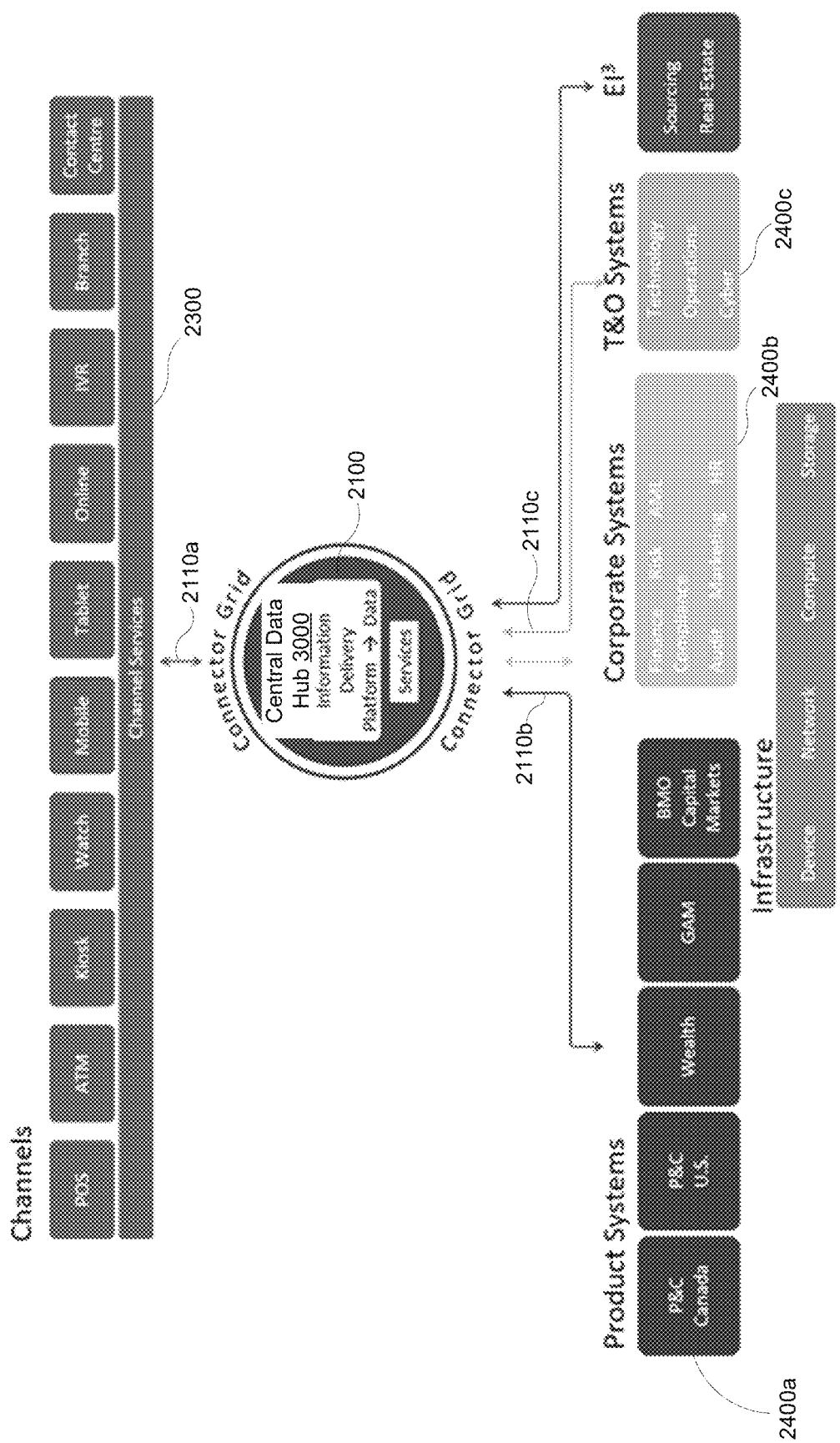
FIG. 1A is an enterprise system architecture diagram of a proprietary Information Delivery Platform (IDP).

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Embodiments described herein provide systems and methods for identity management. Identity and credential management can integrate with an information delivery platform (IDP) that provides processing tools for an enterprise data fabric with a central data and a consolidated book of record data and advanced analytics including machine learning. Large and complex organizations rely heavily on the use of large volume and variety of data for business operation and insights. To manage and transform the ecosystem for an organization, the IDP provides a platform to collect and aggregate critical data from the large amount of business applications to serve as a single efficient repository for various consumers (human or system). IDP has been built with a standard efficient mechanism to ingest data. Data is then stored and transformed based on consumption pattern to facilitate usage. As part of the IDP platform, a set of analytic tools are carefully integrated to generate insights and analytical models. Trained models can then be integrated to the real-time transaction flow as part of the overall integration capability. In addition to housing the data, IDP also provides the computing power to support the processing of data within IDP. This Bring-Processing-to-Data instead of moving data to where processing is required has significant performance and efficiency advantage especially when large volume of data is involved. IDP can integrated with identity and access tools in order to provide customer specific data. Credentials can be mapped to customer identifiers. The customer identifiers can be provided to IDP to identify a set of data relevant to the customer, for example.

In accordance with an aspect, there is provided systems and methods for identity and access management. Systems and methods can provide for authentication and authorization along with access control for business function and data. In some embodiments, CIAM system provides an enterprise credential store per customer. The credential(s) can be used to identify the customer through cross-referencing with the ECIF. This in turn can map to the application functions and data entitlement and CIAM can perform the access enforcement at multiple layers of the architecture accordingly. In addition to being integrated with ECIF and the various architecture layer, CIAM also support integration to other credential functions, such as biometric credential, and other authentication flow, such as step-up multi-factor authentication.

In accordance with an aspect, there is provided systems and methods for identity and access management that involves receiving enterprise credentials (e.g. an organization identifier). An organization can use one credential for the different channels or can use multiple credentials. The system can map credentials back to an identity (e.g. password can be a credential that can link to a customer identity). There can be multiple credentials that can link back to same identity. In some embodiments there can be different credentials for same identity. The system can involve enforcement of credentials or access controls to control access to functions and/or data. For example, a customer can be allowed to use the application and access controls can control which functions within the application that the customer is authorized for. The controls can indicate whether the customer needs to provide more information to use protected functions within an application. For example, in a bank a wire payment over $1M may trigger the need to provide higher level authentication data or additional credential data (e.g. one time code). It can indicate the type of required credential data which can vary depending on application function. The access controls also indicate data entitlement. The system can integrate with different channels and different types of authentication systems such as biometric and device fingerprint. One or more credentials can be received by system in order to enable access to functions and/or data. The system can capture event data related to use of credentials or activity otherwise like to the enterprise identity to generate insights relevant to identity management (e.g. how many log ins for an enterprise credential). The control mechanism that can define control of the protected function can be policy and/or risk based. Policy based means control is determined by business rules. (e.g., wire payment over $1M). Risk based can refer to contextual usage based on data accessed by the system (e.g., if the user is logging in from suspicious geographic location (system can detect based on IP address range or if the user device is reported to be stolen (there are global providers of this information that an organization has subscribed to). Accordingly, the system can maintain a set of required credentials for different application functions. Some application functions can be considered protected function in that their specific credential requirements to access the protected function. As noted, this may be based on the access controls that can define rules for policies and contextual factors.

Embodiments described herein may reduce the financial cost of data aggregation and consumption and provide technical improvements. Network bandwidth may also become a constraint for data communication between an enterprise data system and external systems, as well as in/out of the landing zone for batch data transmission for the enterprise data system. In addition, embodiments can be for capturing and maintaining accurate data lineage.

There may be no "balance and control" or enterprise-level reconciliation patterns or models for data stored within a traditional enterprise data system. This may be the case if the enterprise data system serves as a book-of-reference and not a book-of-record. However, there is growing need for enterprise reconciliation or balance and control capabilities and patterns.

Improving ease of understanding of the data glossary and relationship between data/sources is needed to support self-serve data science initiatives.

Bank processes require low cost, easy to access, reliable and consistent data. These process include but are not limited to: anti money laundering compliance, regulatory and compliance reporting, risk management, customer insights, sales performance management and channel optimization.

Embodiments described herein provides identity management integrated with an IDP that incorporates new technology components and a new operating model that optimizes the accountabilities for data quality and information management. This platform may provide improved information management capability to meet the rapidly increasing demand for low cost, easy to access, reliable and consistent data.

Referring now to FIG. 1A, which illustrates a system architecture diagram of an example I core storage and processing system or "SmartCore" 2100 (which consist of the CIAM capability and also include IDP) with Channels 2300, Product Systems 2400a, Corporate Systems 2400b and T&O (Technology and Operation) Systems 2400c.

In an example embodiment, SmartCore 2100 (which may also be referred to as its component IDP) is a data aggregation, processing, and analytics environment, combining multiple sources of data into a single organization-wide repository, and providing fast and cost-effective access to data.

By way of illustrative example, an organization such as a bank can use IDP 2100. However, it should be appreciated that the organization can be any type of organization or company that requires storage and processing of data for daily operations. For example, the organization can be a government entity, a law firm, a school, a store, or a restaurant, and so on.

IDP 2100 can provide more data in less time and can be used to provide data to applications after authorization of the credentials. IDP 2100 can link data to customers using tags or metadata attributes. IDP 2100 provides users with a high performance platform for processing queries. IDP 2100 can have built in data quality management, high availability and disaster recovery. IDP 2100 can use an innovative operating model that provide subscriber businesses a direct CIO accountability to ensure their specific needs are met. It may provide the opportunity to eliminate data sprawl by eliminating the motivations to create redundant and overlapping data marts. IDP 2100 may provide the following benefits: CIO accountability model means conversations about sourcing data, its content and it's quality take place directly between the owners of the source systems and the consumers of the data; high performance, cost efficient staging platform means improved query performance and lower costs for accumulating low level detail data; data quality management means problems in the source data are identified early and actively managed; consumer driven data model means the integrated database structures are presented in simple, business friendly terminology; and provides for self-serve data usage.

IDP 2100 is a shared information management component of an Analytical/Data Hub that can provision well managed data to meet multiple reporting and analytical requirements quickly and efficiently. IDP 2100 can use an innovative operating model that leverages the strengths of all stakeholders and eliminates unnecessary hand offs. IDP 2100 can be is built from the ground up to meet the requirements of regulators and business process that demand on-going demonstration of data quality management and proof that the data is an accurate and complete representation of reality. IDP 2100 can present data to the business community using industry and bank terminology. IDP 2100 can provide the opportunity to eliminate data sprawl by eliminating the motivations to create redundant and overlapping data marts. IDP 2100 may provide robust, highly resilient infrastructure, DR (Disaster Recovery), high performance as most queries and loads run in a fraction of the time of existing platforms, easy tracking of data assets under management, data stewardship and data governance, data quality management and reporting capability, and data in cross application integrated (L2) model.

In one example embodiment, central data hub 3000 includes IDP 2100. In one embodiment, the IDP 2100 may include a scalable data store (also referred to as a "data lake"), which may collect and store massive amounts of data for long periods of time. The data stored may be structured, semi-structured, unstructured, or time-sensitive data (e.g. events, etc.). A central aggregation and distribution point ("book of reference") may be generated for all book-of-record data within the bank, which provides consistent and efficient access to reference data. Both raw and processed data within the data lake may be available for consumption; powering analytics; machine learning; consumer-specific data accessible via batch, SQL, streaming, native Hadoop APIs. Linear scalability of data is also provided.

In some embodiments, IDP 2100 is connected to channel services 2300 through connector grid 2110a and connected to product systems 2400a, corporate systems 2400b and T&O systems 2400c through connector grids 2110b and 2110c.

Channel services 2300 may include internal or external interfaces adapted for different service groups, such as Point-of-Sale (POS) terminals, watch interfaces, mobile devices, tablet devices, online portals, ATMs, branches, call centers, sales forces, and so on. Each of these service group may receive and utilize data from IDP 2100 through connector grid 2110a. Each channel may have a user interface designed to display various data and information and to receive user inputs.

Across channels 2300, customer information is captured consistently at all points of collection for all LOBs and channels, aligned to standards defined for the Enterprise Customer Domain. A single view of customer information and aggregate view of customer holdings can be displayed on channels, in real-time or near real-time, and on demand if necessary.

In addition, product systems 2400a, corporate systems 2400b and T&O systems 2400c may also receive and utilize data from IDP 2100 through connector grids 2110b, 2110c.

IDP 2100 may receive raw data from a variety of data sources. Data sources include, among others:

Book of record transaction systems (BORTS)
Clickstreams (web-logs)
Social media
Server/machine logs
Unstructured data
Real-time event streams Raw data may be received and stored into a staging area. The staging area may be part of a "data lake" foundation from which groups across the organization can draw needed data. This staging area may be also referred to as "level 0 (L0)" data storage.

For example, when the organization is a bank, different groups may utilize data from the data lake. The groups may include: AML (Anti-Money Laundering), regulatory organizations, industry associations, Enterprise Customer Information (ECIF) Canada and U.S., Leads, Leads, bank TF, LRM/SMR, U.S. Heightened Standards, Enterprise Wire Payments, LOB (Line of Business) Scorecards, Corporate Audit Analytics, Fraud/Criminal Risk Investigation, Legacy Data Marts Simplification.

IDP 2100 may be the foundation for the overarching data environment, combining multiple sources or book of record transaction systems (BORTS) into a single organization-wide repository and provides fast and cost-effective access to both raw and conformed data.

Figure 1B:
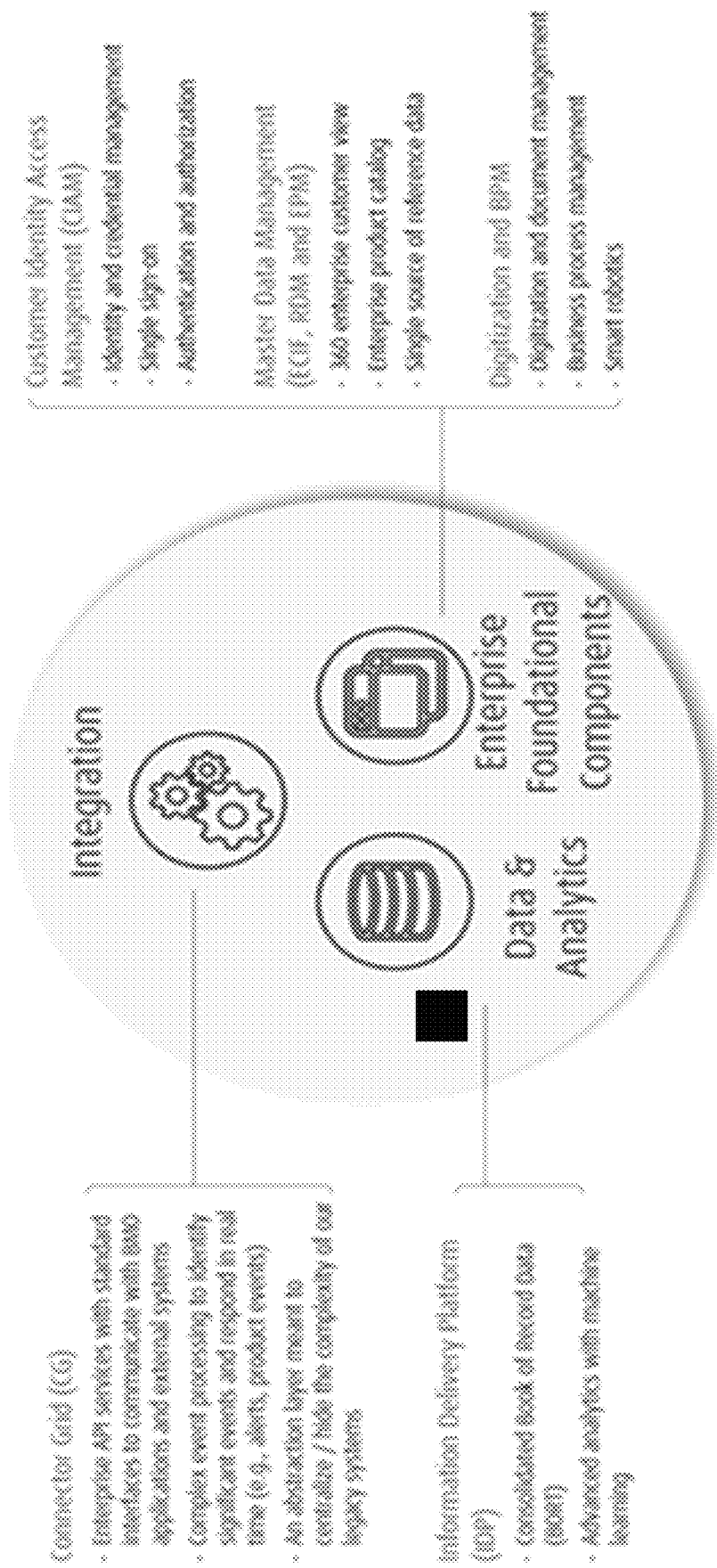
FIG. 1B is a view of components of a data storage and processing system including IDP.

FIG. 1B is a view of components of a core data storage and processing system. The system includes an integration component, data and analytics component, and enterprise foundational components. The core system has a connector grid. The connector grid provides enterprise API services with standard interfaces to communicate with applications and external systems. The data and analytics component has a consolidated Book of Record Data (BORT) and advanced analytics with machine learning. The core system includes IDP, the connector grid, and other components.

The enterprise foundational components include CIAM for identity and credential management. CIAM enables single-sign on for application function and data access with authentication and authorization. The enterprise foundational components include Master Data Management components ECIF, RDM, and EPM to provide a 360 degrees, holistic view of customer data. The Master Data Management components have an enterprise product catalog. The Master Data Management components provide a single source of reference data. The enterprise foundational components include digitization and business process management for digitization and document management with smart robotics.

Figure 2:
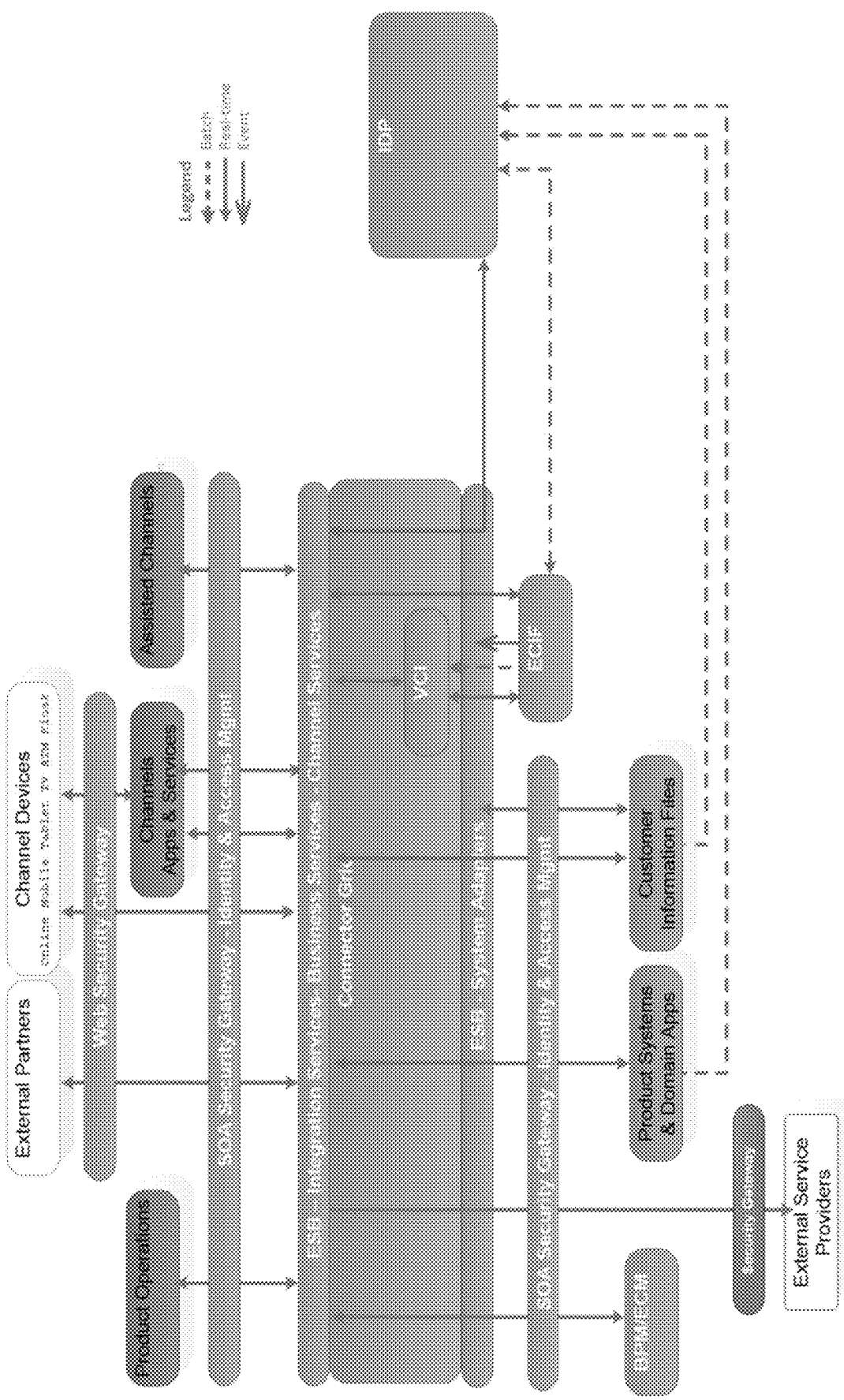
FIG. 2 is a schematic diagram of an architecture of a hub system including the IDP of FIG. 1.

FIG. 2 depicts an example hub system 3000 architecture according to some embodiments. In some embodiments, the example hub system includes various layers of connectivity implemented by one or more protocols or standards for communication and data exchange.

FIG. 2 shows security gateway with identity and access management. The gateway can receive a request for an application and data. The request can indicate an enterprise credential. A processor can map the enterprise credential to an enterprise identity managed by ECIF. The processor can, in response to the request, connect with IDP for data access to a set of data from the raw data based on the enterprise identity. The processor can verify the request and the set of data against one or more access controls linked to the enterprise identity. The access controls can indicate data entitlement and application functions. The processor can transform the selected set of data into an enterprise data set. The access controls can control, at an interface, interactions with the application functions. The processor can transmit, to the interface, the enterprise data set based on data entitlement to external partners and channel devices.

The channel devices and external partners can generate the initial request for application and data access. The credentials may be validated via the security gateway. The credentials can be received at the connector grid and mapped to the customer identity, such as by a Virtual Customer Image (VCI) Component that can include mappings of different identification data to different types of credentials. The connector grid interacts with ECI and IDP to identify data linked to the enterprise identity. The data may come from customer information files in different applications. Access controls can define data entitlement an application functions that are permissible based on the provided credentials. Advanced application functions may require additional credentials before access is granted.

Embodiments described herein can include a DR environment that can have the same number of admin, compute and edge nodes as a production environment.

Embodiments of an example Enterprise Architecture or Hub Architecture are described in the context of a bank environment. However, it should be appreciated that the environment can be any type of organization or company or context. This architecture can help build a stronger and more competitive bank, focused on execution and delivery.

Figure 3:
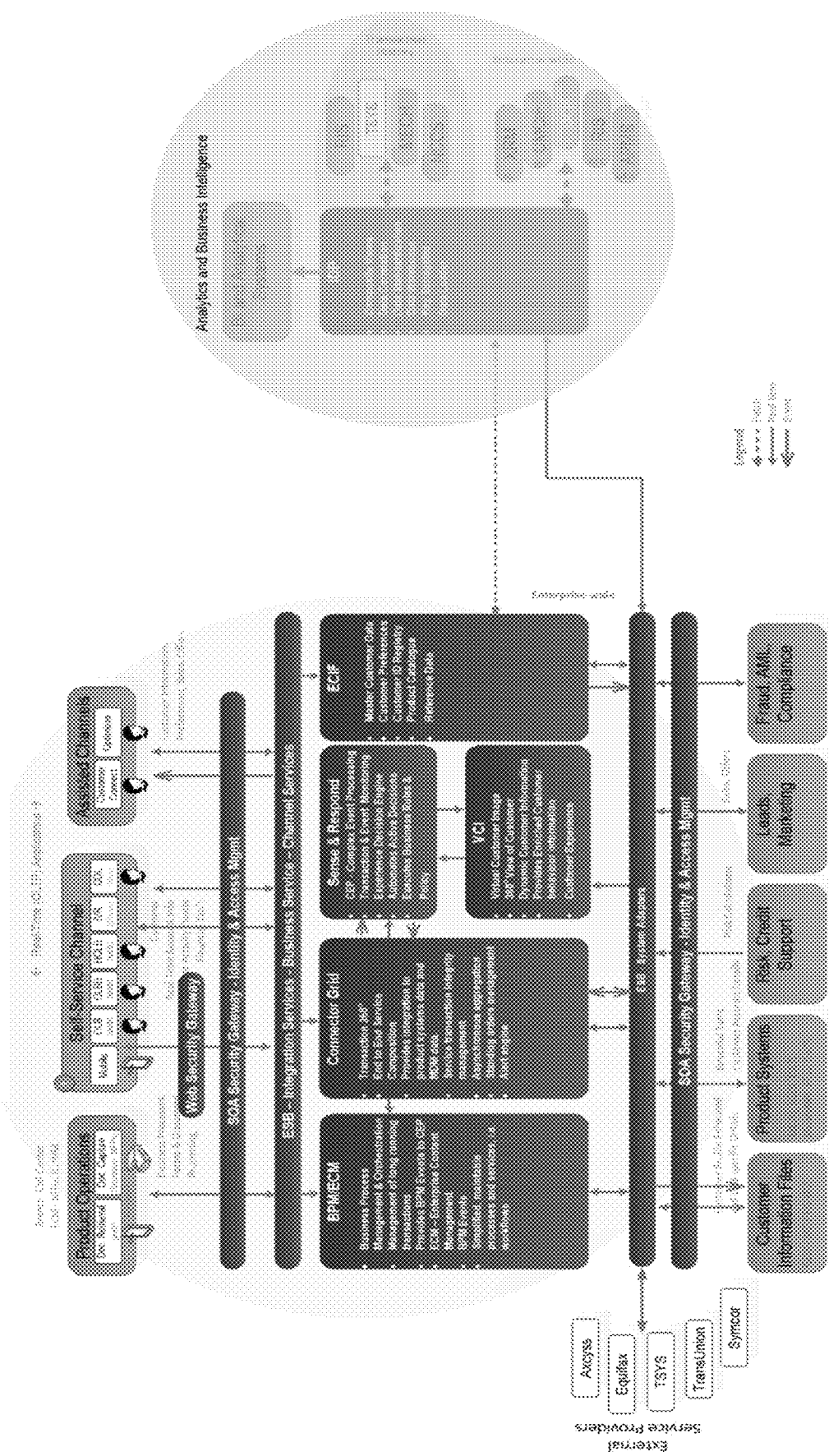
FIG. 3 is a schematic diagram of an architecture of a hub system including the IDP of FIG. 1.

FIG. 3 depicts an example architecture blueprint according to some embodiments. One or more business capabilities are enabled by the IDP 2100 or hub 3000. An example capability includes compiling a dynamic data set representing customer information that can involve an enterprise customer identifier, a 360 customer view, customer and account information, customer preference, customer relationships, and house-holding.

Another example capability includes managing business processes that can involve process integration and management, paperless processing, e-Signature, and document management.

Another example capability includes application integration, which can involve service integration to reduce complexity and increase reuse and agility, as well as provide faster time to market.

Another example capability includes identity management, which can provide single sign-on, risk-based authentication, user identity management, and role based access.

Another example capability includes real-time intelligence, which can provide sense and respond capabilities for customer experience, as well as revenue opportunities and fraud applications.

Another example capability includes data and analytics, which can provide a holistic view of customer, transaction, account, market, and reference and processed data, as well as improved data foundation and governance.

In some embodiments, the example architecture can include one or more product operations units, self-service channels, and assisted channels. The example architecture can include a web security gateway; SOA security gateway; integration, business, and channel services; business process management (BPM) and enterprise content management (ECM) units; connector grids; sense and respond units; virtual customer image units; system adaptors; and ECIF units. The example architecture can provide connectivity between these components and with customer information files, product systems, risk and credit support, leads and marketing and fraud, AML, and compliance units.

Referring back to FIG. 3 there is shown an example logical architecture for a hub system 3000. In some embodiments, a BPM/ECM unit can provide business process management and orchestration, management of long running transactions, BPM events to CEP, enterprise content management, BPM events, and simplified, maintainable processes and services i.e., workflows. A connector grid unit can provide business transaction data, end to end service composition, integration to product systems data and MDM data; service transaction integrity management, asynchronous aggregation, standing orders management, and an alert engine. A sense and respond unit can provide complex event processing (CEP), transaction and event monitoring, one or more experience decision engines, automation of active decisions, and execution of business rules and policy. A virtual customer image unit can provide a 360 degree view of a customer, dynamic customer information, enriched customer behaviour information, and customer experience units. An ECIF unit can provide management of master customer data, customer preferences, a customer ID registry, a product catalogue, and reference data. Data and application requests can be received from different channels and process at security gateway based on credentials provided in the request. The credentials are mapped to customer identifiers. ECIF can be used to generate a subset of data based on the customer identifiers. The channels can have access to the subset of data at an interface and can interact with different application functions based on access controls.

Figure 4:
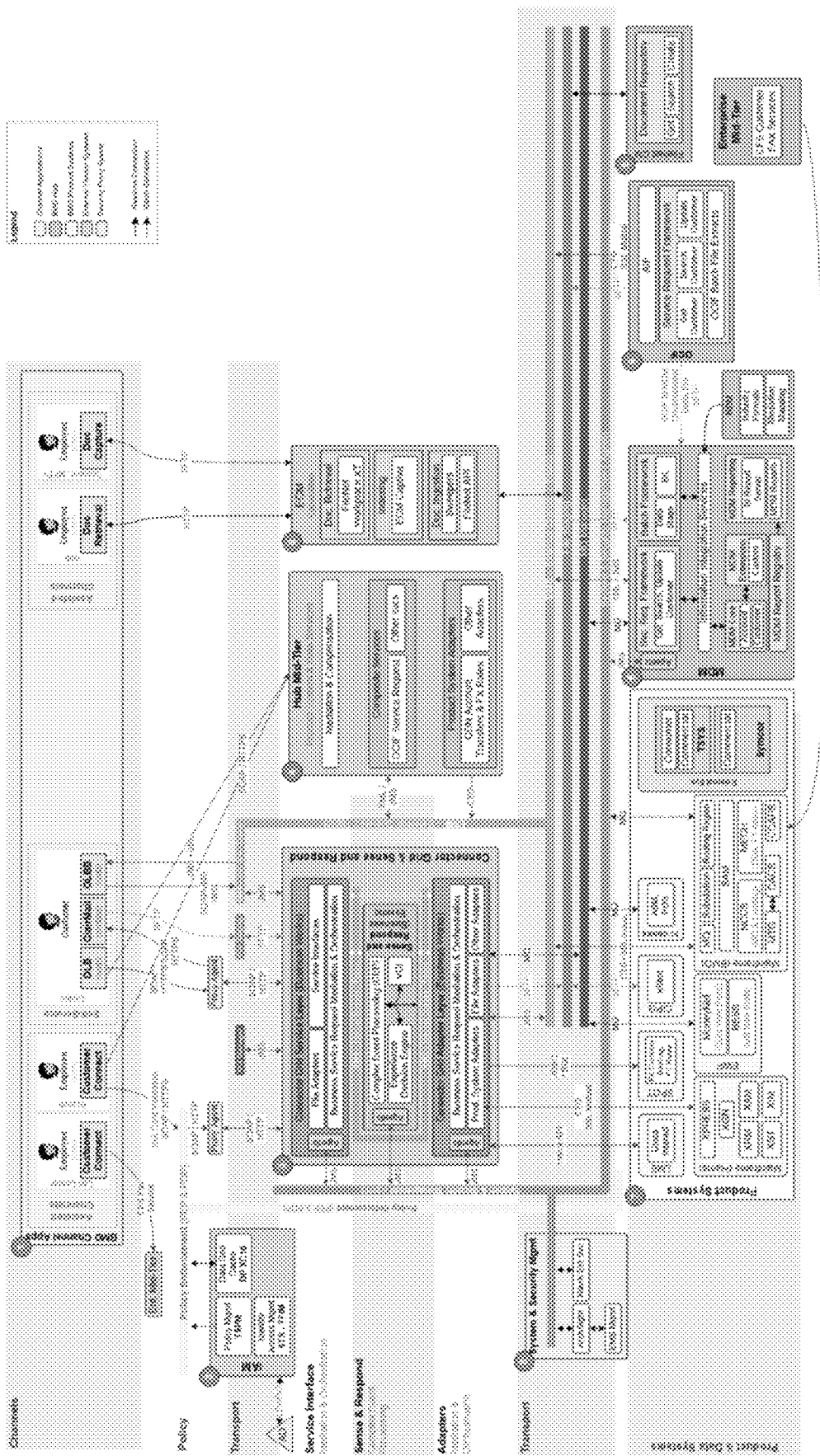
FIG. 4 is a schematic diagram of an architecture of a hub system including the IDP of FIG. 1.

FIG. 4 depicts an example technical view of a hub system 3000 architecture. In some embodiments, the hub system 3000 includes multiple layers of data flow and processing. As depicted, an example ordered layered architecture includes the following layers: channel, policy, transport, service interface, sense and respond, adapters, transport, and product and data systems.

In some embodiments, the channel layer can include bank channel apps and assisted channels. The policy layer can include policy enforcement. The transport layer can include IAM. Each of the service interface (e.g., for mediation and orchestration), sense and respond layer (e.g., complex event processing), and adapter layer can include processes carried out by a connector grid and sense and respond unit; hub mid-tier unit; and ECM unit. A second transport layer can include processes carried out by a system and security management unit. A product and data systems layer can include processes carried out by a product systems unit, MDM unit, OCIF unit, FileNet CM unit, and enterprise mid-tier unit.

Various protocols and standards (e.g., as depicted) can be used by the example architecture to facilitate connectivity and function.

Figure 5:
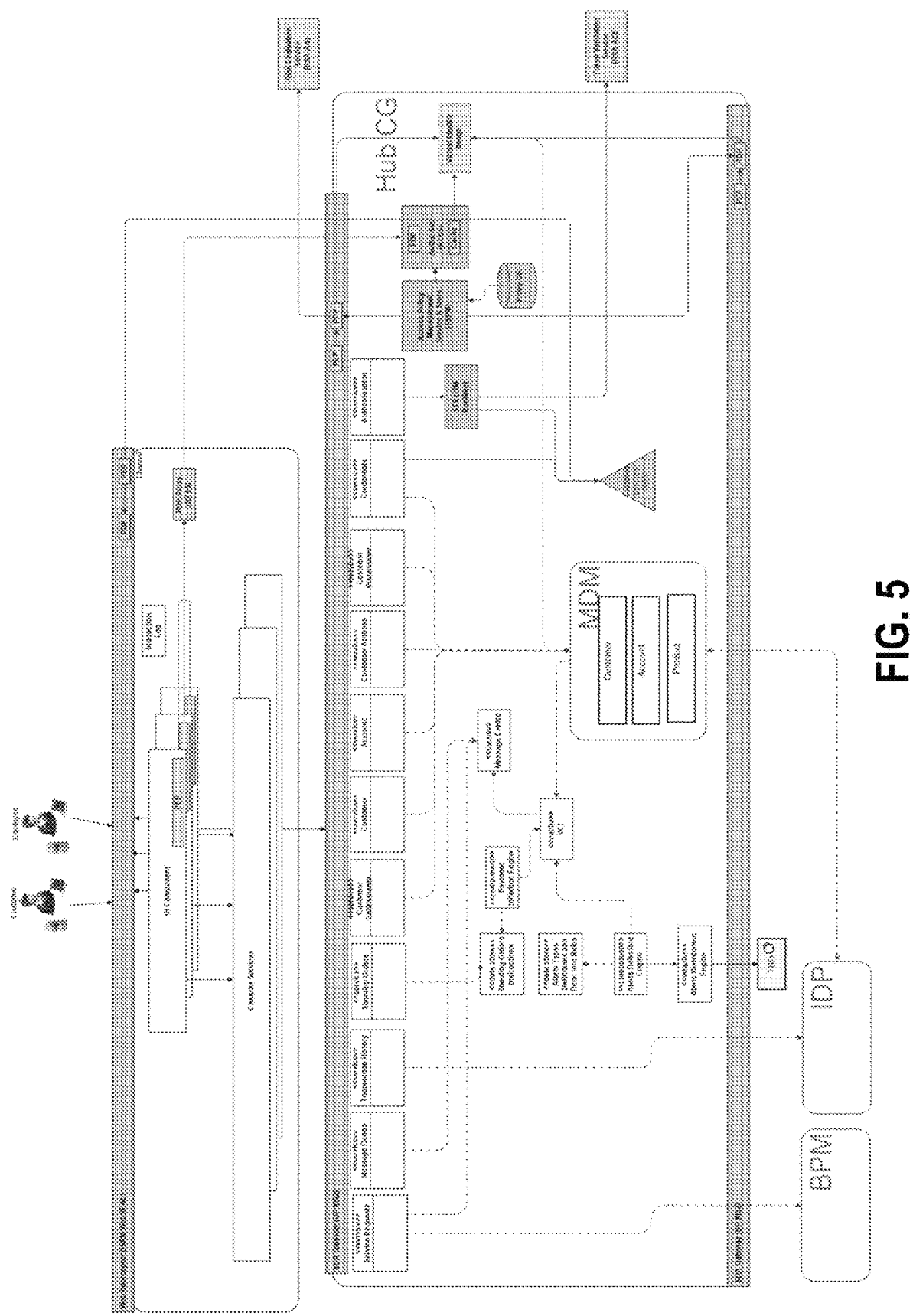
FIG. 5 is a schematic diagram of an architecture of a hub system including the IDP of FIG. 1.

FIG. 5 depicts an example hub system 3000 architecture. In some embodiments, the hub architecture can include a web interceptor and SOA Gateway. The web interceptor can include one or more UI components (including PEP), interaction logs, and channel services. The SOA Gateway can include one or more services, including service requests, message centres, transaction histories, standing orders, customer entitlements, customers, accounts, customer addresses, customer preferences, credentials, and authentication. One or more of each of these can connect to one or more data stores (e.g., standing orders, instructions, alerts types, definitions and detection rules), components (e.g., alerts detection engine, payment initiation engine), caches (e.g., message centre, VCI), and adapters (e.g., alerts distribution engine). In some embodiments, the hub architecture includes BPM units, IDP units, MDM units (e.g., customer, account, product), and other protocols, standards, and units as depicted.

In some embodiments, hub services may be implemented or advantageous for certain functionalities. For example, hub services may be implemented to provide or support integration between channel applications and book of records/transaction applications, customer 360 related transactions, multiple consumers, multiple service/data providers, reusable components for other project or LOBs, participation in S&R, and reduction in point to point connections.

An example enterprise architecture in a bank hub architecture environment will now be described in relation to payment services.

Figure 6:
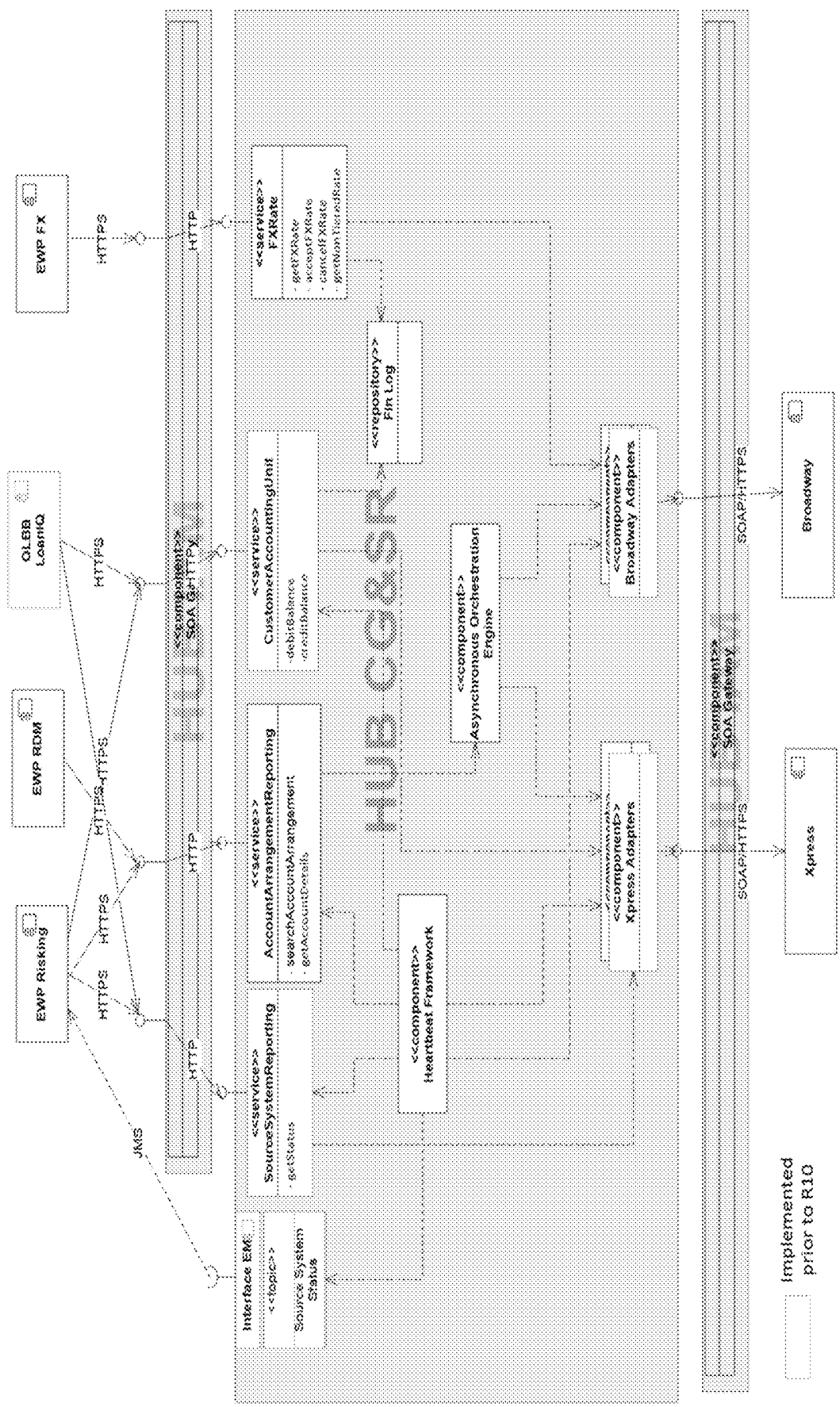
FIG. 6 is a schematic diagram of an architecture of a hub system including the IDP of FIG. 1.

FIG. 6 depicts an example architecture implementing Enterprise Wire Payments Account Funding, including Foreign Exchange. In some embodiments, the architecture includes one or more Enterprise Wire Payments risking units, Enterprise Wire Payments report database management units, Online business banking units for a loan processing system, and foreign exchange units. These units connect to one or more components using one or more protocols or standards as shown (e.g., HTTPS, HTTP, JMS) to a HUB connector grid and sense and response architecture. The HUB customer gateway sense and response architecture can include one or more components, services, interfaces, and repositories as shown.

Figure 7:
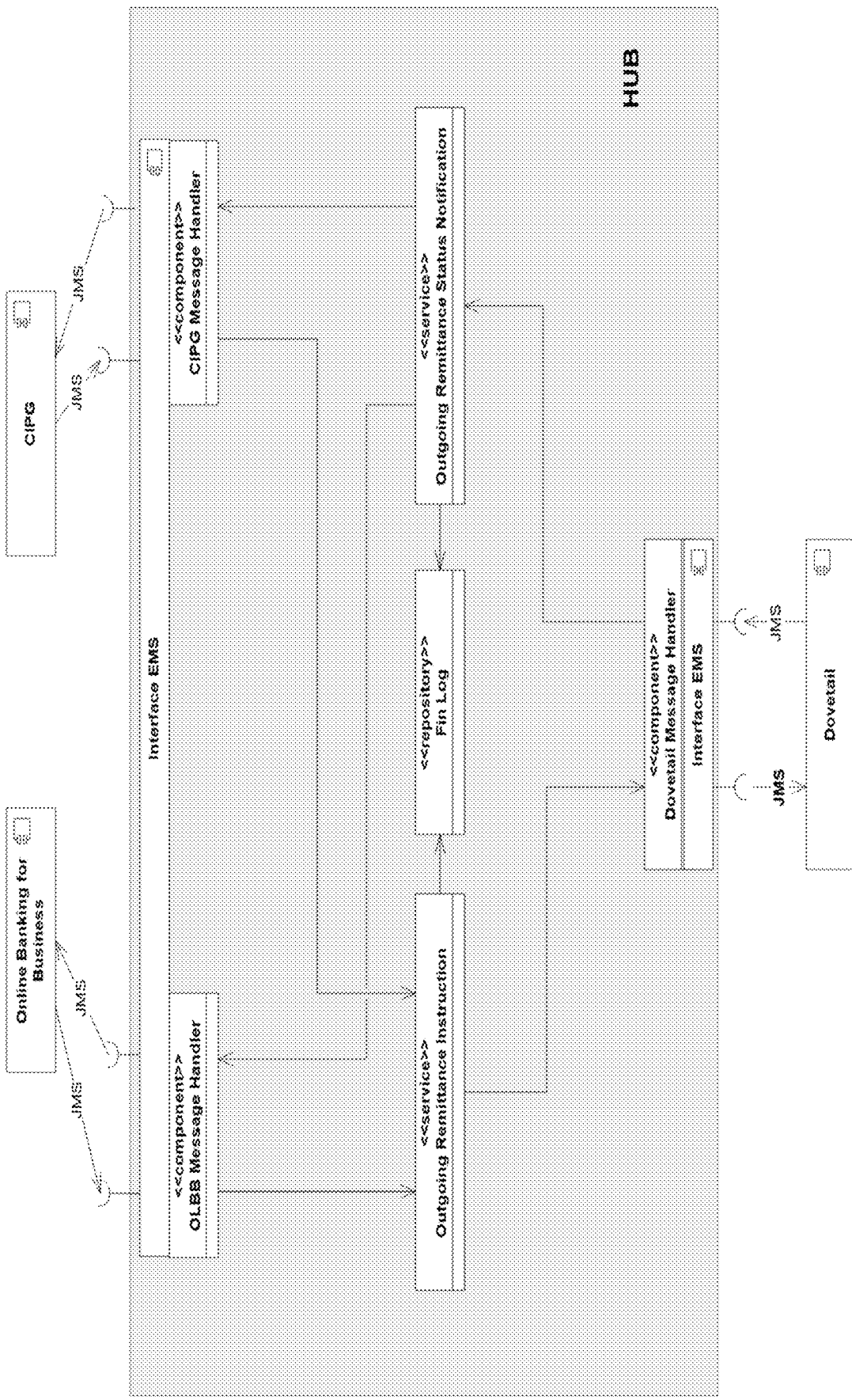
FIG. 7 is a schematic diagram of an architecture of a hub system including the IDP of FIG. 1.

FIG. 7 depicts an example architecture implementing a core component of Enterprise Wire Payments Wire Payments. In some embodiments, a HUB system is configured to connect to an online banking for business unit, a customer information processing gateway unit, and an Enterprise wire payment engine. The HUB system includes one or more interfaces, components (e.g., online banking for business message handler, customer information processing gateway message handler, payment message handler), services (e.g., outgoing remittance instruction, outgoing remittance status notification), and one or more repositories (e.g., financial transaction log).

The following table shows SWIFT agent interface Replacement Scope.

| Application ID | Connection Method | Outbound Message MT To SWIFT | Inbound Messages (From SWIFT) | | | | |
|---|---|---|---|---|---|---|---|
| | | | MT From SWIFT | Responses to Back Office | | | |
| | | | | Accept | Reject | ACK | NAK |
| BESS | MQGI | Y | Y | Y | Y | Y | Y |
| CIPG | MQGI | Y | Y | N | N | N | N |
| EFTW | | N | Y | N | N | N | N |
| SFKP (SKOPE) | MQGI | Y | Y | Y | Y | Y | Y |
| PIX | | Y | Y | N | N | N | N |
| MXG | MQGI | Y | N | Y | Y | Y | Y |
| TRAM | | N | Y | N | N | N | N |
| CALW Calypso | | Y | N | Y | Y | Y | Y |
| FLEX (CBS) | | Y | Y | Y | N | Y | N |
| IBCA, IBLD, IBCH, IBUS, (IBUK) | MQGI | Y | N | Y | Y | N | N |
| CBCA. CBLD (CBDS) | | Y | N | N | N | N | N |
| WSS | MQGI | Y | Y | Y | Y | Y | Y |
| BOOST | MQGI | Y | N | Y | Y | Y | Y |
| ~~PHUS (EWP)~~ | ~~SOAP XMLv2~~ | ~~Y~~ | ~~Y~~ | ~~Y~~ | ~~Y~~ | ~~Y~~ | ~~Y~~ |

-continued

| Application ID | Connection Method | Outbound Message MT To SWIFT | Inbound Messages (From SWIFT) MT From SWIFT | Responses to Back Office | | | |
|---|---|---|---|---|---|---|---|
| | | | | Accept | Reject | ACK | NAK |
| ~~GCTS~~ | ~~SOAP XMLv2~~ | ~~N~~ | ~~Y~~ | ~~N~~ | ~~N~~ | ~~N~~ | ~~N~~ |
| GFIW Impact | MQGI | Y | N | Y | Y | Y | Y |

Figure 8:
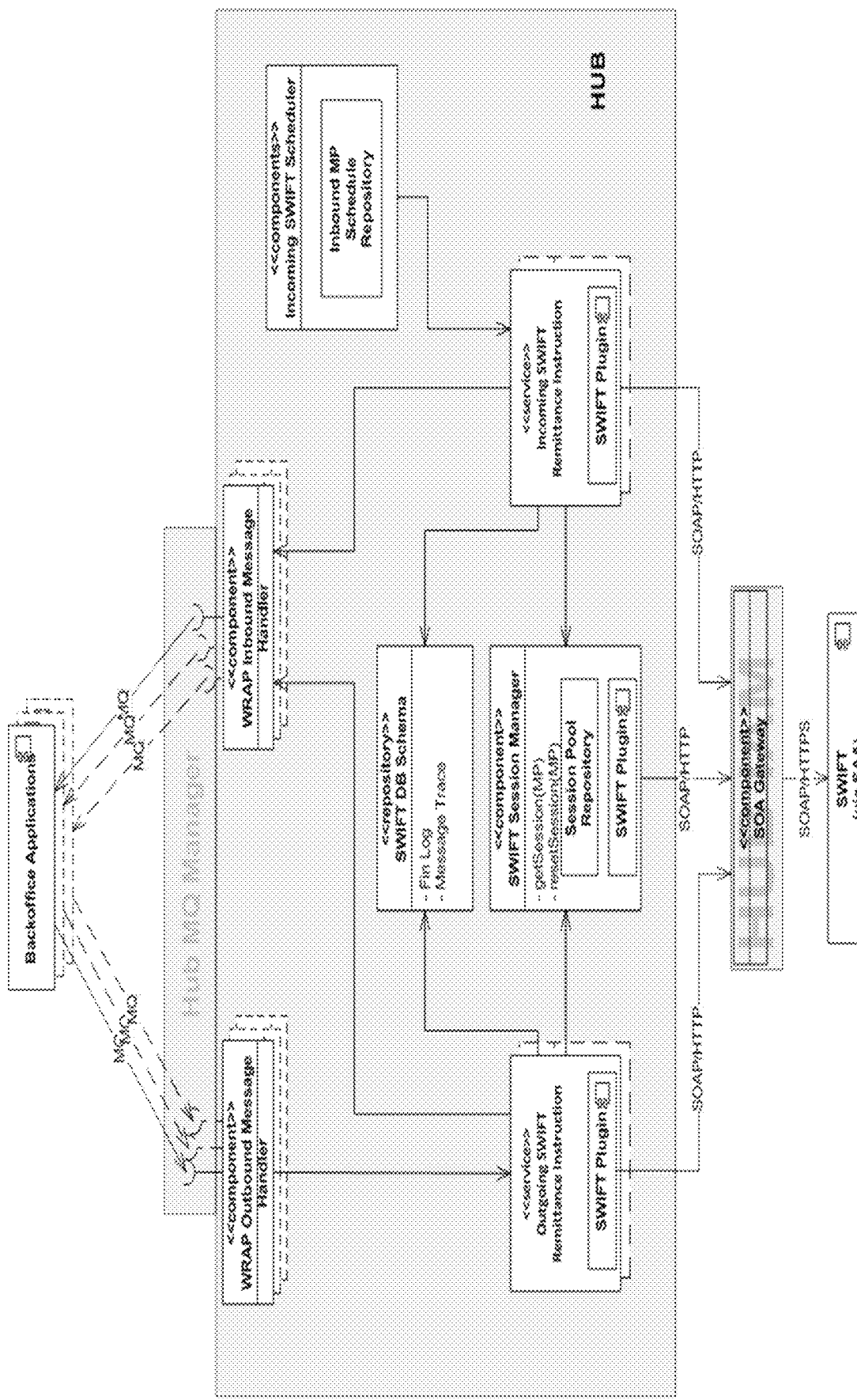
FIG. 8 is a schematic diagram of an architecture of a hub system including the IDP of FIG. 1.

FIG. 8 depicts an example architecture of hub system 3000 implementing SWIFT. In some embodiments, the architecture includes a back office application, HUB message Manager, and hub system 3000. The hub system 3000 includes one or more components (e.g., wire room application outbound message, wire room application inbound message, incoming SWIFT scheduler, outgoing SWIFT, SWIFT session manager), repositories (e.g., SWIFT DB Schema), and services (e.g., outgoing SWIFT remittance instruction, incoming SWIFT remittance instruction). These services provide connectivity to an service oriented architecture Gateway, which provides connectivity to SWIFT. Connectivity can be implemented using one or more protocols or standards such as SOAP/HTTP.

Embodiments of an example enterprise architecture (enterprise architecture Blueprint) of a hub system 3000, for example, a bank hub architecture will now be described.

FIG. 3 depicts an example architecture blueprint and roadmap for a hub system 3000 according to some embodiments. One or more business capabilities are enabled by the hub system 3000.

An example capability includes compiling a dynamic data set representing customer information that can involve an enterprise customer identifier, a 360 customer view, customer and account information, customer preference, customer relationships, and house-holding.

Another example capability includes managing business processes that can involve process integration and management, paperless processing, e-Signature, and document management.

Another example capability includes application integration, which can involve service integration to reduce complexity and increase reuse and agility, as well as provide faster time to market.

Another example capability includes identity management, which can provide single sign-on, risk-based authentication, user identity management, and role based access.

Another example capability includes real-time intelligence, which can provide sense and respond capabilities for customer experience, as well as revenue opportunities and fraud applications.

Another example capability includes data and analytics, which can provide a holistic view of customer, transaction, account, market, and reference and processed data, as well as improved data foundation and governance.

Hub services can be implemented or advantageous for a variety of contexts, for example, as described above.

Categorization of various hub services for some embodiments of a hub system 3000 follow. For example, hub services can include utility services, which are services that are defined by technical aspects and used to implement other services (e.g. "Connector Grid" services and common components) and can include adapters (e.g., software components (either home-grown or TIBCO provided) that provide generic access to a particular technology platform).

Another example hub service is mediation (integration) services, which are services determined by the services providers or business domain applications and which can use standardized technology to access operations, but do not standardize the semantics of the operation or the data.

Another example hub service is business services, which are services defined by business aspects, can encapsulate one or more portions of business processes or unique business functions, and can use standardized technology to implement the services and the semantics of the data.

Figure 9:
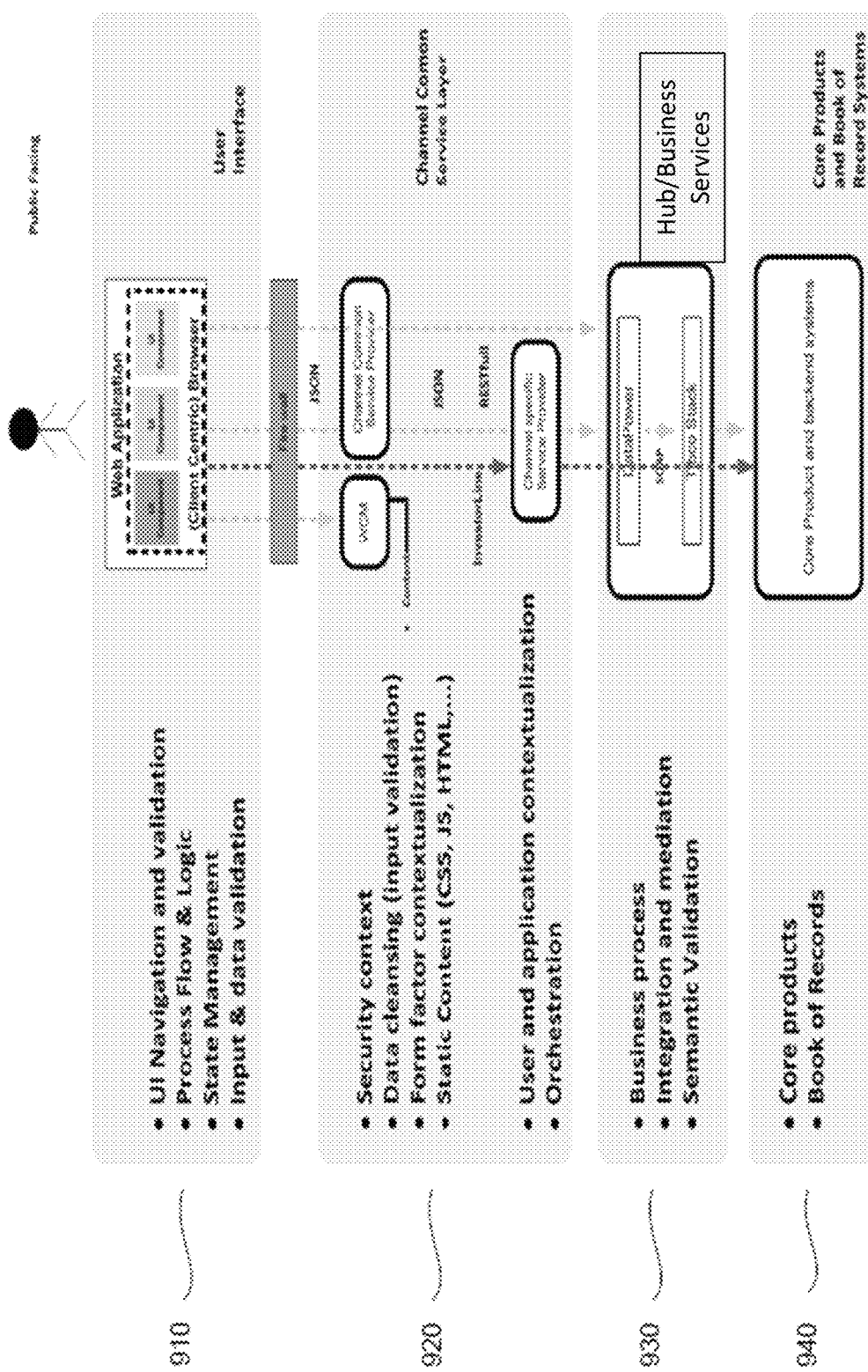
FIG. 9 is a schematic diagram of an architecture of a hub system including the IDP of FIG. 1.

Another example hub service is composite services which can coordinate/orchestrate multiple "integration" or "business services" to implement one or more business defined processes With reference to FIG. 9, features of and functional placement for an example architecture of an example hub system 3000 according to some embodiments will now be described.

At 1310, lines of business (LOB) can focus their effort on this layer, implementing compelling experiences on a variety of form factors.

At 1320, a common layer is provided for all channel applications, implementing and providing services implemented by each LOB/channel application.

At 1330, there is channel specific orchestration and contextualization can be implemented using channel specific service provider.

At 1340, the bank HUB system provides channel agnostic business services and mediation and transformation.

Embodiments of an example enterprise architecture (e.g., enterprise architecture Blueprint) in a bank context will now be described in relation to hub foundational components according to some embodiments.

Figure 10:
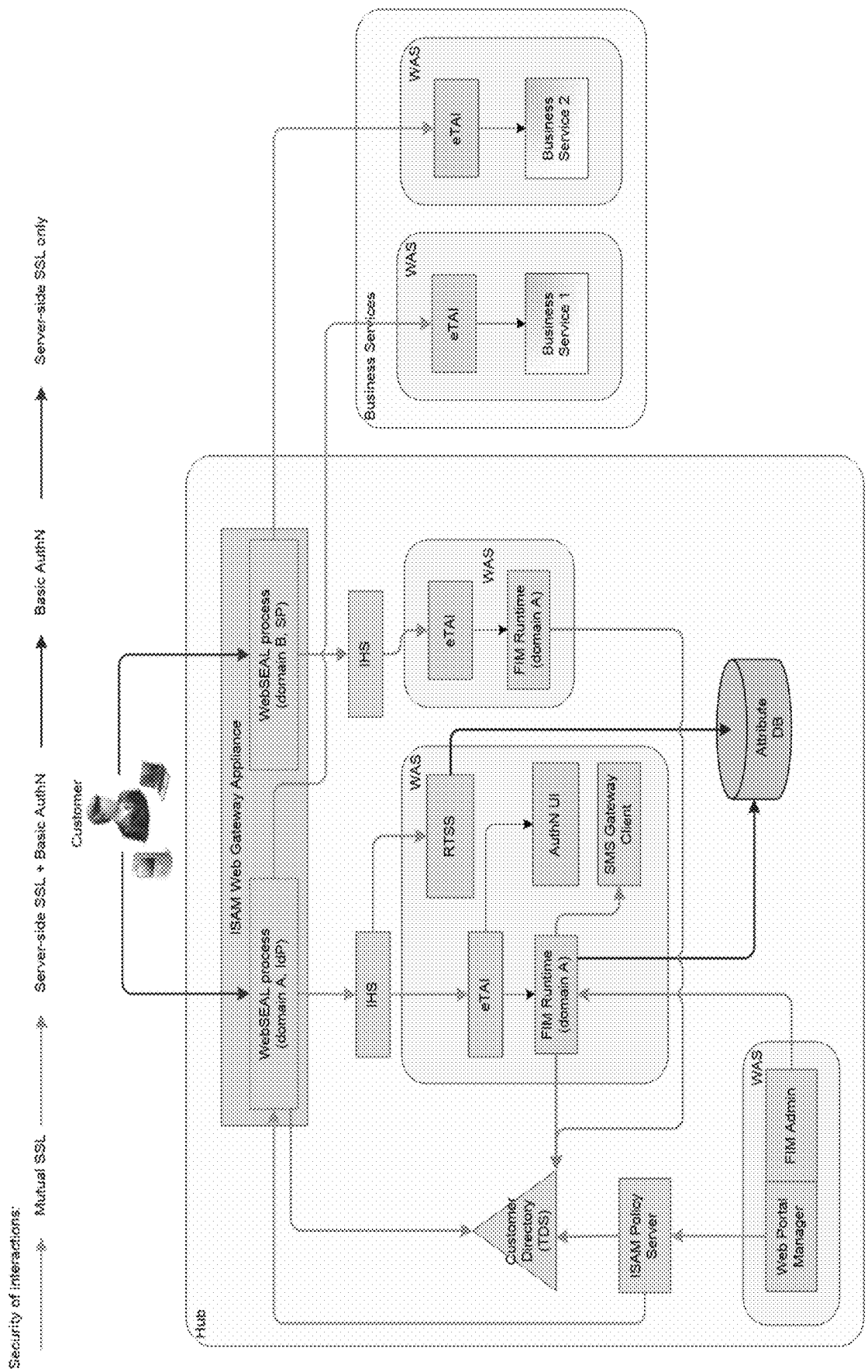
FIG. 10 is a schematic diagram of an architecture of a hub system including the IDP of FIG. 1.

FIG. 10 depicts an example Hub Identity and Access Management (IAM) Architecture according to some embodiments of a hub system 3000. In some embodiments, the HUB Identity Access Management (IAM) architecture is configured to connect to business services. Each of the business services and hub system 3000 can include components, protocols, and standards for connectivity or data transfer.

As noted, the system provides an enterprise credential store. The credential maps to Identity. The Identity supports access enforcement (policy and/or risk based), and authentication and access activities are actually events that can be harvested to generate insight, which ties back to the Smart-Core services and IDP. The whole eco-system is integrated and authentication and access can lead to insight and intelligence action.

In some embodiments, IAM is based on a model that allows for multiple Policy Enforcement Points (PEP) that can be instrumented to apply security functions as required.

In some embodiments, IAM is set of processes and technologies designed to ensure that the right individual has access to the right assets for the right reasons, enabling the right business outcome.

In some embodiments, there is provided Customer IAM (CIAM) and Employee IAM (EIAM), which are a subset of capabilities relevant to provisioning and enforcement of access controls for Customers (individuals that have direct or indirect customer relationship with the bank) and bank staff (e.g., employees and contractors).

In some embodiments, IAM facilitates unique identification of customer or an employee, and implements relevant repositories, including credentials and policy data stores.

The customer can provide credentials through the web Gateway appliances and the hub can map the credentials to a customer identity. The customer identity can be linked to different access controls defining data entitlement and permissible functions.

FIG. 4 depicts HUB IAM Architecture usage patterns according to some embodiments. In some embodiments, the hub system 3000 manages inbound traffic and outbound traffic as follows:

For inbound traffic, requests can be sent from external partners or channel devices for both REST and SOAP services. WebSeal located in DMZ can provide sufficient security isolation between extranet and Hub network zone.

For outbound traffic, requests can be sent from Hub network zone to external service provides are not terminated in DMZ. It is to the IS and EI teams to establish and implement enterprise standard security gateway. In some embodiments, there can be reuse of existing connections paths.

In some embodiments, IDP is a key information management component of an Analytical/Data Hub. IDP provisions well managed data and meets multiple reporting/analytical requirements quickly and efficiently. IDP meets the requirements of regulators and businesses requiring good data quality management. The identity and access management system components can integrate with IDP to access all data linked to or relevant for customer requests.

Key features of the depicted IDP component include high availability (e.g., robust, highly resilient infrastructure), disaster recovery, low cost, high performance, availability and management of data lineage, data stewardship/governance capabilities, data quality management and reporting capabilities, and that data is available in both source system and cross application integrated models.

Customer Identity & Access Management (CIAM)

Figure 11:
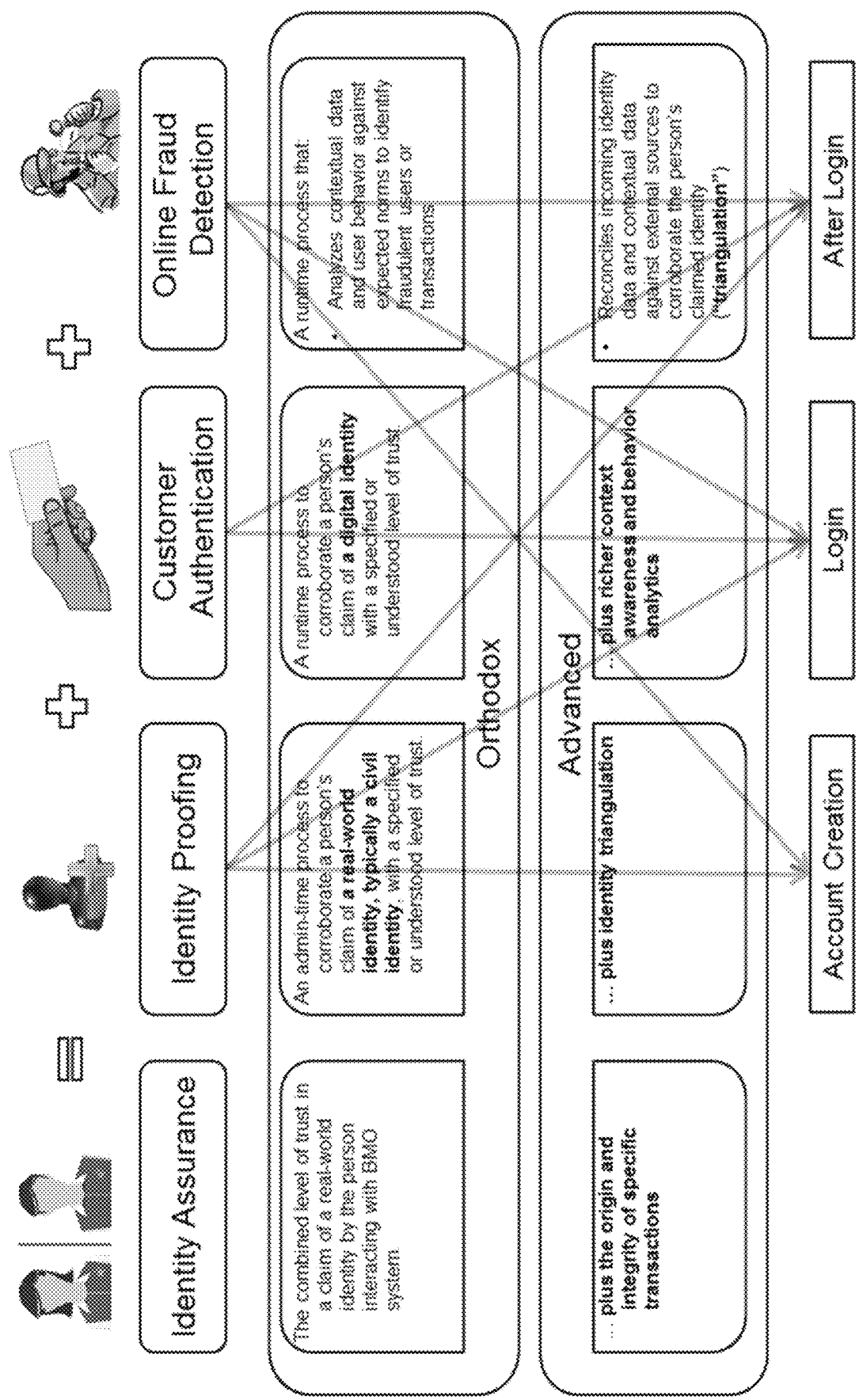
FIG. 11 shows an example concept of lifecycle of identity trust.

FIG. 11 shows an example concept of lifecycle of identity trust. Identity assurance may include identity proofing, customer authentication, and online fraud detection. Identity assurance may be a combined level of trust in a claim of a real-world identity by the person interacting with a system. Identity proofing is an administrative process to corroborate a person's claim of a real-world identity, typically a civil identity, with a specified or understood level of trust. Customer authentication is a runtime process to corroborate a person's claim of a digital identity with a specified or understood level of trust. Online fraud detection is a runtime process that: analyzes contextual data and user behavior against expected norms to identify fraudulent users or transactions; and reconciles incoming identity data and contextual data against external sources to corroborate the person's claimed identity ("triangulation").

Figure 12:
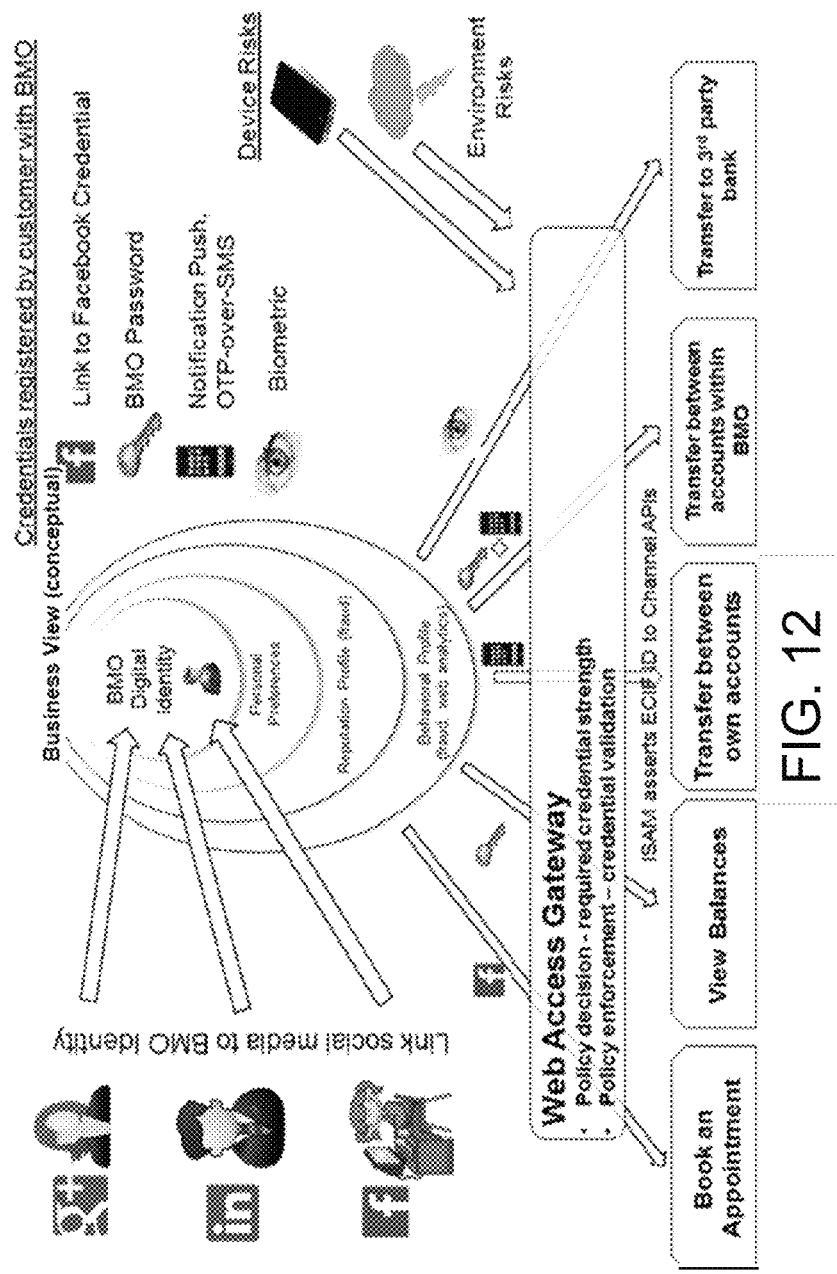
FIG. 12 shows an example concept of digital identity for business.

FIG. 12 shows an example concept of digital identity for business. A web access gateway may be configured to implement required credential strength and credential validation before employees and customers can access services via different channels.

In some embodiments, a single digital identity record per civic identity of an individual may be established. This may apply to both customers and employees of an organization. Customer can link its social network ID to the single digital identity and manage such linkage, e.g. prospects, customer access to less secured resources. A single User ID may be generated and maintained per digital identity. Customer may have a choice of credentials of a different strength: link to Facebook ID/password, bank ID/password, device push, OTP-over-SMS, biometric, and so on. Systems will require credential of a certain strength depending on type of transaction and associated risks. "Implied" entitlement model may be used for retail and small business customers: entitlement is derived from party-role-arrangement, party-to-party relationships. For example, book of records may define that Joe is an "owner" of chequing account ending in 111. Inventory of all allowed business functions per product may be configured in Enterprise Product Master, cached and enforced by Channel App/API. In some embodiments, "explicit" entitlement model may be used for complex business customers.

Figure 13:
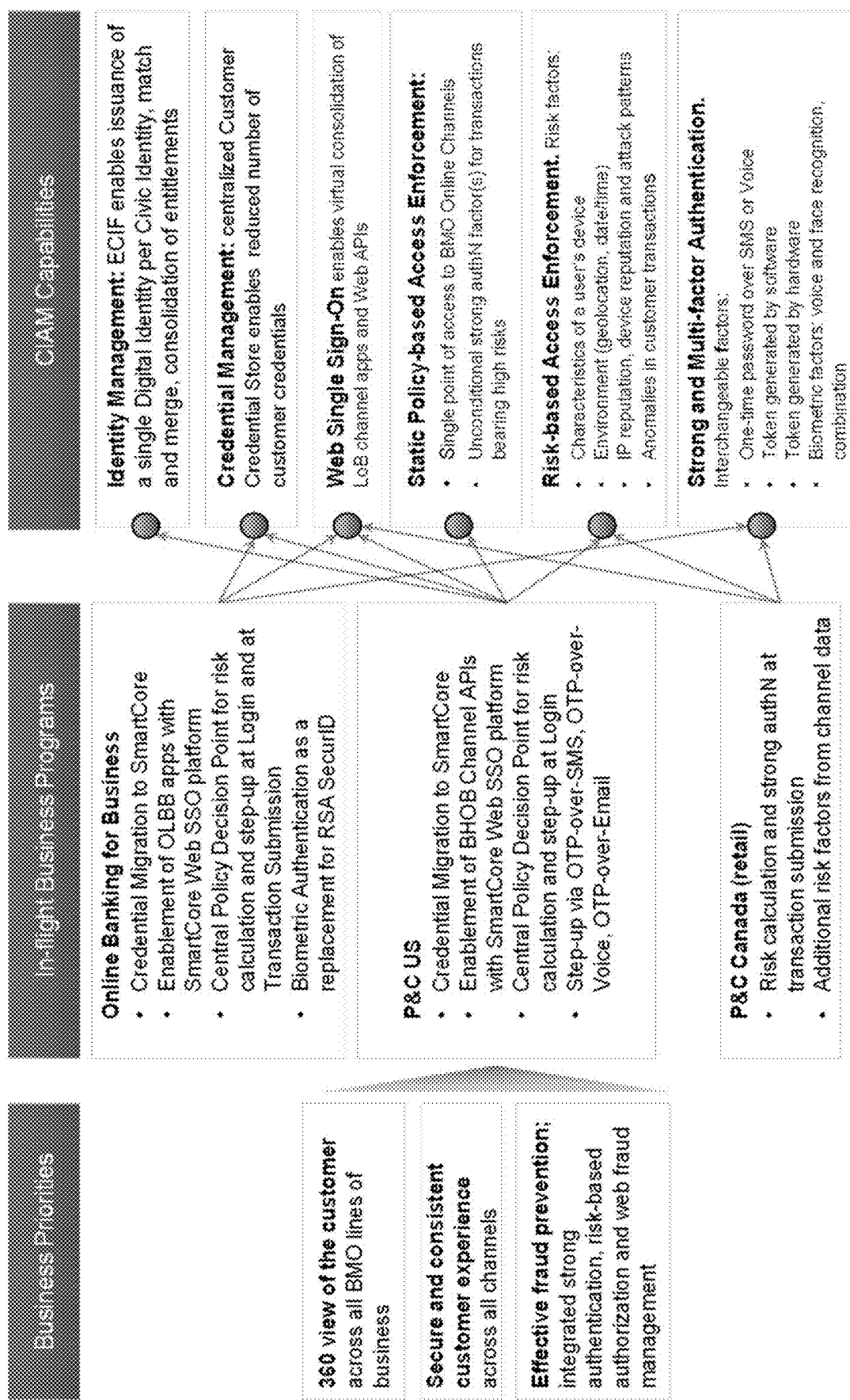
FIG. 13 shows example alignments between business priorities and Customer Identity & Access Management (CIAM) capabilities.

FIG. 13 shows example alignments between business priorities and Customer Identity & Access Management (CIAM) capabilities. Business priorities may include complete view of the customer information across all lines of business, secure and consistent customer experience across all channels, and effective fraud prevention such as integrated strong authentication, risk-based authorization and web fraud management. CIAM capabilities may include:

Identity Management: book of records enables issuance of a single Digital Identity per Civic Identity, match and merge, consolidation of entitlements.

Credential Management: centralized Customer Credential Store enables reduced number of customer credentials. The credentials are linked to digital identities managed by the system.

Web Single Sign-On enables virtual consolidation of LOB channel apps and Web APIs. Web interactions can be captured as event data, such as how many sign-ons have occurred.

Static Policy-based Access Enforcement. There can be a single point of access to Online Channels. Unconditional strong authN factor(s) can be required for credentials for transactions bearing high risks. Risk-based Access Enforcement that can be defined within the access controls. The access controls can trigger requests for additional credentials depending on the requested function and data. Example Risk factors: Characteristics of a user's device; Environment (geolocation, date/time); IP reputation, device reputation and attack patterns; Anomalies in customer transactions; and Strong and Multi-factor Authentication. Example Interchangeable factors: One-time password over SMS or Voice; Token generated by software; Token generated by hardware; and Biometric factors: voice and face recognition, combination. Different credentials can be used depending on the configurations.

Figure 14:
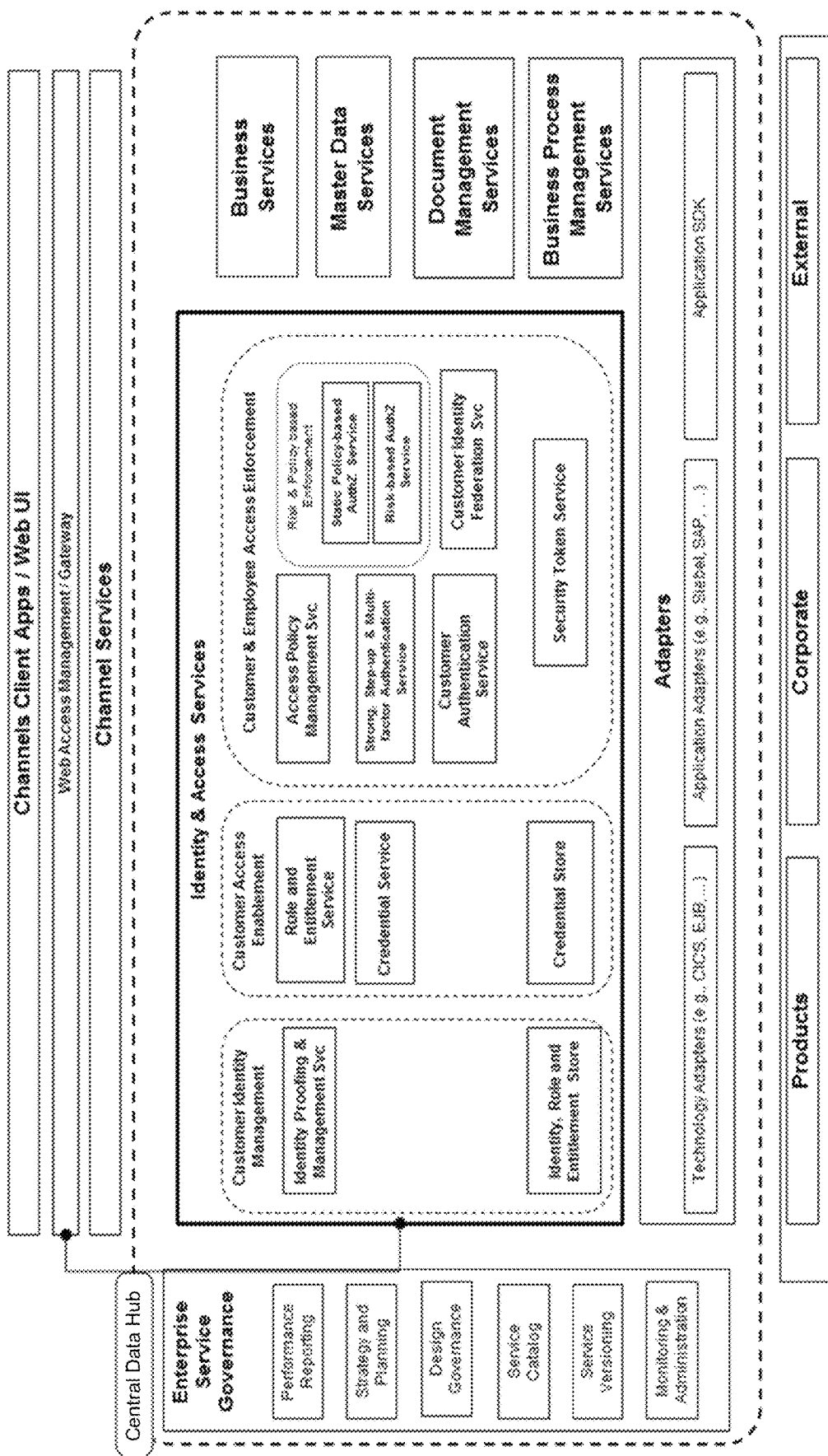
FIG. 14 shows example functional placement of Identity and Access Management (IAM) in central data hub service architecture.

FIG. 14 shows example functional placement of Identity and Access Management (IAM) in service architecture of central data hub.

Figure 15:
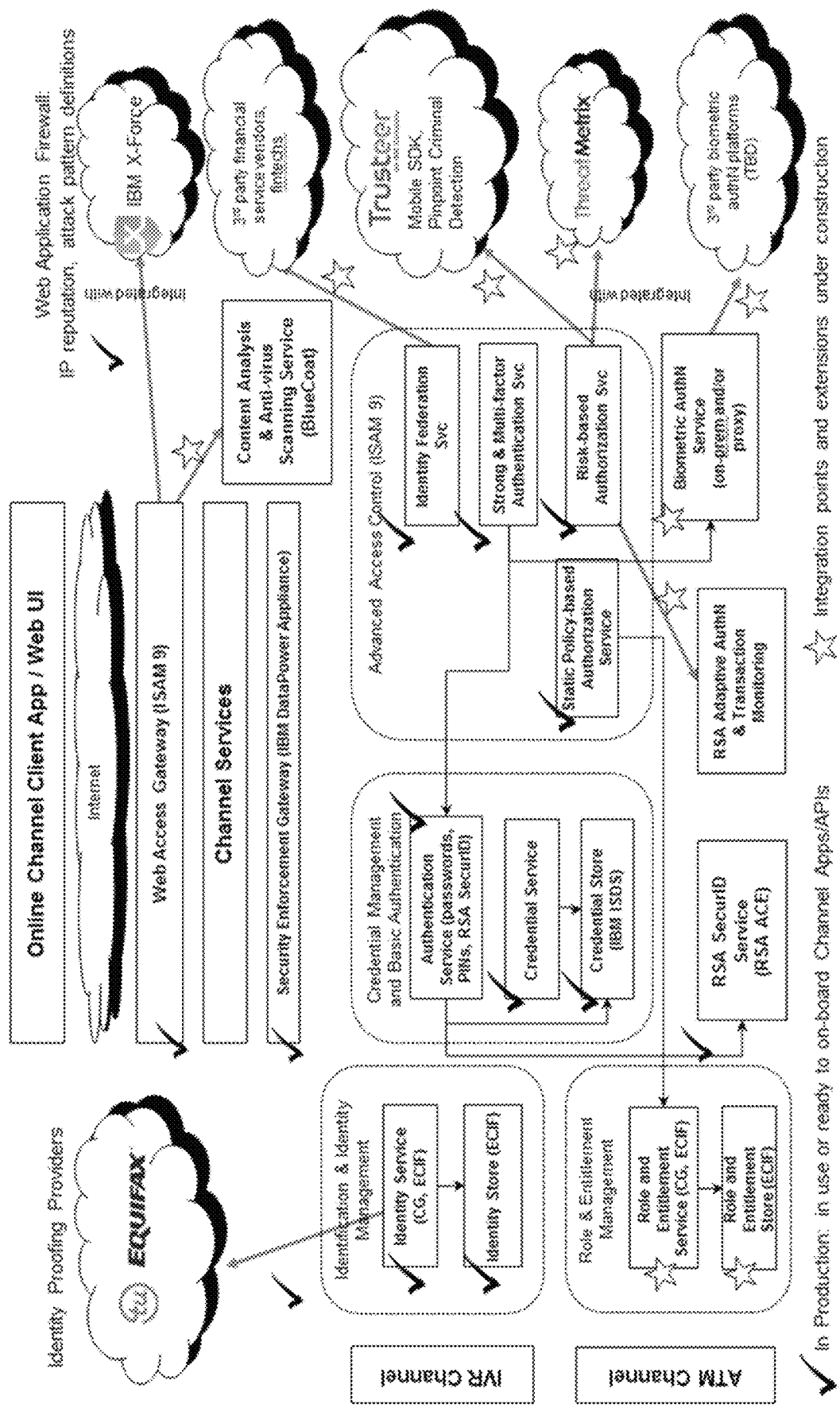
FIG. 15 shows example CIAM platform for online channels (browser, smartphone, tablet).

FIG. 15 shows example CIAM platform for online channels (browser, smartphone, tablet).

FIG. 16A lists example architecture components for CIAM.

Figure 16B:
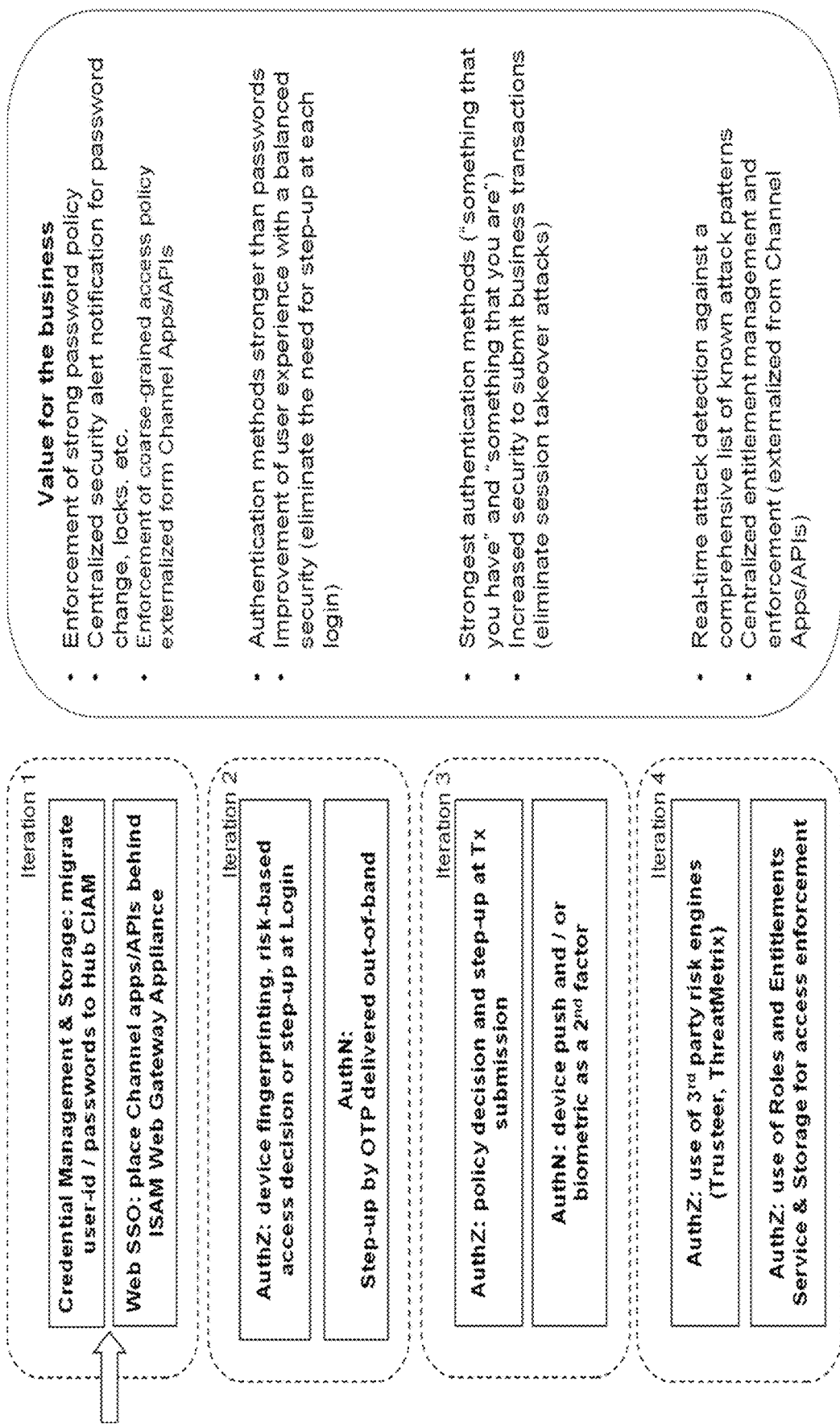
FIG. 16B shows example CIAM on-boarding sequence for a retail channel.

FIG. 16B shows example CIAM on-boarding sequence for a retail channel.

Figure 17:
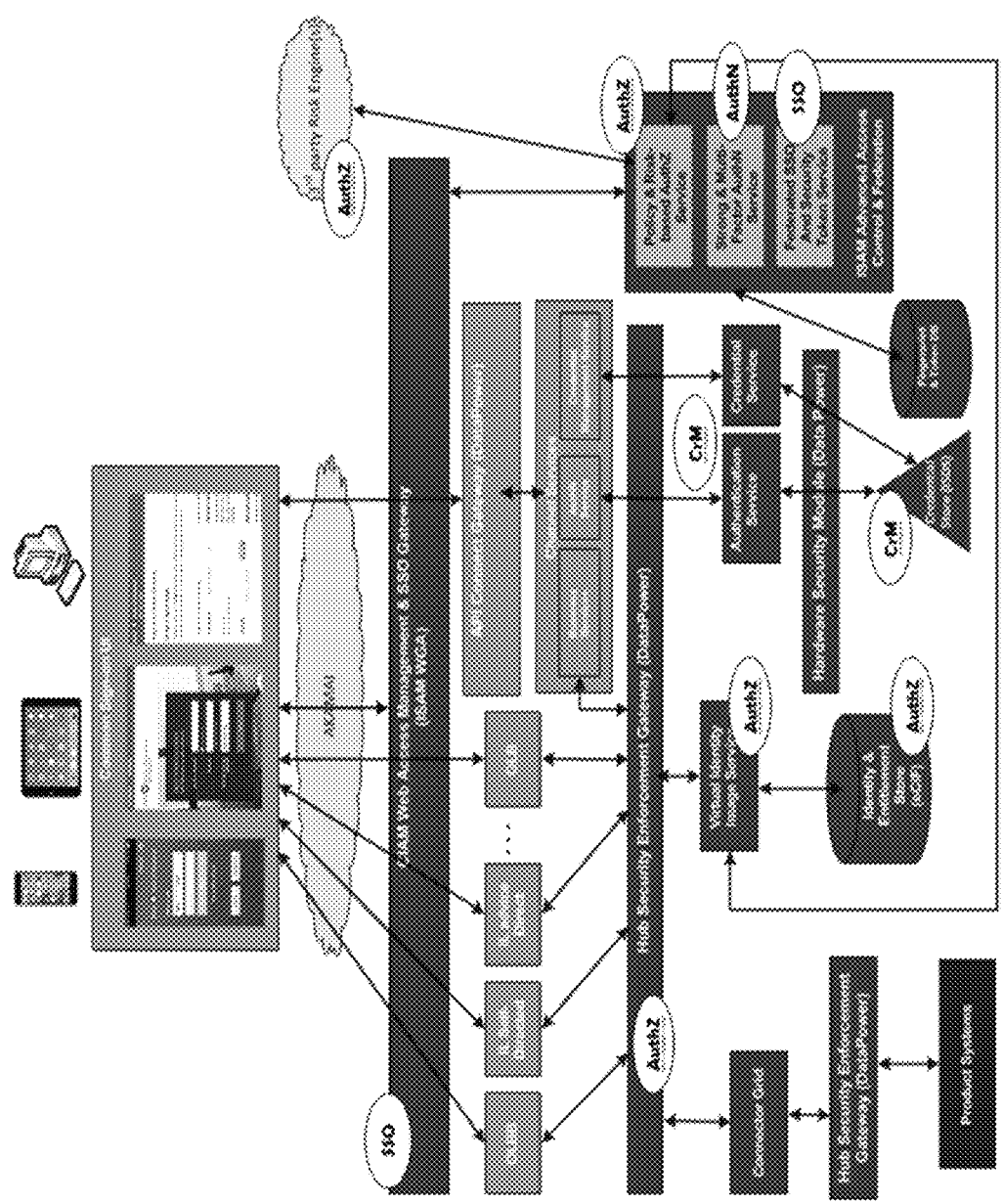
FIG. 17 shows an example workflow and block diagram of CIAM.

FIG. 17 shows an example workflow and block diagram of CIAM. In some embodiments, CIAM breaks down the historic silos and introduces Enterprise wide Shared capabilities. Customer credentials are maintained in one location. Using policy-based authentication and access control rules, Customers are granted access to products consistently and quickly. Working with Online Fraud Detection providers (i.e. 3rd party risk engines), risky scenarios are detected early. Fraud losses are reduced as Customers are challenged in a uniform way before the transactions are committed.

FIG. 18 shows example Risk Factors and Device Fingerprint Authentication. Device fingerprints are another example of credentials that can be used. This risk factor data can be collected by the system as event data and used to authenticate a user.

Figure 19:
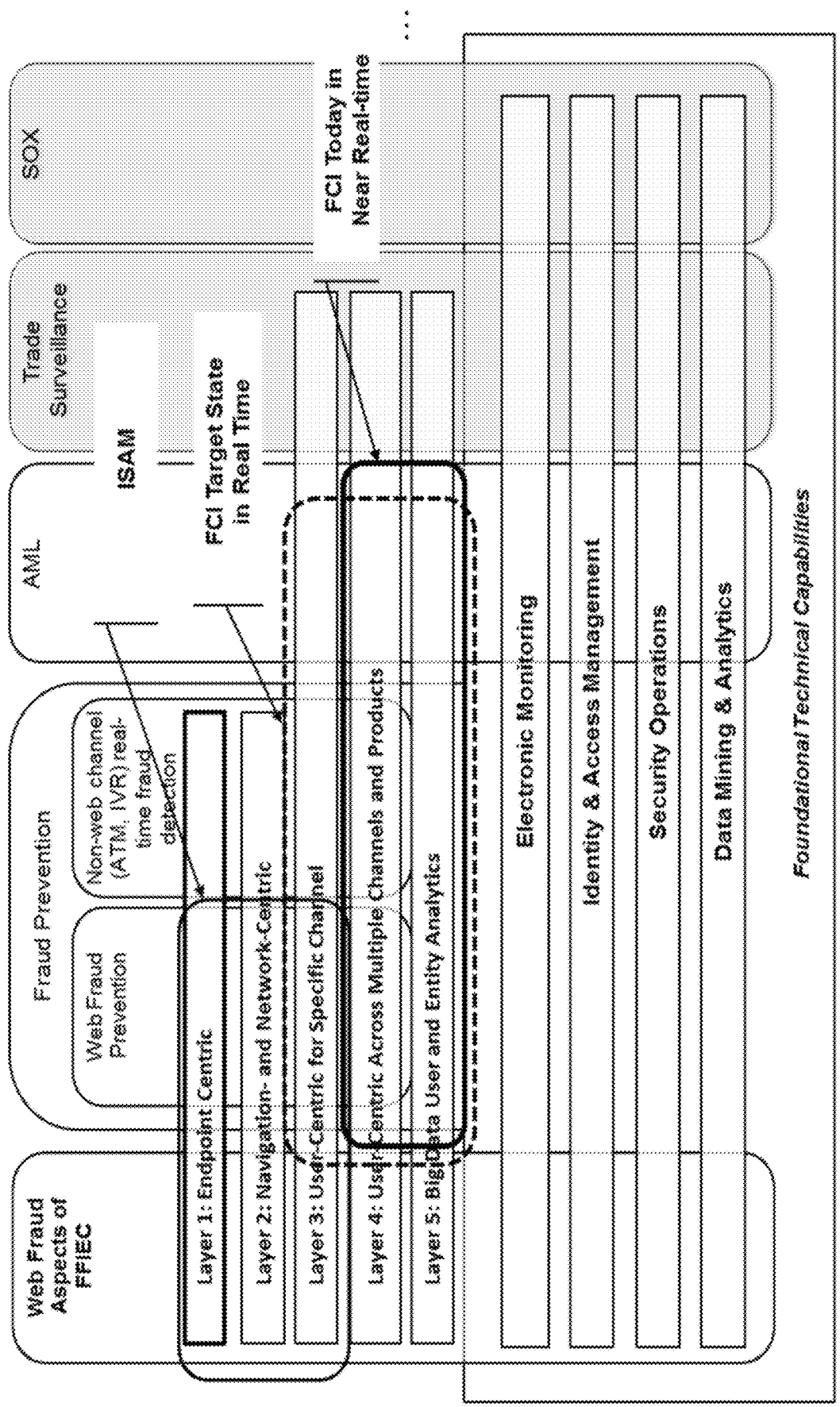
FIG. 19 shows example Web/Online Fraud Prevention Reference Architecture.

FIG. 19 shows example Web/Online Fraud Prevention Reference Architecture. The architecture can be used to exchange credentials, mapped identity, and provide a comprehensive data set relevant to the customer.

Figure 20:
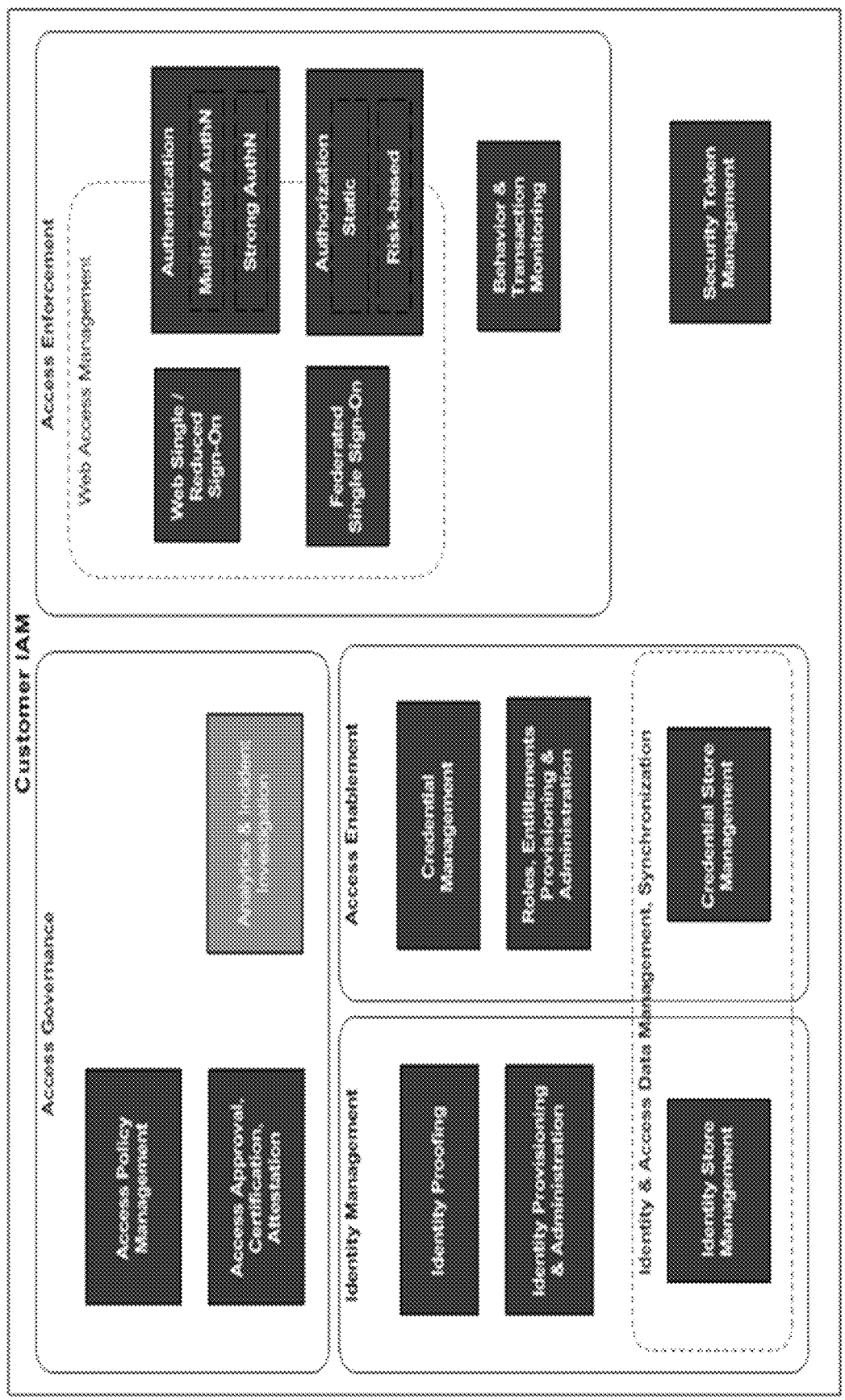
FIG. 20 shows example taxonomy of CIAM functions.

FIG. 20 shows example taxonomy of CIAM functions. The functions interact to provide access and identity management.

Access Governance can include different functionality such as access Policy Management, approval, and incident investigation.

Access Policy Management may include construction of administrative and runtime access policies and distribution of tested and approved access policies into production targets.

Role Engineering & Entitlement Discovery may include continuous scanning of IT systems for the purpose of discovering new business functions, constructing entitlements out of them, engineering of security roles as a logical combination of entitlements that access enablement and access policy definition.

Access Approval, Certification, Attestation may include facilitation of access request capture and approval, access certification and evaluation of security policies (SoD rules, etc.). It also ensures access remediation (post-provisioning verification of remediated access) (not required for CIAM).

Analytics & Incident Management may include "postmortem" data correlation, mining for the purpose of discovering suspicious activities that consequently can cause revocation of access privileges for users. This capability also includes manual process of correlations various security events for the purpose of re-creating specific criminal/fraudulent activities Identification and Identity Management components can be used to manage the customer identity data and map the identity data to different credentials in access controls.

Identity Proofing may include validation of a civic identity of an individual by verifying variety of credentials issued by government agencies, credit score agencies, other FIs. As a result, an associated Identity Level of Assurance (iLoA) is assigned that quantifies confidence level.

Identity Provisioning and Administration may include lifecycle of digital identity records: create, update, delete, merge, split that ensures uniqueness per individual. Identity Store is an ODS for core digital identity attributes, roles and entitlements associated with digital identity of an individual. In CIAM it contains references to LoB CIFs.

Access Enablement can be used to control access to data and functionality of applications.

Role & Entitlement Management manages association of roles and entitlements with digital identity records.

Credential Management may include issuance, change, revocation of a credential and change its status (lock/unlock). It also establishes and maintains backwards association of a credential to the digital identity of an individual. Credential Store contains credentials issued to an individual for authentication with systems and channel applications, contains a reference to the digital identity in Identity Store.

Access Enforcement components can be used to control what credentials are required for different access requests.

Web Access Management establishes and maintains the lifecycle of a security session for the user after successful authentication event, enforces access policy for protected APIs and web resources.

Authentication validates credentials and security tokens that user provides if requested to access web sites and APIs. This includes: multi-factor authentication, and step-up authentication.

Authorization evaluates applicable access policy according to the entitlements (top level authority—access to a product/service or channel) in the context of a security session and provides authorization decisions. It also orchestrates invocation of Risk Evaluation Engine(s) to evaluate associated risk factors. In certain cases, this service also resolves business role to a corresponding list of entitlements prior to policy evaluation.

Federated SSO initiates and/or handles interaction between a user agent/device/browser and web APIs or applications belonging to different identity domains.

Security Token Management may include facilitates creation, exchange, enrichment and validation of security tokens.

Access Enforcement/Authorization (AuthZ)

Figure 21A:
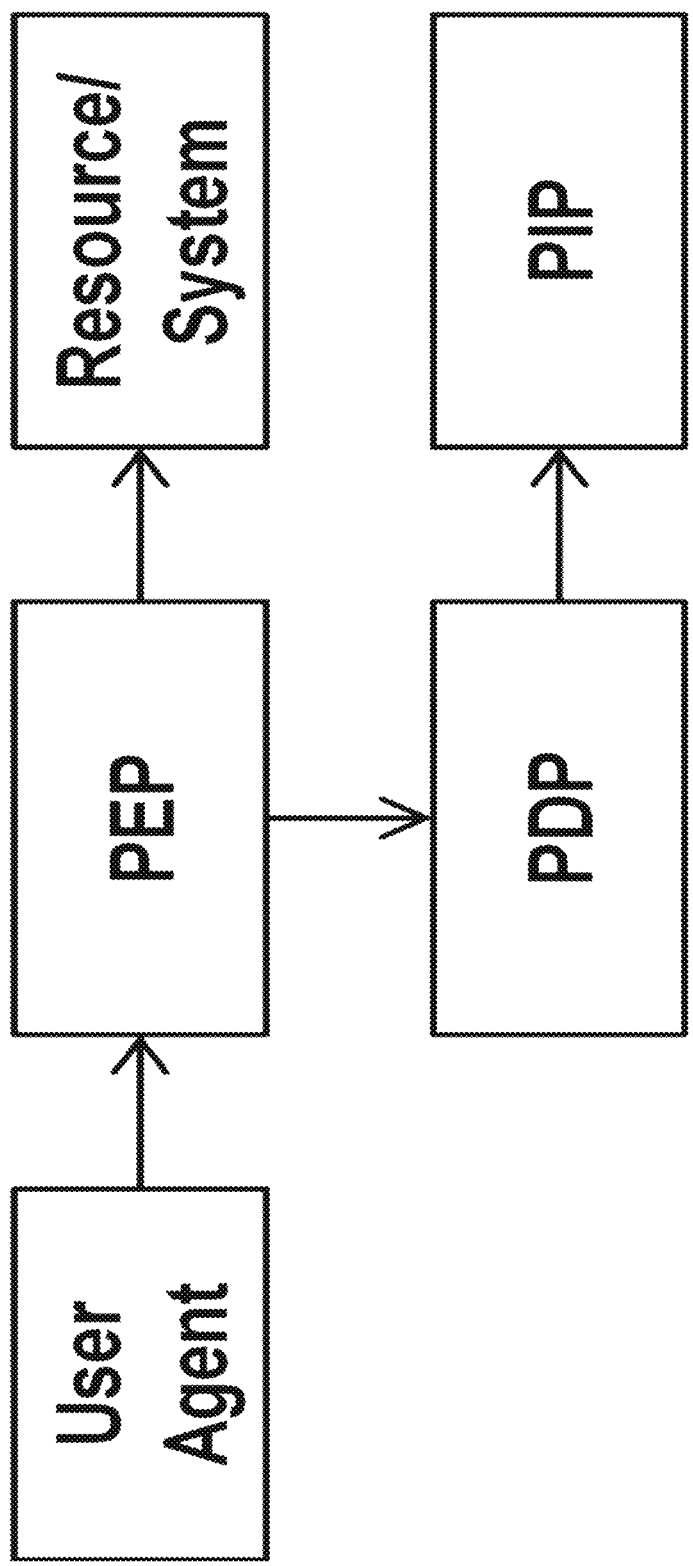
FIG. 21A shows example access control models.
Figure 21B:
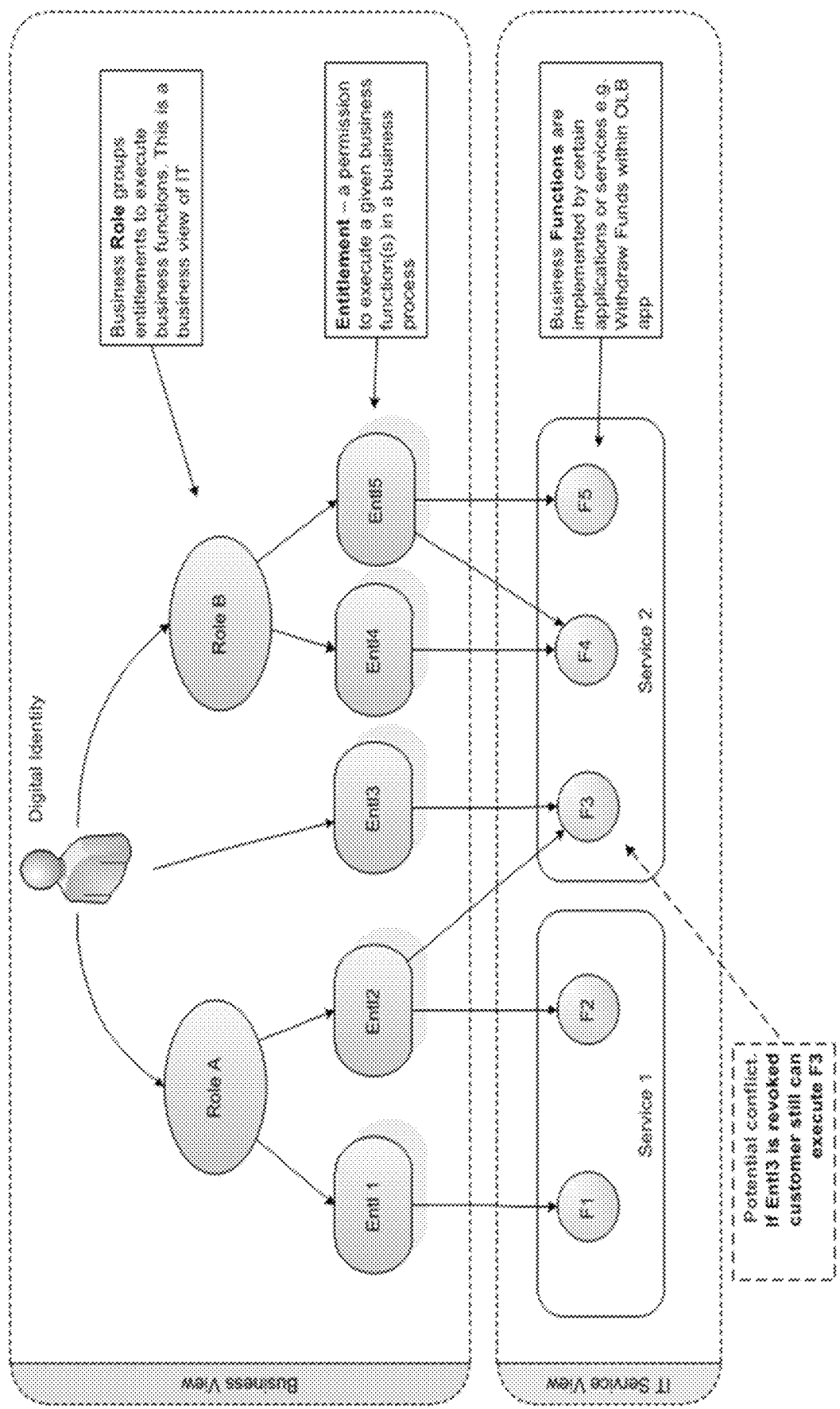
FIG. 21B shows example roles and entitlements.

FIG. 21A shows example access control models. FIG. 21B shows example roles and entitlements. Access Policy is a set of rules that govern who has access to what resources under which conditions.

Policy Decision Point (PDP) is a software component that has access to security policy, either configured (preferably) or coded. PDP evaluates the rules of security policy based on 4 contexts:

Individual's Digital Identity and data surrounding it (static access profile, behavioral profile, risk/reputation profile)

Resource and action to be executed on it.

Device (User Agent in the picture above) that individual uses to access a resource and execute an action on it.

Environment: channel type (online, mobile, ATM), IP address, geo location, date/time.

Policy Enforcement Point (PEP) intercepts an intent of executing an action on a resource and requests a decision from PDP.

Policy Information Point (PIP) provides additional information for PDP regarding 4 contexts (see above).

Entitlement is an ability to execute a business activity, step within a business process. Entitlement always has an associated business meaning. There are two categories of entitlements (and corresponding categories of access policy): run-time (that are checked before business activity is permitted or denied) and administrative (business activity that result in granting or revoking run-time entitlements to/from other individuals or processes). Run time examples include "Perform a Wire Transfer", "Unlock Credential". Administrative examples include "Associate another individual with an account in a certain role", "Revoke Wire Transfer Entitlement". Role is a logical grouping of entitlements.

Figure 22:
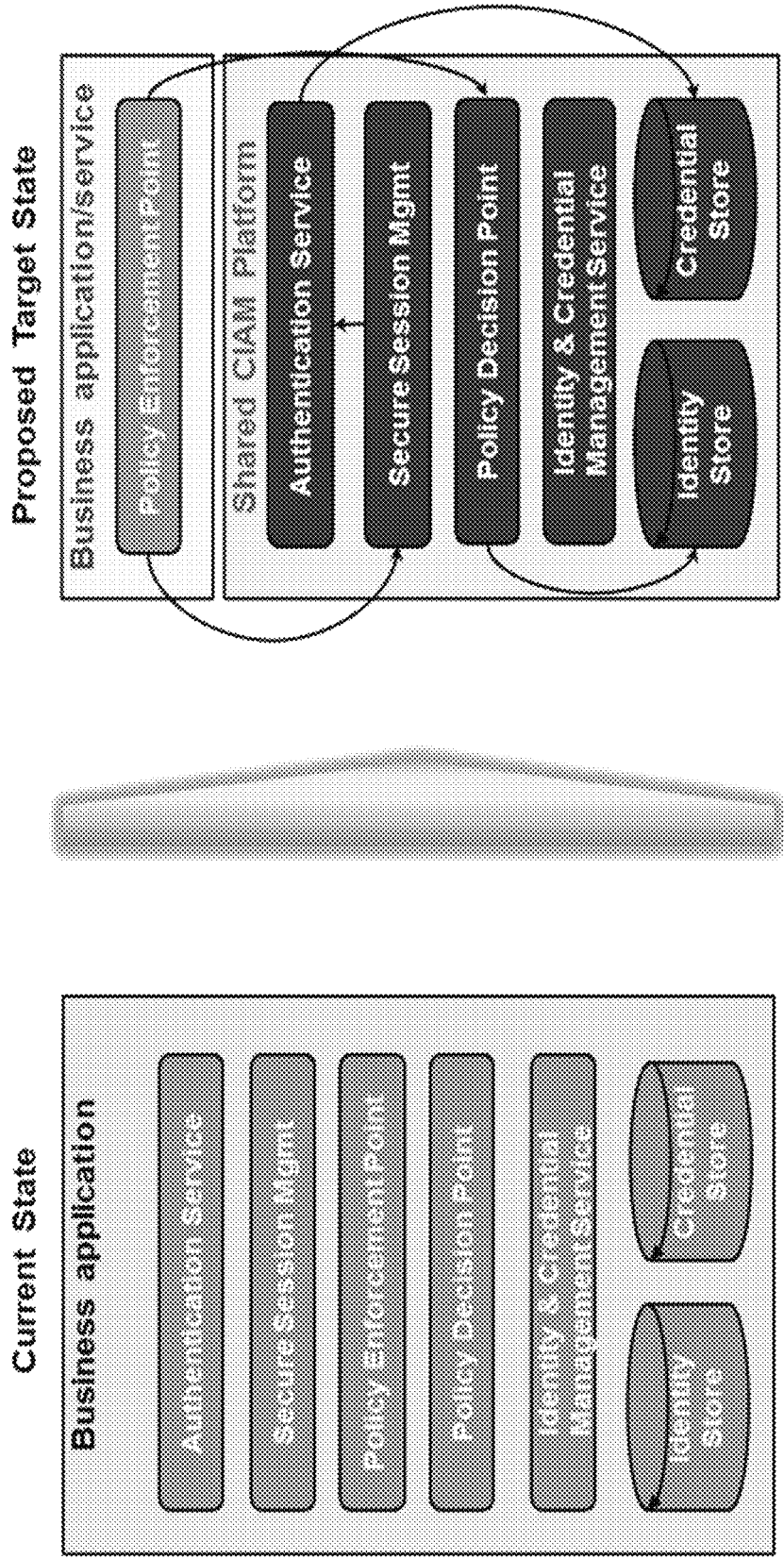
FIG. 22 shows example access enforcements from business applications.

FIG. 22 shows example access enforcements from business applications.

Figure 23:
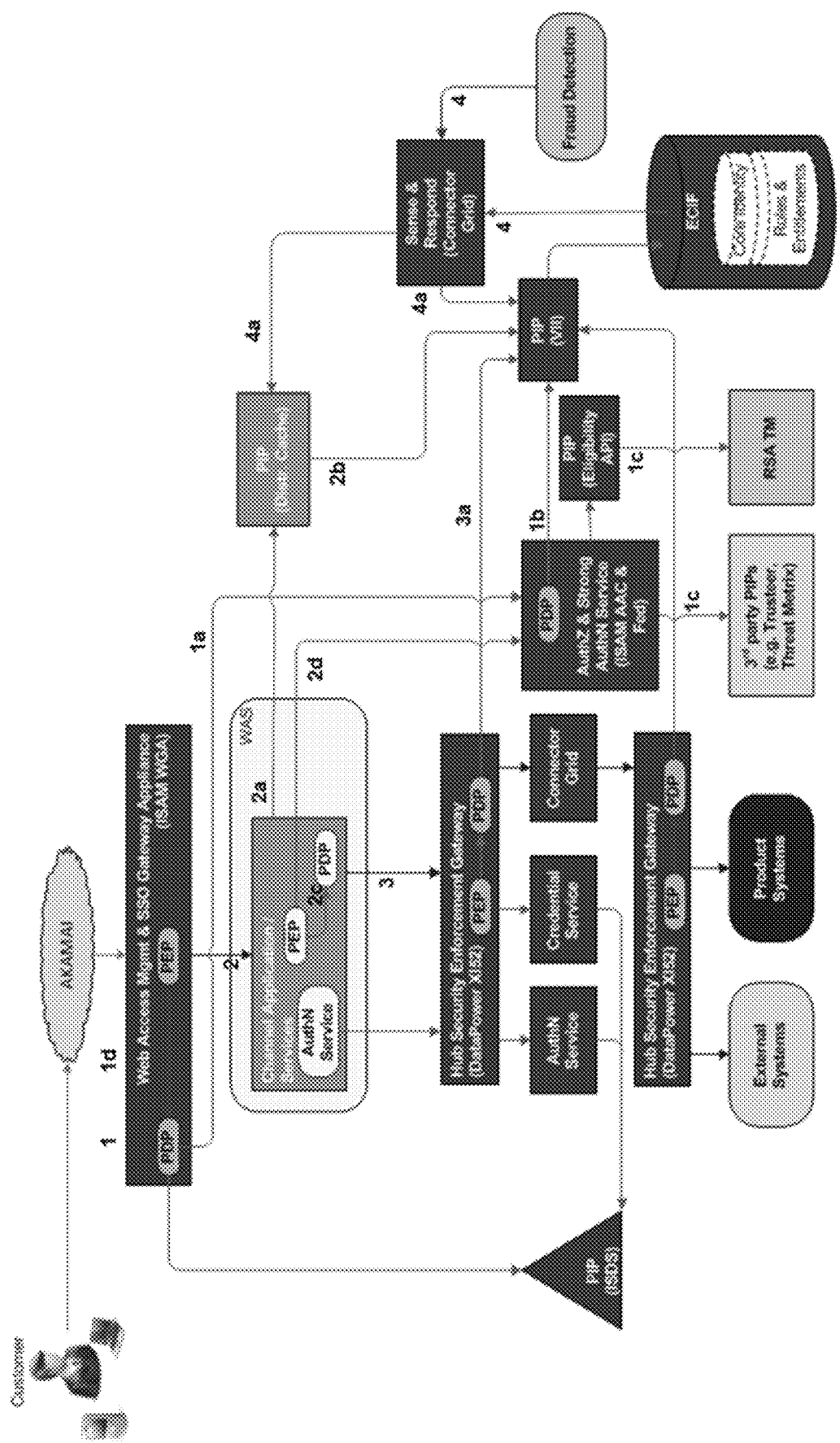
FIG. 23 shows example logical view for authorization with defence-in-depth.

FIG. 23 shows example logical view for authorization with defence-in-depth. As illustrated, in some embodiments, PDP of Web Gateway Appliance may make a decision to "Permit" or "Deny" access to the URL of a web resource or Web API. Decision is high level based on business category of a customer ("EDB Customer", "IL Self-Directed Customer", "Smart Portfolio Customer") stored in Credential Store (ISDS). It also determines if additional policy is configured in Authorization Service. If so it consults PDP of Authorization Service for a decision based on risk profile, payload of HTTP Request. Authorization Service retrieves additional customer's access profile from Virtual Identity Image (VII) cache which retrieves them from ECIF (via lazy initialization). Authorization Service also retrieves additional risk scores from Hub Eligibility API and 3rd party PIPs.

Decision provided to PEP of Web Gateway Appliance can be: "Permit", "Deny", "Permit with an Obligation or Authentication" that triggers step-up flow, "Deny with an Obligation".

Web Gateway Appliance forwards HTTP request to the Channel Web Application/Web API. Channel App/Web API has coded logic that drives user experience (list of menu items, execution of business a business process) based on the cached customer profile. Part of that logic is to obtain access profile of VII. Channel App/Web API executes its own PEP to enforce the coded logic. If access rules can be externalized then Channel App/Web API uses Authorization Service for policy decisions.

Channel App/Web API calls a business service through SOA Gateway (DataPower X152). SOA Gateway has a built-in PEP and PDP that provides and enforces policy decision. If necessary, it get customer's access profile from VII.

In case of any changes in customer's access profile or a fraud event Sense & Respond component forces PIPs of the Channel tier (Extreme Scale) and Central data hub (VII) to re-load updated information. Variation: access profile caching entries are marked "invalid" which results in Channel App/Web API to terminate security session within Web Gateway Appliance and force customer to re-login. Such event will cause a refresh of customer's access profile in PIPs.

FIG. 24 shows example policy decision and entitlement placement. Digital Identity in book of records (e.g. ECIF) may be represented by an ECIF party of a certain type. It is uniquely identified by ECIF ID. References to ECIF ID will reside in the data stores outside of ECIF. These references will reflect ECIF party lifecycle: create, merge, split, delete.

Roles & Entitlements have a business meaning and an association to book of records (e.g. ECIF) contracts (products and services sold to the customer) and ECIF parties representing civic identity of an individual. Roles & Entitlements can be consumed for access control purposes by CIAM PDPs and ECIF itself, also can be consumed by channel apps and Web APIs to define user interface (menu lists, shadowed, hidden items, etc.). "Implied" entitlement model for retail and small business customers: entitlement is derived from party-role-arrangement, party-to-party relationships.

An entitlement comprises of a business function, additional attributes (e.g. "Daily Cash Withdrawal Limit", "$500"). In case of providing dynamic aggregated constraints across several contracts associated with an ECIF party: corresponding entitlements will not be persisted in ECIF and reside in distributed cache (of VII or Channel depending on which tier enforces it), for example, "Outstanding Daily Cash Withdrawal Limits".

FIG. 25 lists example uses cases, decision points and entitlements of CIAM.

Figure 26:
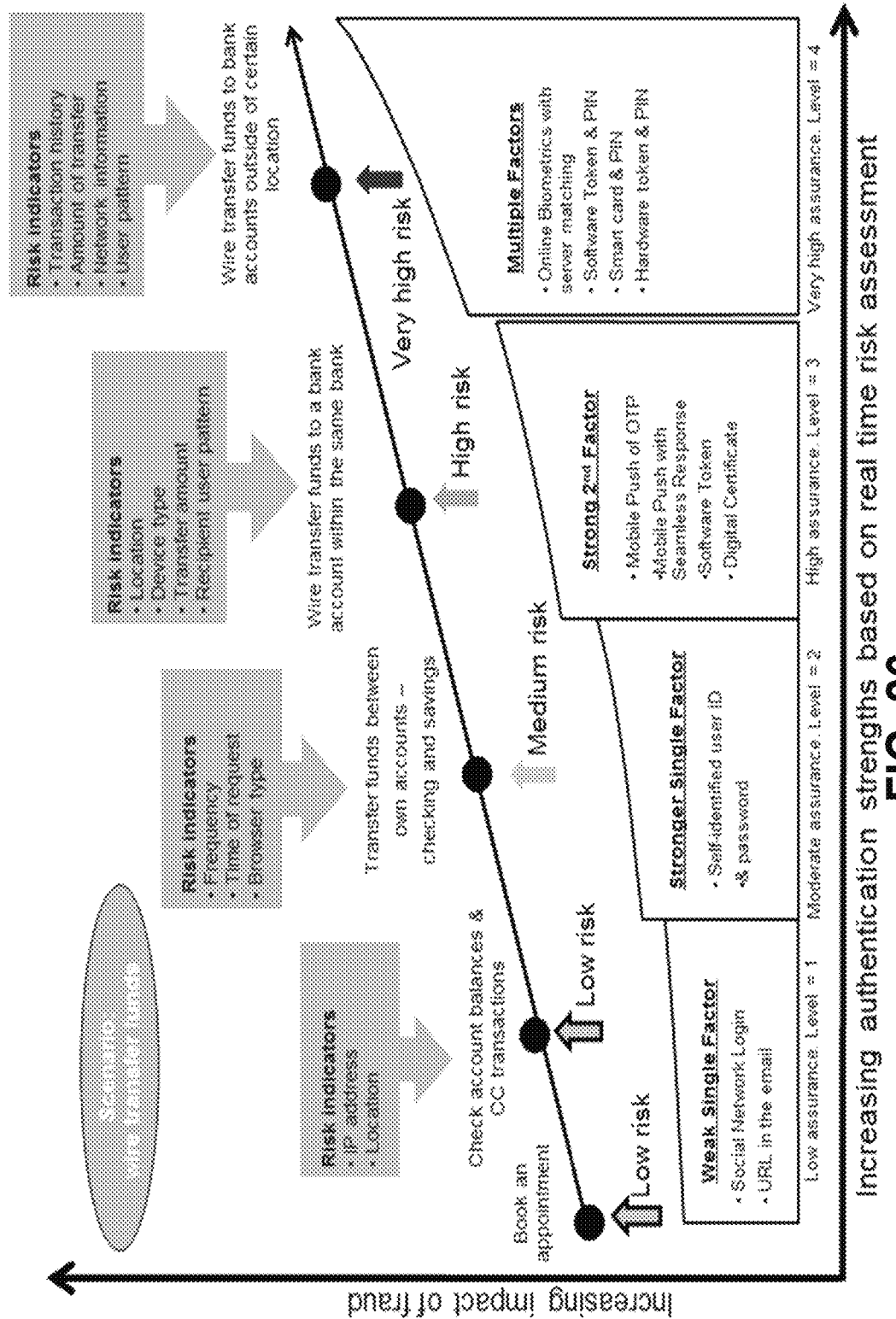
FIG. 26 shows example framework for risk-based authorization.
Figure 28:
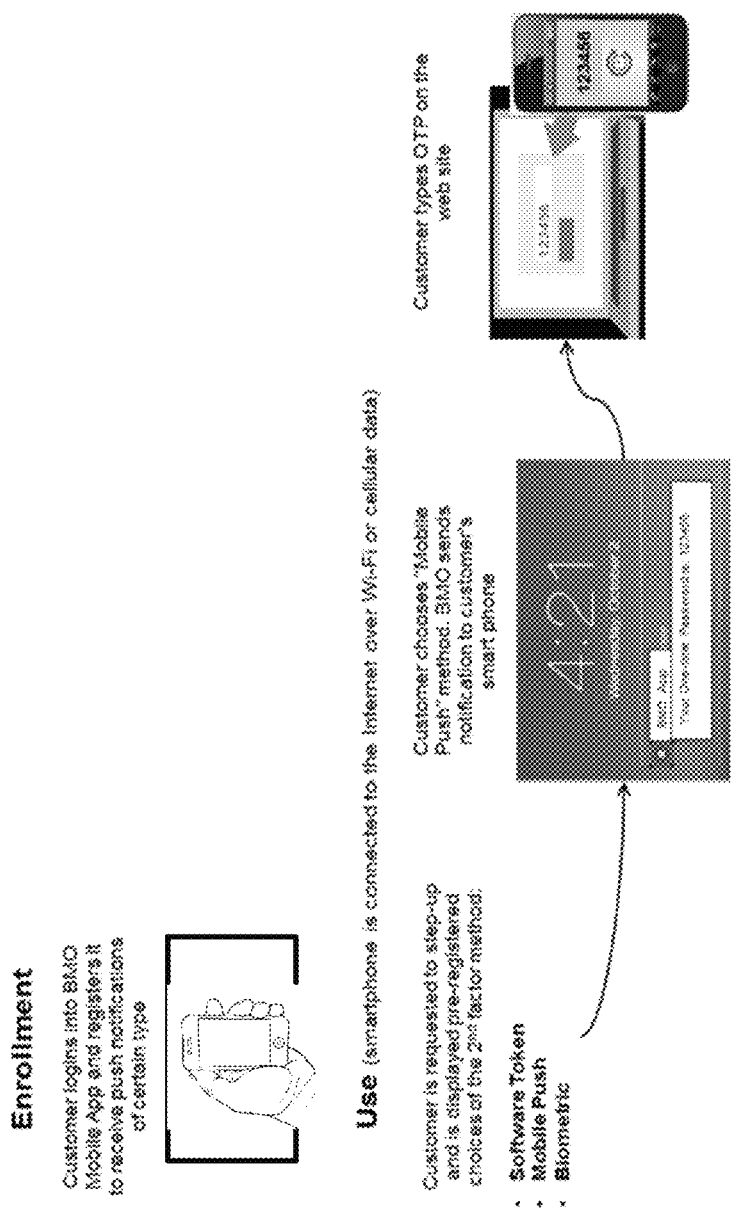
FIG. 28 shows example authentication process of mobile push in accordance with one embodiment.

FIG. 26 shows example framework for risk-based authorization. Deliver Risk-based Access (RBA) combined with gradual elevation of assurance level may be implemented. Variety of authentication (AuthN) methods may be chosen depending on level of fraud risk. Customer can choose AuthN method stronger than required. Higher levels (>=3) are elevated only for the duration of a transaction. Self-service channels with password-less primary authentication may be enabled, such as login with social networks, or login with a token or crypto material unlocked by a fingerprint. If a customer travels outside of their regular geolocation/country, he/she will always be required to provide a 2nd factor at least once. Customer may incur roaming charges if One-time PIN (OTP) delivered over SMS or Voice is his/her only choice.

FIG. 27 shows example authentication process of software token in accordance with one embodiment. At first, a customer may be enrolled and a secret key is randomly generated and unique for each customer. The key may be stored in CIAM Credential Store. Next, QR code is generated from secret key on a self-service channel, then customer scans QR code by bank mobile app. The mobile app starts generating OTP every minute. When the customer needs to login through a channel, customer may be requested to step-up and is displayed pre-registered choices of the 2nd factor method: software token, mobile push, or biometric. Customer chooses "Software Token" method and types in the OTP generated by the mobile app.

Figure 30:
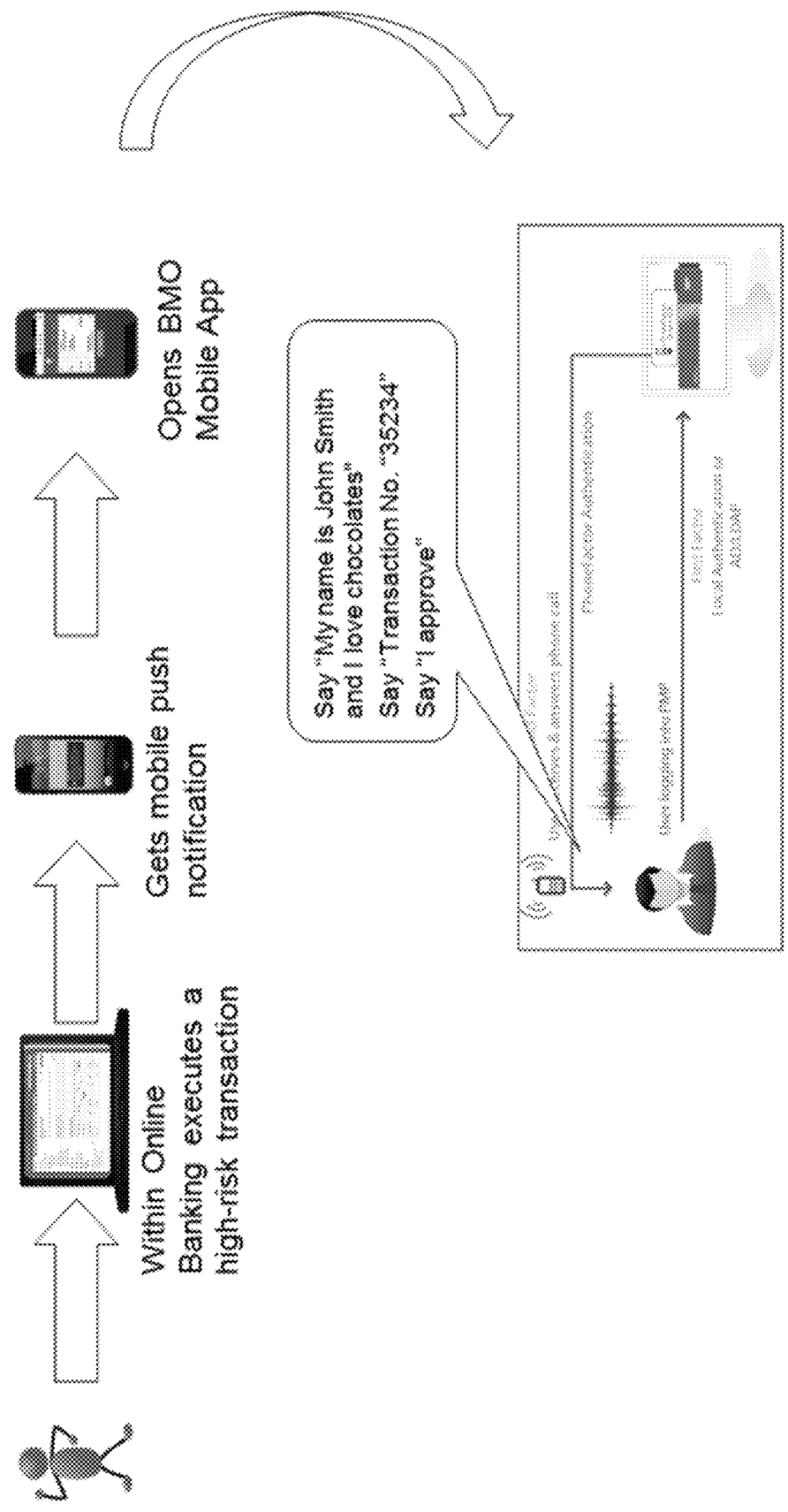
FIG. 30 shows example authentication process by voice recognition.

FIG. 30 shows example authentication process of mobile push in accordance with one embodiment. At first, a customer logins into bank mobile app and registers it to receive push notifications of certain type. When the customer needs to login through a channel, customer may be requested to step-up and is displayed pre-registered choices of the 2nd factor method: software token, mobile push, or biometric. Customer chooses "Mobile Push" method. Bank sends notification to customer's smart phone, then customer types OTP on the web site and can login.

Figure 29:
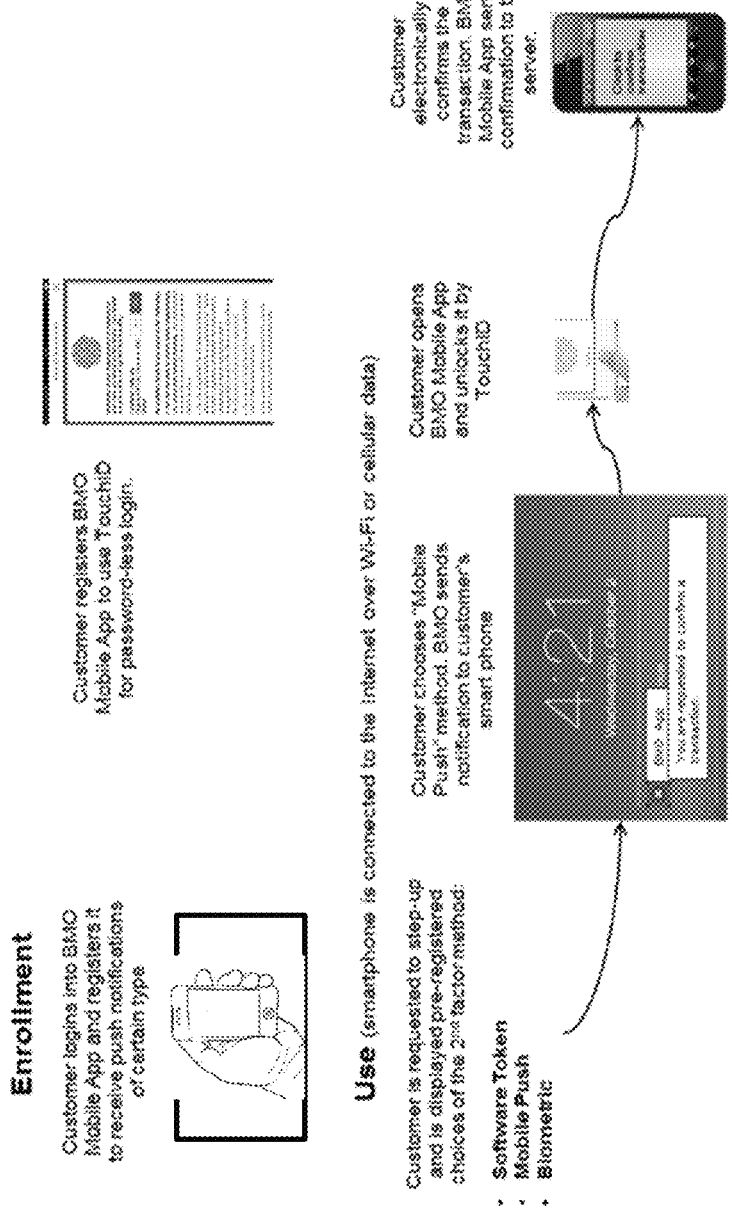
FIG. 29 shows example authentication process of mobile push with seamless response.

FIG. 29 shows example authentication process of mobile push with seamless response. At first, a customer logins into bank mobile app and registers it to receive push notifications of certain type. Customer then registers bank mobile app to use TouchID (or facial recognition) for password-less login. When the customer needs to login through a channel, customer may be requested to step-up and is displayed pre-registered choices of the 2nd factor method: software token, mobile push, or biometric. Customer chooses "Mobile Push" method. Bank sends notification to customer's smart phone, Customer opens bank mobile app and unlocks it by TouchID (or facial recognition). Customer electronically confirms the transaction. Bank mobile app then sends confirmation to the server.

FIG. 30 shows example authentication process by voice recognition. A customer may within Online Banking request to execute a high-risk transaction, get mobile push notification, then opens bank mobile app to conduct voice recognition.

Figure 31:
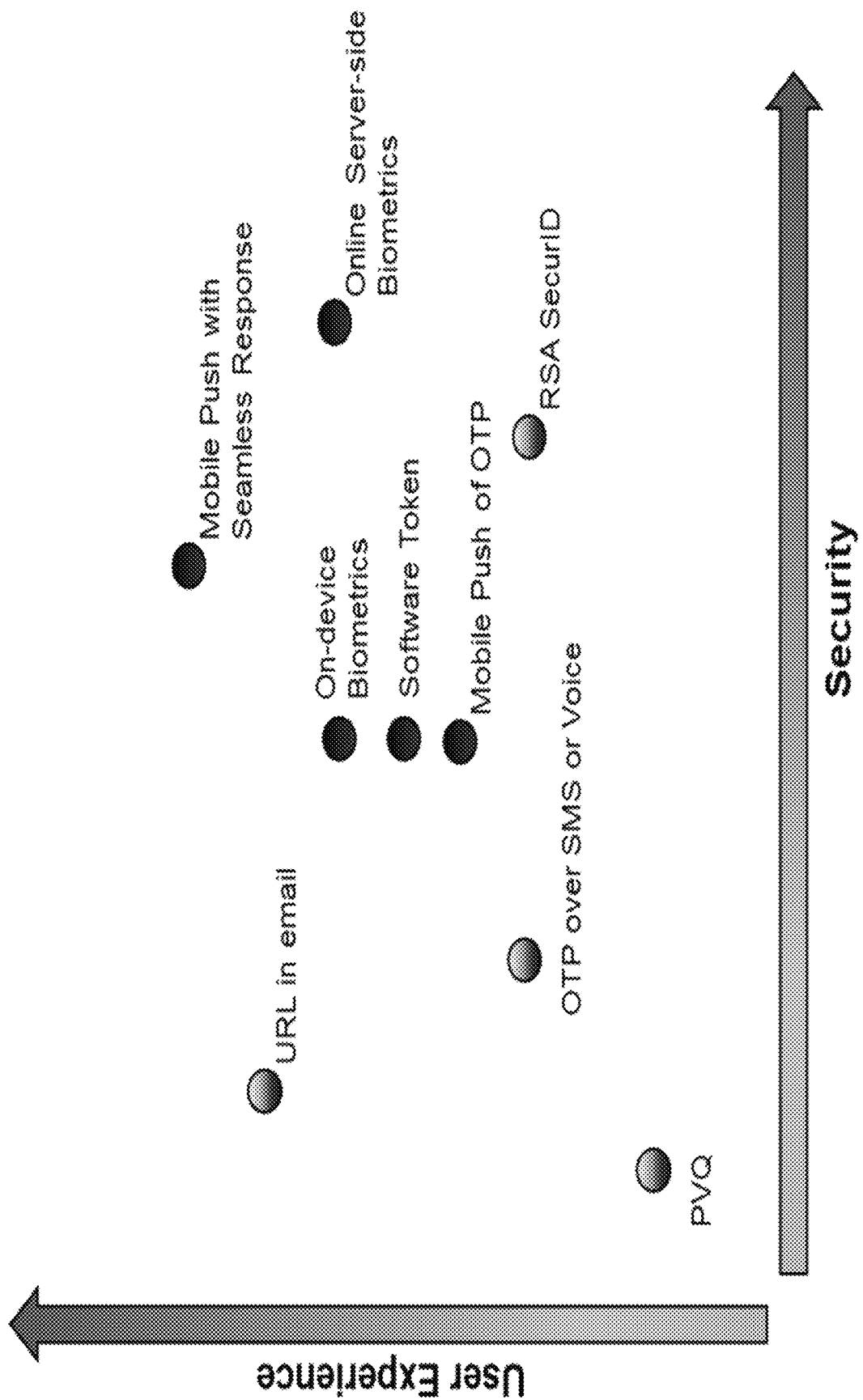
FIG. 31 shows example chart of usability vs. security for various authentication methods.

FIG. 31 shows example chart of usability vs. security for various authentication methods.

Figure 32:
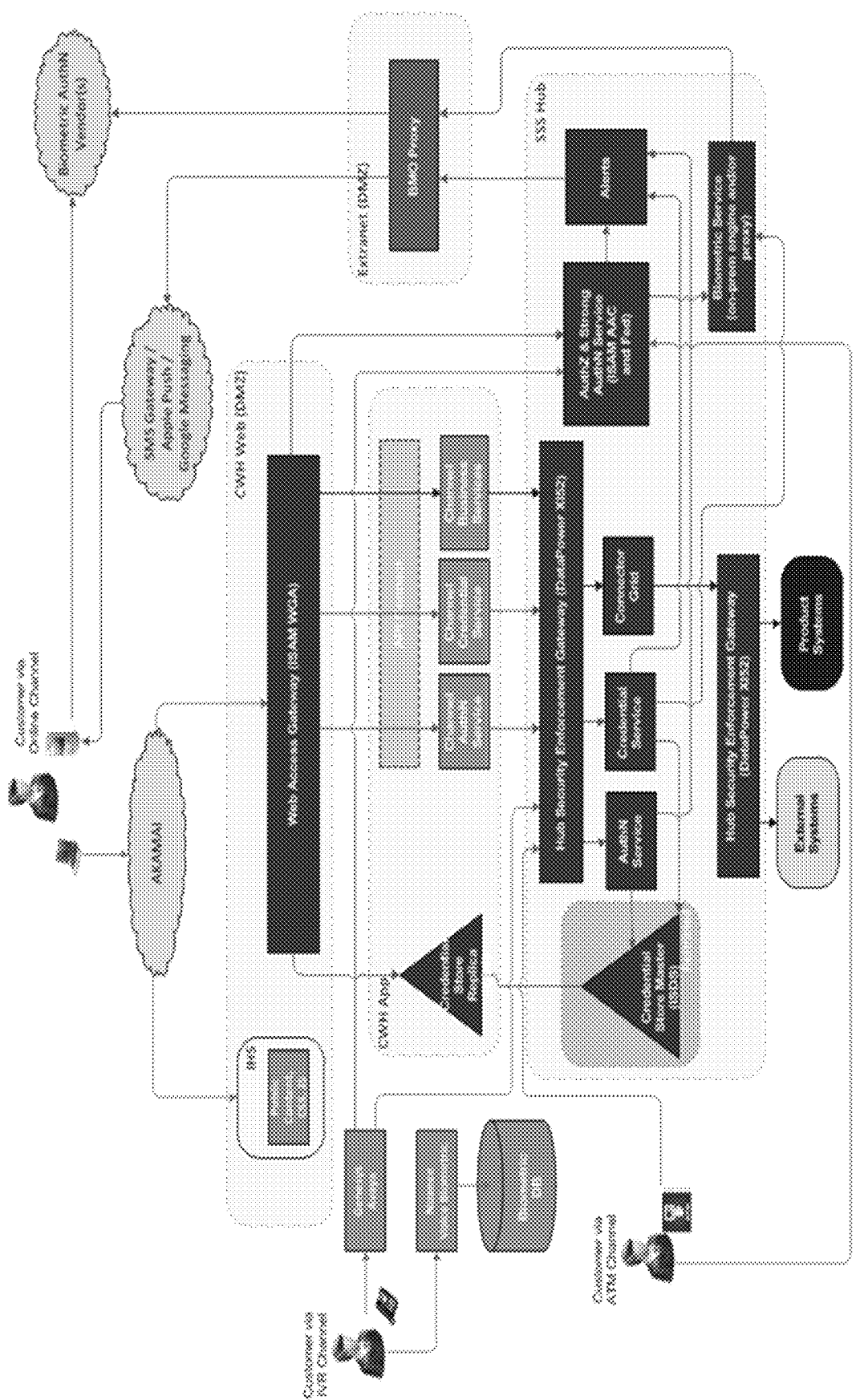
FIG. 32 shows example logical flowchart for authentication.

FIG. 32 shows example logical flowchart for authentication.

Figure 33:
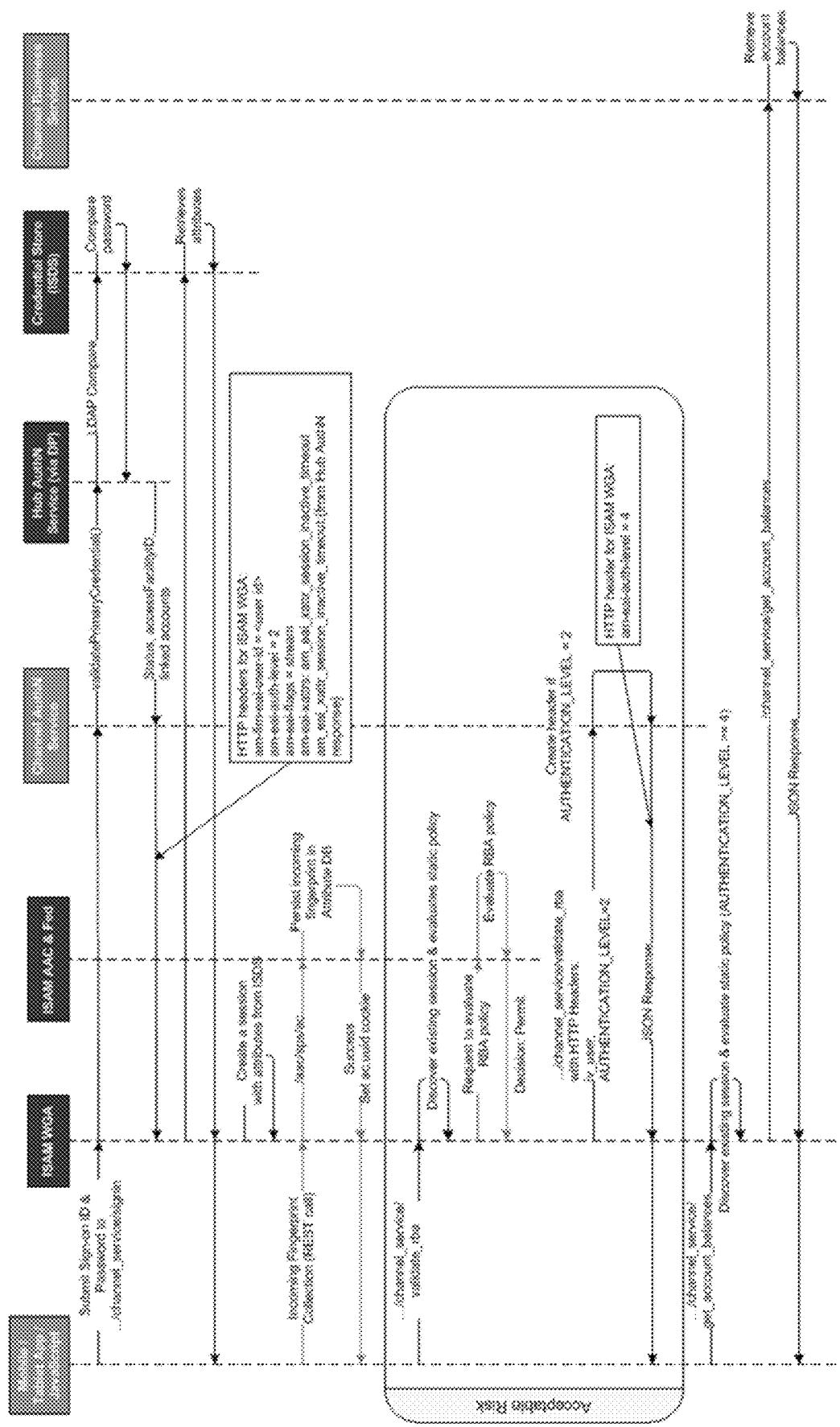
FIG. 33 shows example authentication flow for low or acceptable risk.

FIG. 33 shows example authentication flow for low or acceptable risk.

Figure 34:
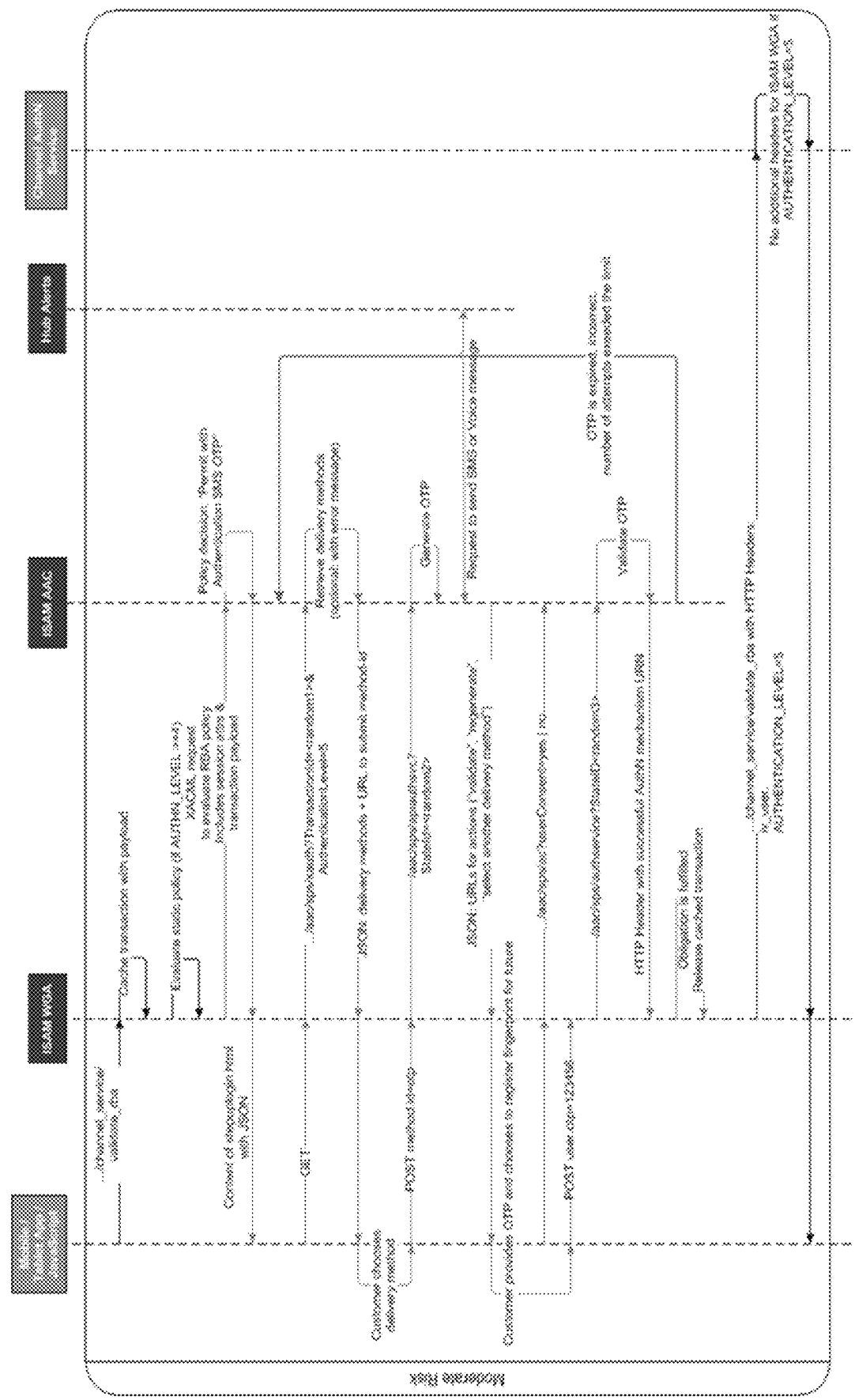
FIG. 34 shows example authentication flow for moderate risk (OTP over SMS).

FIG. 34 shows example authentication flow for moderate risk (OTP over SMS).

Figure 35:
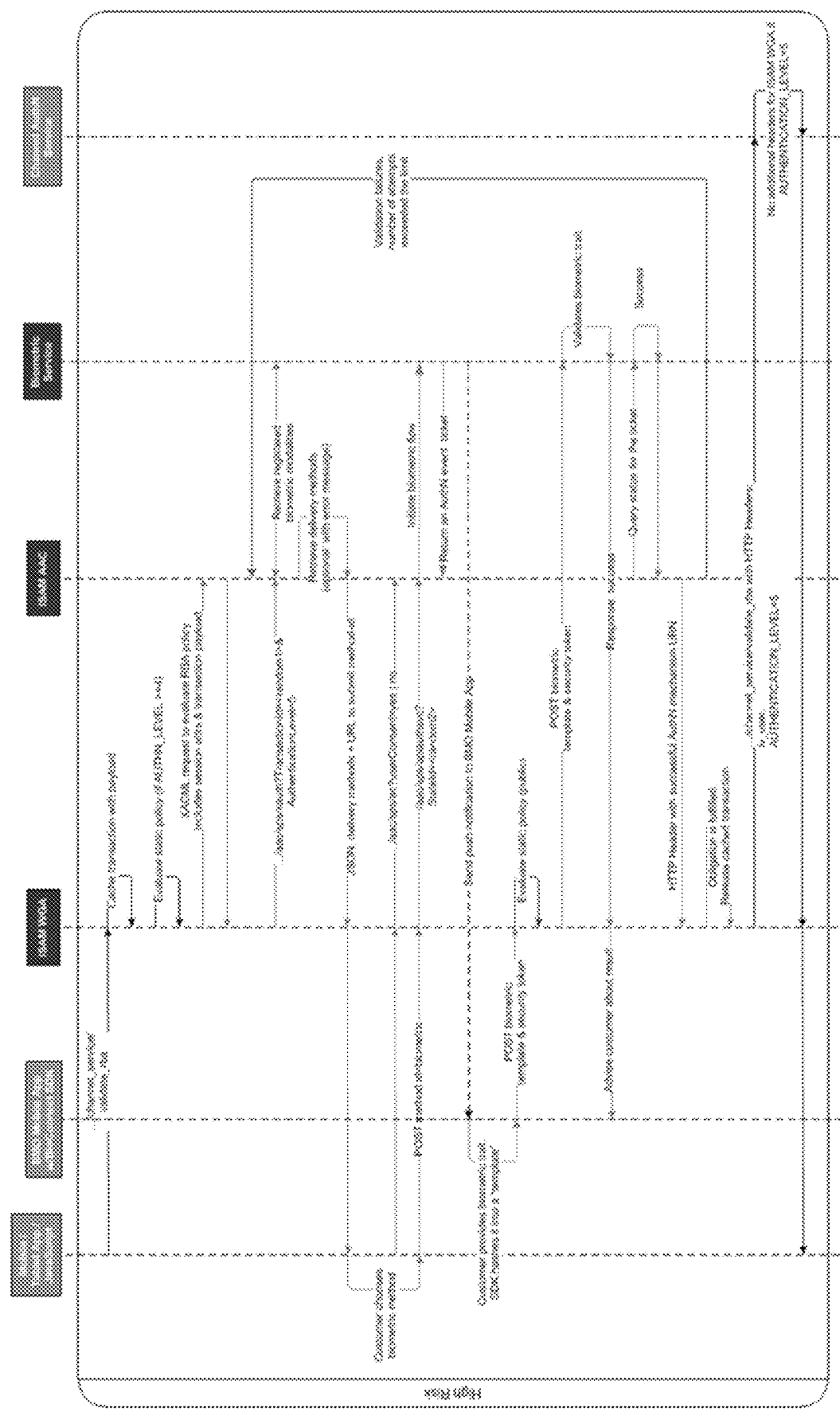
FIG. 35 shows example authentication flow for high risk (e.g. biometric authentication).

FIG. 35 shows example authentication flow for high risk (e.g. biometric authentication).

Figure 36:
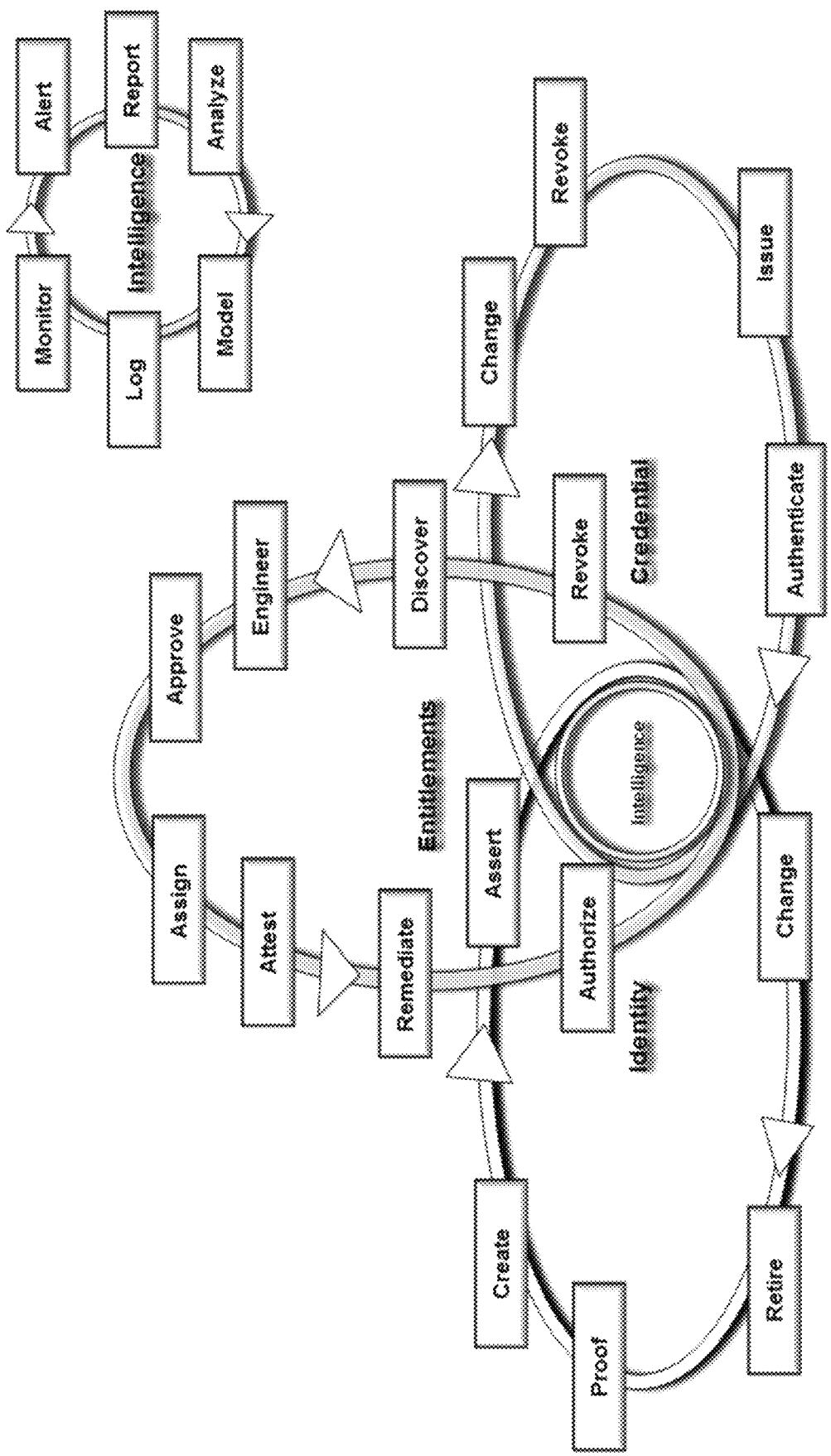
FIG. 36 shows example reference model for IAM Business Processes.

FIG. 36 shows example reference model for IAM Business Processes.

FIG. 37 shows example consistent and secure customer experience using authentications. Self-service channel applications contribute to and rely on the consolidated profiles. Reputation Profile can be aggregated from multiple sources: bank, credit rating agencies, law enforcement agencies. Behavioral Profile is an aggregated view of transaction characteristics that customer performs on a regular basis.

FIG. 38 shows example conceptual data model for online credentials.

FIG. 39 shows another example conceptual data model for online credentials.

FIG. 40 shows yet another example conceptual data model for online credentials.

Figure 41:
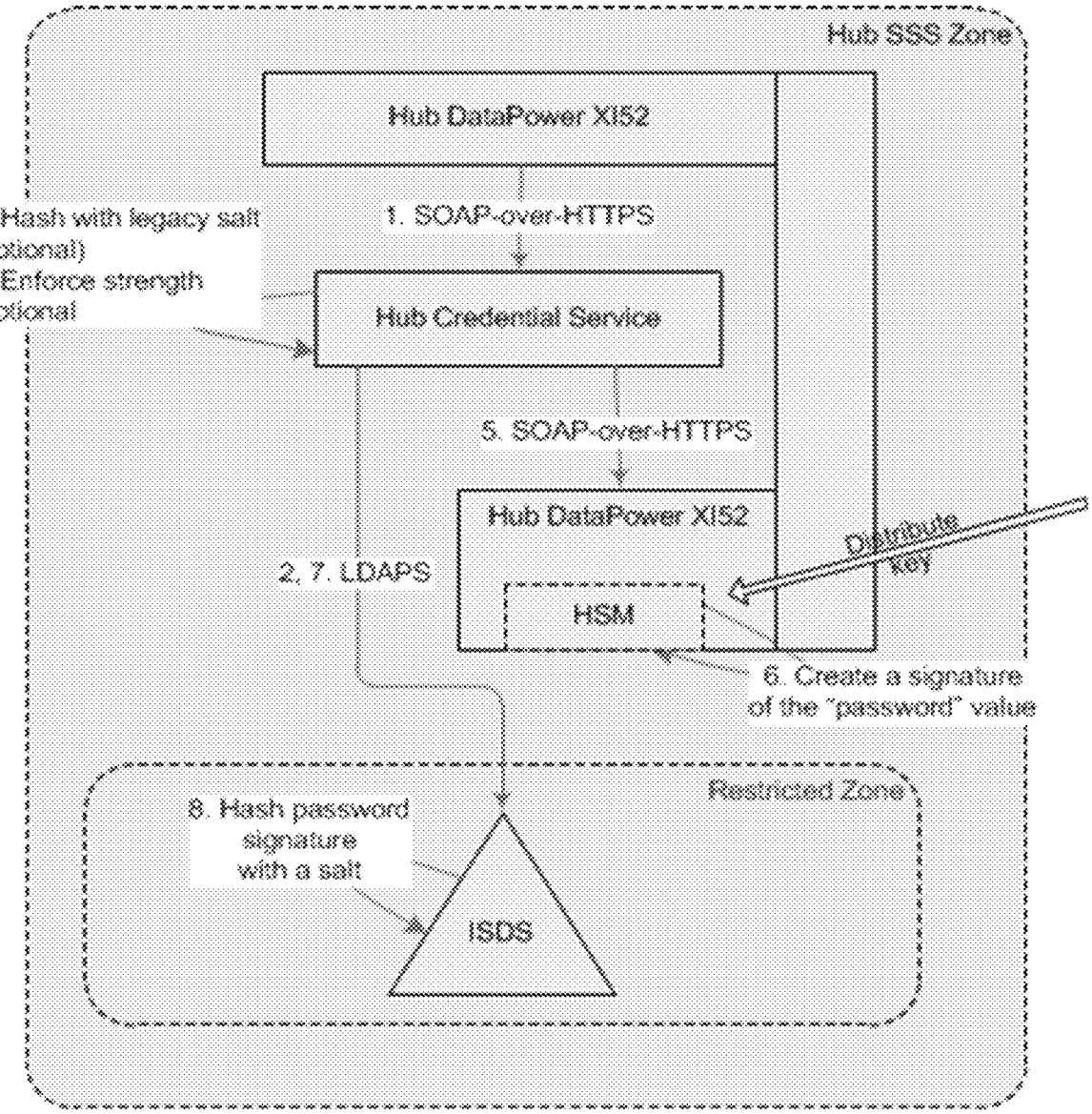
FIG. 41 shows example password encryption by DataPower HSM.

FIG. 41 shows example password encryption by Hardware Security Module (HSM). HSM may be used within existing DP X152 appliances. GITRM may request to configure HSM with FIPS 140-2 Level 2 compliance. HSM has to be initialized. Crypto operations are done by specific users with specific roles online via command line or Admin UI. Update EI backup and restore procedures—HSM content is not included into secure backup. In case of DR it has to be restored separately from the crypto material provided by GITRM. Public/private key pairs may be configured externally by GITRM key management team and imported to HSM in each. Same team may provide secure long term storage. Separate keys for prod and non-prod. Separate domains in HSM for different lines of business. Design may include creating a signature with a private key instead of encrypting by public key since the latter is not sufficiently protected. Design may include key rotation aspects. In such case solution will re-encrypt the password with new key at the time of customer login or password change (to be determined by the business). There may be a cut-off for the customers that do not login or change password within a specified period of time.

Figure 42:
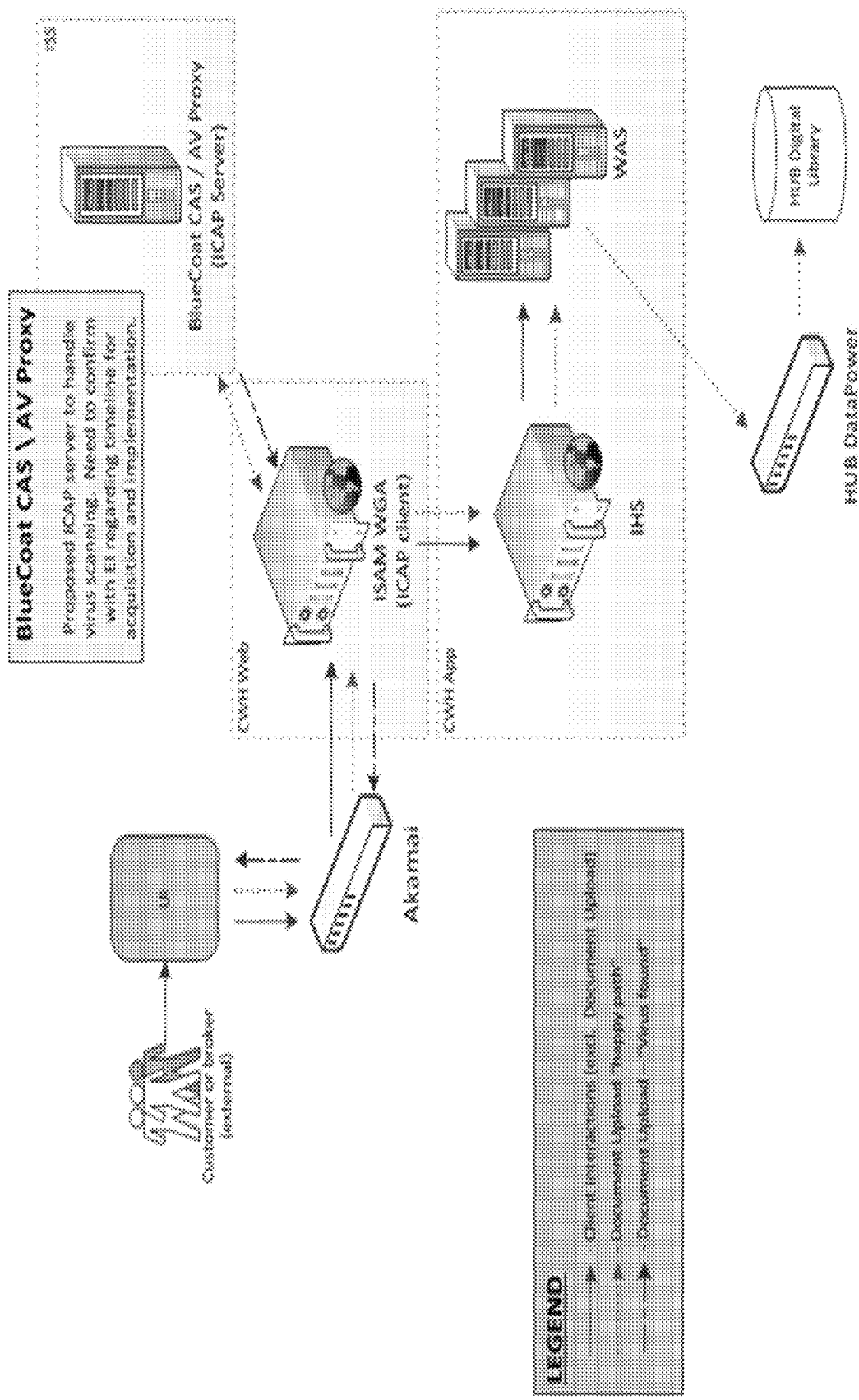
FIG. 42 shows example anti-virus scanning for CIAM.

FIG. 42 shows example anti-virus scanning for CIAM.

Figure 43:
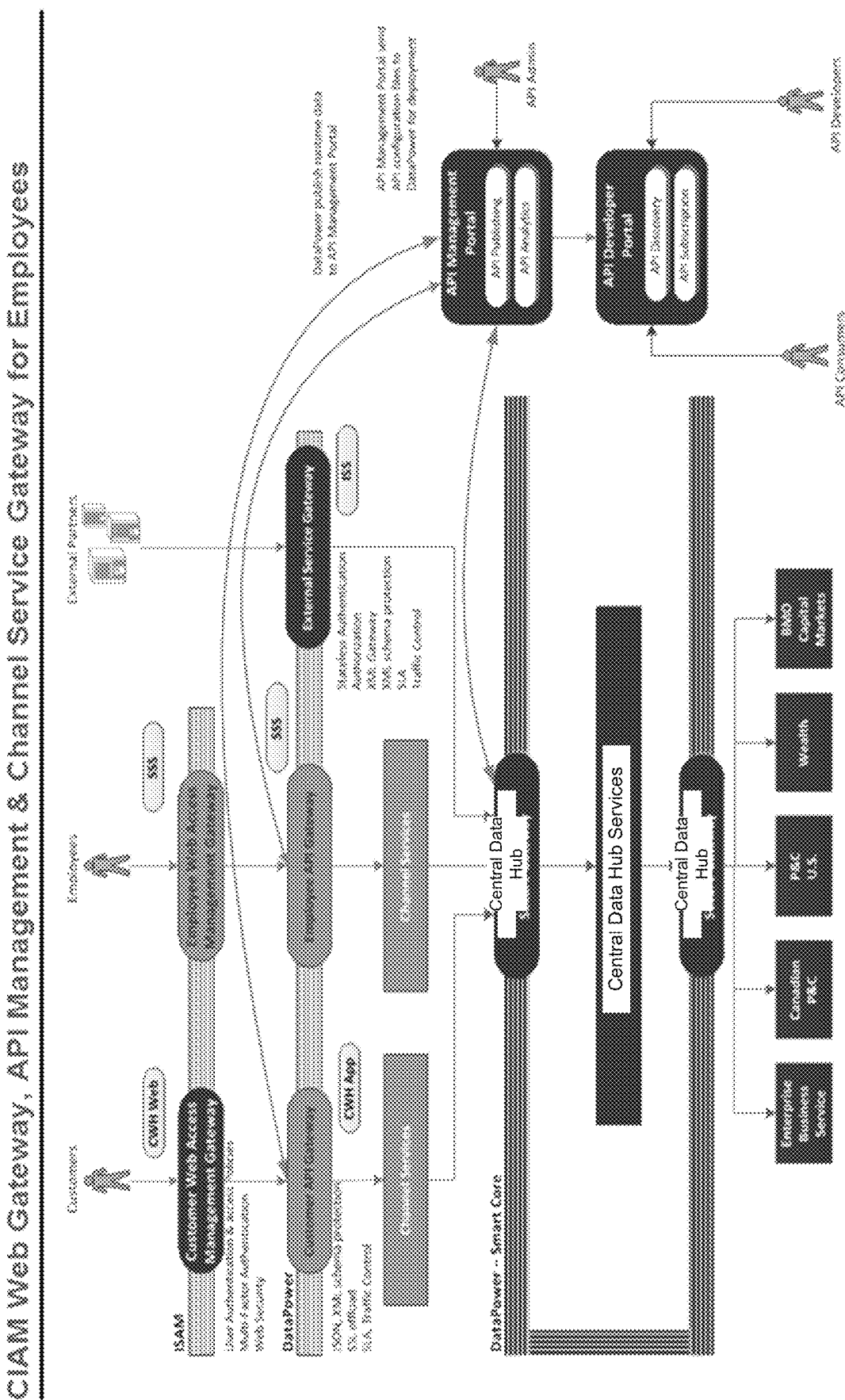
FIG. 43 shows CIAM Web Gateway, API Management & Channel Service Gateway for employees.

FIG. 43 shows CIAM Web Gateway, API Management & Channel Service Gateway for employees.

Figure 44:
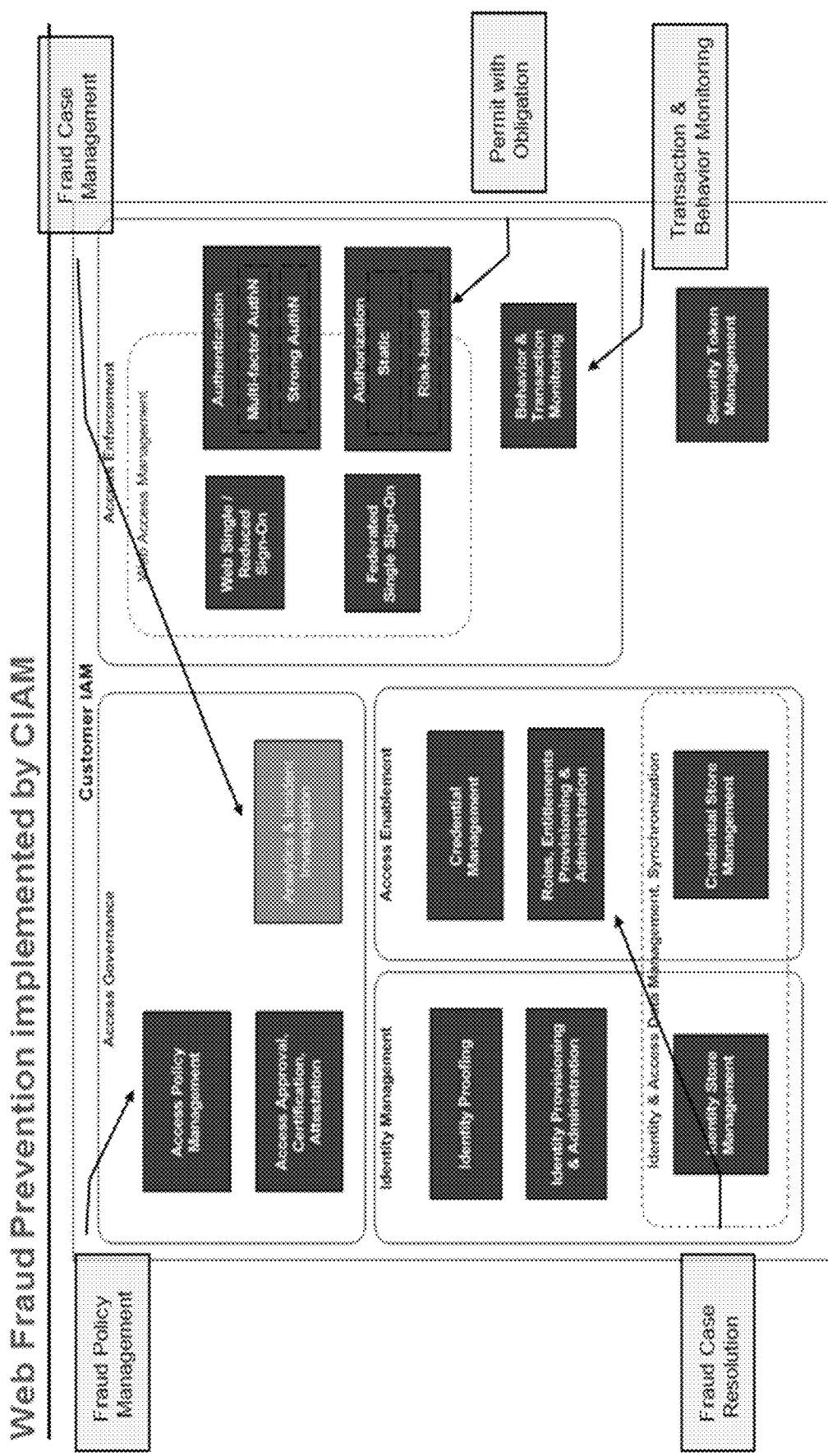
FIG. 44 shows example Web Fraud Prevention implementation by CIAM.

FIG. 44 shows example Web Fraud Prevention implementation by CIAM.

Figure 45:
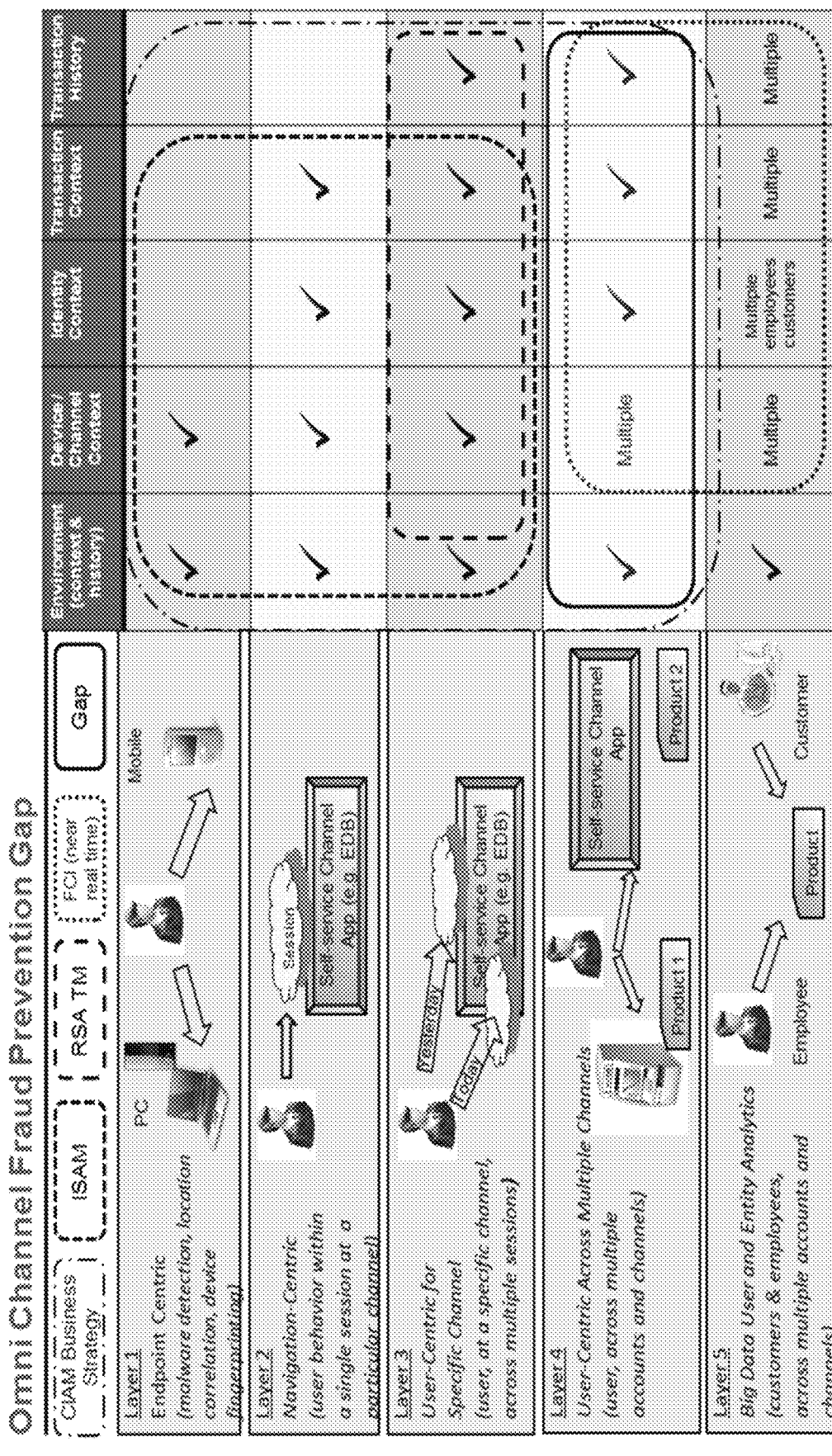
FIG. 45 shows example Omni channel fraud prevention gap.

FIG. 45 shows example Omni channel fraud prevention gap.

Figure 46:
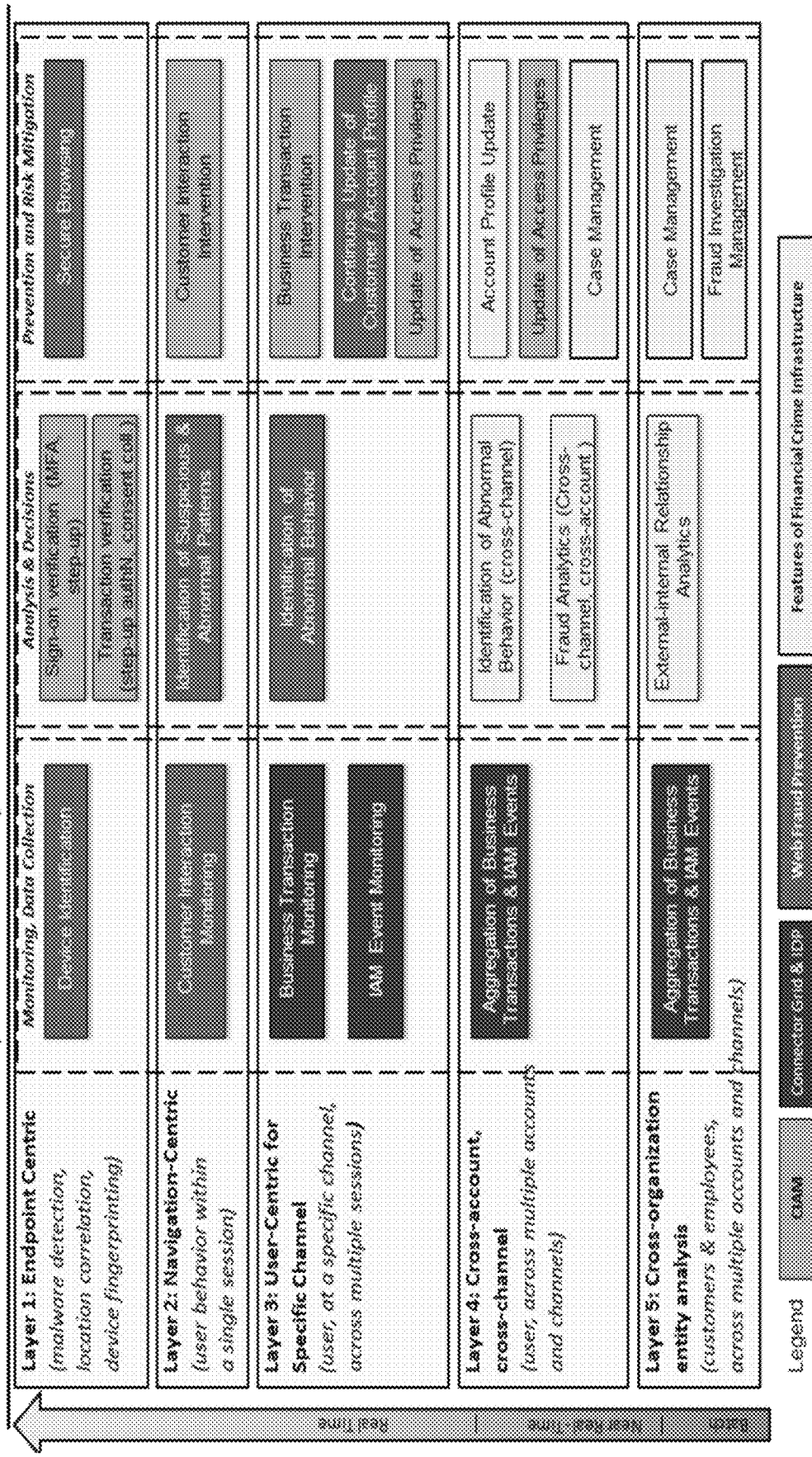
FIG. 46 shows example business reference architecture across levels for CIAM.

FIG. 46 shows example business reference architecture across levels for CIAM.

Figure 47:
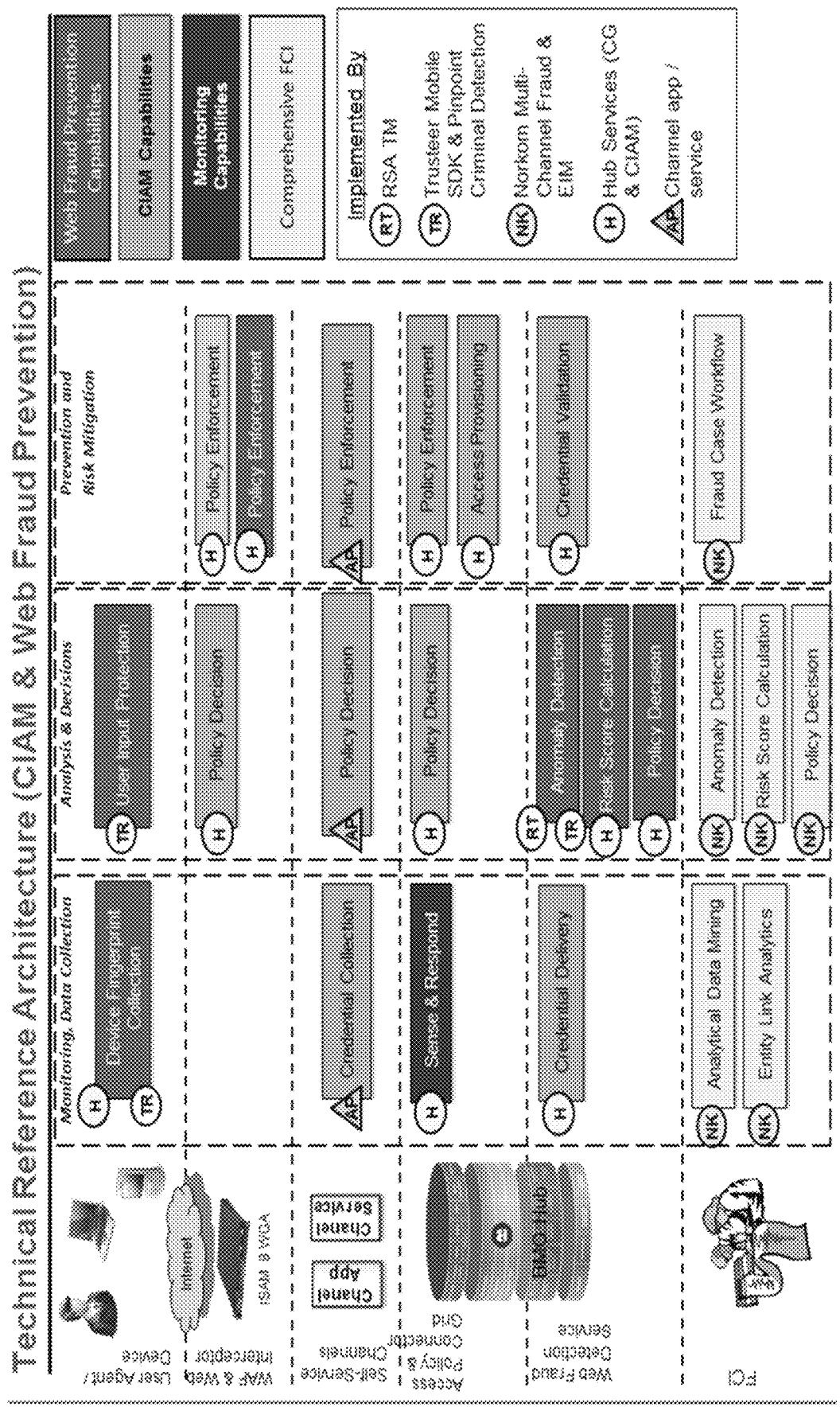
FIG. 47 shows example technical reference architecture for CIAM and web fraud prevention.

FIG. 47 shows example technical reference architecture for CIAM and web fraud prevention.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For simplicity only one computing device 2100 is shown in FIG. 2, but the respective systems may include more computing devices operable by users to access remote network resources and exchange data. The computing devices may be the same or different types of devices. The computing device includes at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for identity and access management, comprising at least a processor and a non-transient data memory storage, the data memory storage containing machine-readable instructions for execution by the processor, the machine-readable instructions configured to, when executed by the processor:
   load and store raw data from a plurality of source systems at a data hub implemented by a non-transient data store;
   receive a request for an application and data at the data hub, the request indicating an enterprise credential, the application having application functions;
   map the enterprise credential to an enterprise identity;
   in response to the request, select a set of data from the raw data based on the enterprise identity;
   verify the request and the set of data against one or more access controls linked to the enterprise identity, the access controls indicating data entitlement and permitted application functions;
   transform the selected set of data into an enterprise data set;
   control, at an interface, interactions with the application functions based on the access controls; and
   transmit, to the interface, the enterprise data set.

2. The system of claim 1, wherein the processor receives and stores event data linked to the enterprise credentials or enterprise identity.

3. The system of claim 1 wherein the enterprise credentials comprise a device fingerprint.

4. The system of claim 1 wherein the enterprise credentials comprise biometric data.

5. The system of claim 1 wherein the application functions comprise a protected function, wherein control of the protected function comprises prompting for additional enterprise credentials prior to permitting access to the protected function, wherein the access controls indicate the protected application function and a required enterprise credential that corresponds to the additional enterprise credential.

6. The system of claim 1, wherein the data hub stores the raw data at the non-transient data store in a data format that is identical to a source data format of the raw data in the plurality of source systems.

7. The system of claim 1, wherein the data map is a visual graph linking one or more data columns of the raw data to one or more data fields of the set of data.

8. The system of claim 3, wherein a data map is generated based on data attributes stored in a metadata database, wherein selection of the set of data uses the data map.

9. The system of claim 3, wherein the data map is generated through machine learning techniques.

10. The system of any one of claims 1 to 9, wherein the information delivery platform is further configured to define the one or more access controls on data access, based on the enterprise identity.

11. The system of any one of claims 1 to 10, wherein the information delivery platform is further configured to generate a data view based on the enterprise identity.

12. The system of claim 11, wherein the information delivery platform is further configured to update the data view based on the enterprise identity.

13. The system of any one of claims 1 to 12, wherein the information delivery platform is further configured to receive data associated with the enterprise identity, update the enterprise data set, and transmit the update data.

14. The system of any one of claims 1 to 13, wherein the information delivery platform is further configured to receive data associated with the enterprise identity and associate the data with data from the data hub using the data map.

15. The system of any one of claims 1 to 14 wherein the application functions include a protected function, wherein the processor is configured to authorize use of the protected function based on the access controls and the enterprise credentials, wherein the access controls indicate the protected application function and a required credential that corresponds to the enterprise credentials.

16. A computer-implemented method for executing by a processor, the method comprising:
    extracting, by the processor, raw data from a plurality of source systems;
    loading and storing the raw data at a data hub implemented by a non-transient data store;
    receiving a request to generate data for consumption, the request indicating an enterprise identity;
    in response to the request, selecting a set of data from the raw data based on a data map, the enterprise identity, and one or more access controls linked to the enterprise identity;
    transforming the selected set of data into an enterprise data set based on the data map and the enterprise identity; and
    transmitting the enterprise data set.

17. The method of claim 16, wherein data hub stores the raw data at the non-transient data store in a data format that is identical to a source data format of the raw data in the plurality of source systems.

18. The method of claim 16, wherein the data map is a visual graph linking one or more data columns of the raw data to one or more data fields of the curated set of data.

19. The method of claim 18, wherein the data map is generated based on data attributes stored in a metadata database.

20. The method of claim 18, comprising generating the data map through machine learning techniques.

\* \* \* \* \*